(12) United States Patent
Hwang et al.

(10) Patent No.: US 9,917,717 B2
(45) Date of Patent: *Mar. 13, 2018

(54) APPARATUS FOR TRANSMITTING BROADCAST SIGNALS, APPARATUS FOR RECEIVING BROADCAST SIGNALS, METHOD FOR TRANSMITTING BROADCAST SIGNALS AND METHOD FOR RECEIVING BROADCAST SIGNALS

(71) Applicant: LG ELECTRONICS INC., Seoul (KR)

(72) Inventors: Jaeho Hwang, Seoul (KR); Woosuk Ko, Seoul (KR); Sungryong Hong, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/441,796

(22) Filed: Feb. 24, 2017

(65) Prior Publication Data

US 2017/0171009 A1     Jun. 15, 2017

Related U.S. Application Data

(63) Continuation of application No. 14/837,957, filed on Aug. 27, 2015, now Pat. No. 9,614,642.

(60) Provisional application No. 62/126,690, filed on Mar. 1, 2015, provisional application No. 62/098,348, filed on Dec. 31, 2014.

(51) Int. Cl.
    *H04L 27/26*    (2006.01)
    *H04L 29/06*    (2006.01)
    *H04L 5/00*     (2006.01)

(52) U.S. Cl.
    CPC .......... *H04L 27/2649* (2013.01); *H04L 69/22* (2013.01); *H04L 5/0023* (2013.01)

(58) Field of Classification Search
USPC .... 375/295, 347, 240.27; 370/208, 480, 349
See application file for complete search history.

(56) References Cited

U.S. PATENT DOCUMENTS

| | | |
|---|---|---|
| 7,535,820 B2 | 5/2009 | Hayashi |
| 9,414,099 B2 | 8/2016 | Herrmann et al. |
| 2005/0135284 A1 | 6/2005 | Nanda et al. |

(Continued)

FOREIGN PATENT DOCUMENTS

| | | |
|---|---|---|
| KR | 10-2009-0021101 | 2/2009 |
| KR | 10-2009-0074683 A | 7/2009 |

(Continued)

*Primary Examiner* — Eva Puente
(74) *Attorney, Agent, or Firm* — Birch, Stewart, Kolasch & Birch, LLP

(57) ABSTRACT

A method is provided for receiving broadcast signals. The broadcast signals are received. The received broadcast signals are demodulated by an Orthogonal Frequency Division Multiplex (OFDM) scheme, a signal frame is parsed from the demodulated broadcast signals, data is decoded in the parsed signal frame to output baseband packets, the baseband packets are output-processed to output link layer packets, and the link layer packets are de-encapsulated to output Transport Stream (TS) packets by inserting a header for each TS packet of which a header is deleted based on information of a header of the link layer packets.

6 Claims, 53 Drawing Sheets

(56) References Cited

U.S. PATENT DOCUMENTS

| | | | |
|---|---|---|---|
| 2008/0066095 A1* | 3/2008 | Reinoso | H04N 7/1675 725/28 |
| 2008/0144775 A1 | 6/2008 | Zhou et al. | |
| 2009/0245392 A1 | 10/2009 | Leung et al. | |
| 2010/0246719 A1 | 9/2010 | Ko et al. | |
| 2010/0257570 A1 | 10/2010 | Song et al. | |
| 2011/0107082 A1* | 5/2011 | Blom | H04L 63/168 713/150 |
| 2011/0286535 A1 | 11/2011 | Ko et al. | |
| 2012/0327955 A1 | 12/2012 | Herrmann et al. | |
| 2013/0028336 A1* | 1/2013 | Limberg | H04N 21/2383 375/240.27 |
| 2013/0202109 A1* | 8/2013 | Ducharme | H04N 21/23476 380/200 |
| 2013/0219431 A1 | 8/2013 | Hong et al. | |
| 2013/0235952 A1 | 9/2013 | Ko et al. | |
| 2013/0243116 A1* | 9/2013 | Ko | H04L 5/0044 375/295 |
| 2014/0198874 A1 | 7/2014 | Kim et al. | |
| 2014/0198875 A1 | 7/2014 | Kim et al. | |
| 2014/0294002 A1 | 10/2014 | Kim et al. | |
| 2014/0376658 A1 | 12/2014 | Baek et al. | |
| 2015/0010096 A1 | 1/2015 | Kim et al. | |
| 2015/0016453 A1 | 1/2015 | Kim et al. | |
| 2015/0023249 A1 | 1/2015 | Hwang et al. | |
| 2015/0030100 A1 | 1/2015 | Hwang et al. | |
| 2015/0043666 A1 | 2/2015 | Hwang et al. | |
| 2015/0043672 A1 | 2/2015 | Kim et al. | |
| 2015/0063490 A1 | 3/2015 | Yang et al. | |
| 2015/0085951 A1 | 3/2015 | Shin et al. | |
| 2015/0092882 A1 | 4/2015 | Lee et al. | |
| 2015/0092883 A1 | 4/2015 | Hwang et al. | |
| 2015/0146802 A1 | 5/2015 | Shin et al. | |
| 2015/0229367 A1 | 8/2015 | Hwang et al. | |
| 2015/0229443 A1 | 8/2015 | Hwang et al. | |
| 2015/0256291 A1 | 9/2015 | Shin et al. | |
| 2015/0358941 A1 | 12/2015 | Hwang et al. | |
| 2016/0036562 A1 | 2/2016 | Baek et al. | |
| 2016/0036613 A1 | 2/2016 | Mun et al. | |
| 2016/0037487 A1 | 2/2016 | Hong et al. | |
| 2016/0164541 A1 | 6/2016 | Ko et al. | |

FOREIGN PATENT DOCUMENTS

| | | |
|---|---|---|
| KR | 10-2012-0139520 A | 12/2012 |
| KR | 10-2013-0122756 A | 11/2013 |
| KR | 20-2014-0001148 U | 2/2014 |
| KR | 20-2014-0001776 U | 3/2014 |
| KR | 10-2014-0064740 A | 5/2014 |
| KR | 10-2014-0071974 A | 6/2014 |
| WO | WO 03/032584 A1 | 4/2003 |
| WO | WO 2009/084837 A2 | 7/2009 |
| WO | WO 2014/200280 A2 | 12/2014 |

* cited by examiner

| Content | Bits |
|---|---|
| PHY_PROFILE | 3 |
| FFT_SIZE | 2 |
| GI_FRACTION | 3 |
| EAC_FLAG | 1 |
| PILOT_MODE | 1 |
| PAPR_FLAG | 1 |
| FRU_CONFIGURE | 3 |
| RESERVED | 7 |

FIG. 13

| Content | Bits |
|---|---|
| PREAMBLE_DATA<br>NUM_FRAME_FRU<br>PAYLOAD_TYPE<br>NUM_FSS<br>SYSTEM_VERSION | 20<br>2<br>3<br>2<br>8 |
| CELL_ID<br>NETWORK_ID<br>SYSTEM_ID | 16<br>16<br>16 |
| for i = 0:3<br>    FRU_PHY_PROFILE<br>    FRU_FRAME_LENGTH<br>    FRU_GI_FRACTION<br>    RESERVED<br>end | <br>3<br>2<br>3<br>4<br> |
| PLS2_FEC_TYPE<br>PLS2_MOD<br>PLS2_SIZE_CELL<br>PLS2_STAT_SIZE_BIT<br>PLS2_SYN_SIZE_BIT<br>PLS2_REP_FLAG<br>PLS2_REP_SIZE_CELL<br>PLS2_NEXT_FEC_TYPE<br>PLS2_NEXT_MODE<br>PLS2_NEXT_REP_FLAG<br>PLS2_NEXT_REP_SIZE_CELL<br>PLS2_NEXT_REP_STAT_SIZE_BIT<br>PLS2_NEXT_REP_DYN_SIZE_BIT<br>PLS2_AP_MODE<br>PLS2_AP_SIZE_CELL<br>PLS2_NEXT_AP_MODE<br>PLS2_NEXT_AP_SIZE_CELL | 2<br>3<br>15<br>14<br>14<br>1<br>15<br>2<br>3<br>1<br>15<br>14<br>14<br>2<br>15<br>2<br>15 |
| RESERVED<br>CRC 32 | 32<br>32 |

FIG. 14

| Content | Bits |
|---|---|
| FIC_FLAG | 1 |
| AUX_FLAG | 1 |
| NUM_DP | 6 |
| for i = 1: NUM_DP | |
|     DP_ID | 6 |
|     DP_TYPE | 3 |
|     DP_GROUP_ID | 8 |
|     BASE_DP_ID | 6 |
|     DP_FEC_TYPE | 2 |
|     DP_COD | 4 |
|     DP_MOD | 4 |
|     DP_SSD_FLAG | 1 |
|     if PHY_PROFILE = '010' | |
|         DP_MIMO | 3 |
|     end | |
|     DP_TI_TYPE | 1 |
|     DP_TI_LENGTH | 2 |
|     DP_TI_BYPASS | 1 |
|     DP_FRAME_INTERVAL | 2 |
|     DP_FIRST_FRAME_IDX | 5 |
|     DP_NUM_BLOCK_MAX | 10 |
|     DP_PAYLOAD_TYPE | 2 |
|     DP_INBAND_MODE | 2 |
|     DP_PROTOCOL_TYPE | 2 |
|     DP_CRC_MODE | 2 |
|     if DP_PAYLOAD_TYPE == TS('00') | |
|         DNP_MODE | 2 |
|         ISSY_MODE | 2 |
|         HC_MODE_TS | 2 |
|         if HC_MODE_TS == '01' or '10' | |
|             PID | 13 |
|         end | |
|     if DP_PAYLOAD_TYPE == IP('01') | |
|         HC_MODE_IP | 2 |
|     end | |
|     RESERVED | 8 |
| end | |
| if FIC_FLAG == 1 | |
|     FIC_VERSION | 8 |
|     FIC_LENGTH_BYTE | 13 |
|     RESERVED | 8 |
| end | |
| if AUX_FLAG == 1 | |
|     NUM_AUX | 4 |
|     AUX_CONFIG_RFU | 8 |
|     for - 1 : NUM_AUX | |
|         AUX_STREAM_TYPE | 4 |
|         AUX_PRIVATE_CONF | 28 |
|     end | |
| end | |

| Content | | Bit |
|---|---|---|
| FRAME_INDEX | | 5 |
| PLS_CHANGE_COUNTER | | 4 |
| FIC_CHANGE_COUNTER | | 4 |
| RESERVED | | 16 |
| for i = 1: NUM_DP | | |
| | DP_ID | 6 |
| | DP_START | 15 (or13) |
| | DP_NUM_BLOCK | 10 |
| end | RESERVED | 8 |
| EAC_FLAG | | 1 |
| EAS_WAKE_UP_VERSION_NUM | | 8 |
| if EAC_FLAG == 1 | | |
| | EAC_LENGTH_BYTE | 12 |
| else | | |
| | EAC_COUNTER | 12 |
| end | | |
| for i=1:NUM_AUX | | |
| | AUX_PRIVATE_DYN | 48 |
| end | | |
| CRC 32 | | 32 |

FIG. 25
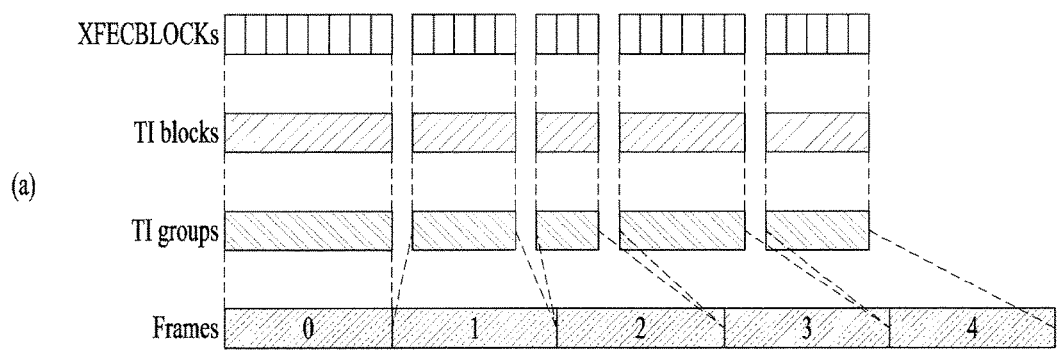
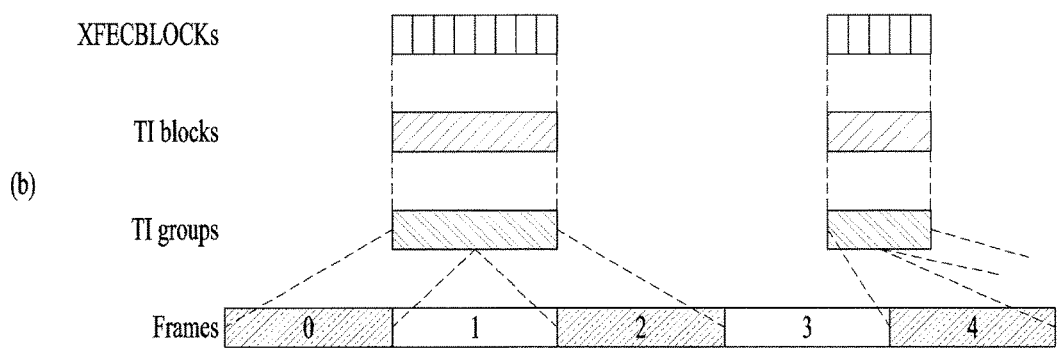
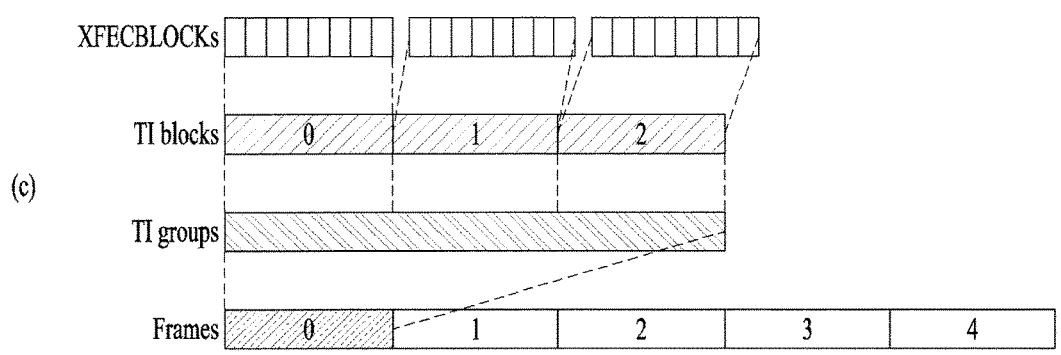

FIG. 29

FIG. 30
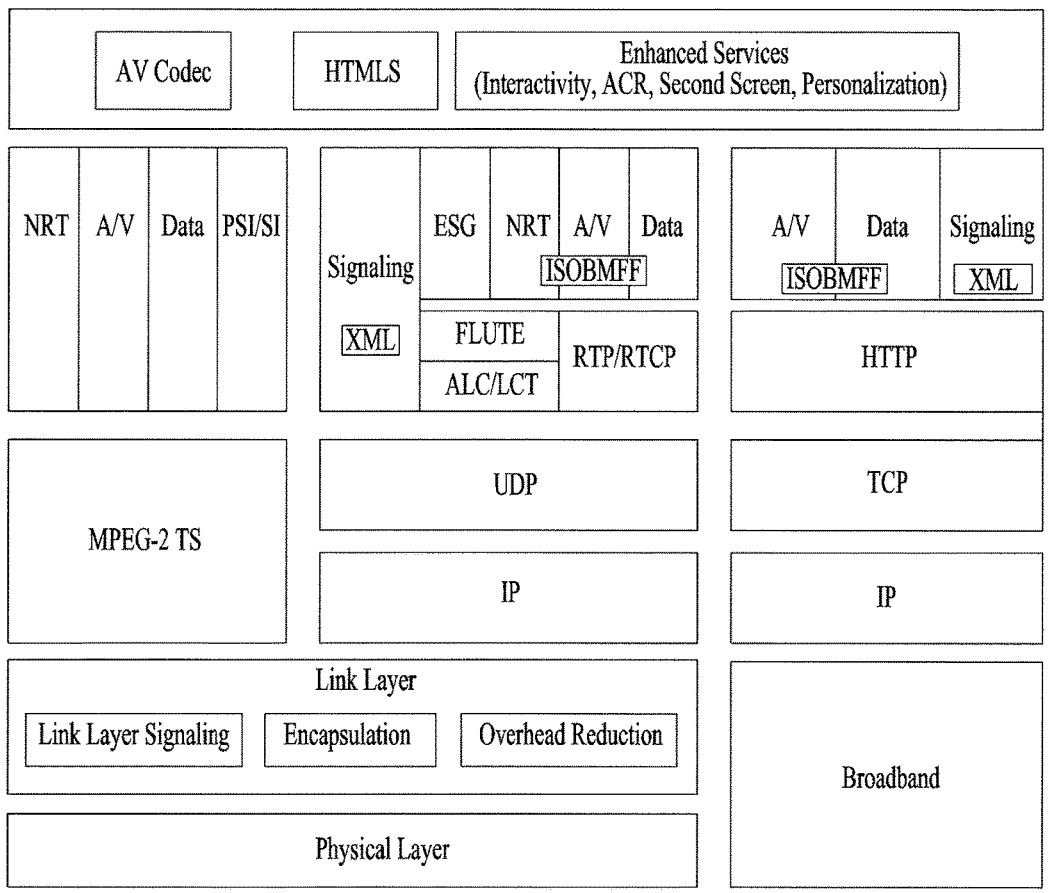
(a)
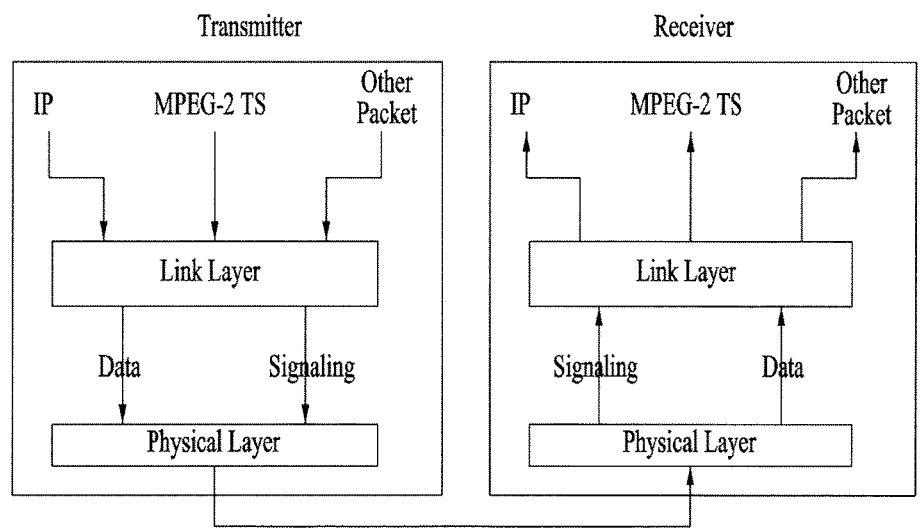
(b)

(a)

| Packet type Value | Meaning |
|---|---|
| 000 | IPv4 |
| 001 | Compressed IP Packet |
| 010 | MPEG-x Transport Stream |
| 011 | Reserved |
| 100 | L2 Signaling |
| 101 | Reserved |
| 110 | Reserved |
| 111 | Extension |

(b)

(a)

| HC mode | Description | Compression rate |
|---|---|---|
| 00 | HC mode 1 : sync byte deletion | 188 → 187 bytes |
| 01 | HC mode 2 : PID compression | 188 → 186 bytes |
| 10 | HC mode 3 : PID deletion | 188 → 185 byte |
| 11 | HC mode 4 : TS header deletion | 188 → 184 byte |

(b)

| NPD mode | Description |
|---|---|
| 00 | NPD is not used |
| 01 | NPD mode1 (every packet) |
| 10 | NPD mode2 (last packet - 1DNP) |
| 11 | NPD mode3 (last packet - 2DNP) |

| Sub PID | | Description | Actual PID |
|---|---|---|---|
| PSI indicator (1bit) | Index (7bit) | | |
| 1 | 000000 | PAT | 0x0000 |
| 1 | 000001 | CAT | 0x0001 |
| 1 | 000010 | TSDT | 0x0002 |
| 1 | 000011~000111 | reserved | |
| 1 | 001000 | NIT | 0x0010 |
| 1 | 001001 | SDT, BAT | 0x0011 |
| 1 | 001010 | EIT | 0x0012 |
| 1 | 001011 | RST | 0x0013 |
| 1 | 001100 | TDT,TOT | 0x0014 |
| 1 | 001101 | MIP | 0x0015 |
| 1 | 001110~111110 | reserved | |
| 1 | 111111 | Null Packet | 0x1FFF |
| 0 | -64~63 | PID offset | PID + index |

(a)

| Continuity counter sync flag | Continuity counter |
|---|---|
| 1 | 0000 |
| 0 | 0001 ~ 1111 |

| MODE | Node |
|---|---|
| 0 | One byte BB -frame header mode |
| 1 | Two byte BB -frame header mode |

(a)

| OPTI | Node |
|---|---|
| 00 | No OPTI field |
| 01 | One byte stuffing |
| 10 | Two byte stuffing |
| 11 | OPT field + stuffing |

| Field | bits | Comment (example) |
|---|---|---|
| data_type | 3bits | 0 (000b): TS<br>1 (001b) : IPv4<br>2 (010b) : IPv6<br>3 (011b): : GS<br>Others : reserved |
| extension_field_indicator | 1bit | 0: Not used<br>1:extension field present |
| If extension_field_indicator == '1' | | |
| extension _field_type | 4bit | 0 (0000b) : ISSY,<br>1 (0001b): CRC,<br>Others : reserved |
| extension _field_length | 13bit | Length of extension field in byte unit |
| end if | | |

(a)

| Field | bits | Comment (example) |
|---|---|---|
| data_type | 3bits | 0 (000b): TS<br>1 (001b) : IPv4<br>2 (010b) : IPv6<br>3 (011b): : GS<br>Others : reserved |
| extension_field_type | 4bit | 0 (0000b) : non extension mode<br>1 (0001b): ISSY<br>2 (0010b): CRC<br>Others : reserved |

| | | |
|---|---|---|
| 1st BB-Frame | BBF Header / Extension field | Payload |
| 2nd BB-Frame | BBF Header / Extension field | Payload |
| 3rd BB-Frame | BBF Header / Extension field | Payload |
| 4th BB-Frame | BBF Header / Extension field | Payload |
| 5th BB-Frame | BBF Header / Extension field | Payload |
| 6th BB-Frame | BBF Header / Extension field | Option field (Inband signaling) / Payload |
| 7th BB-Frame | BBF Header / Extension field | Option field (Stuffing) / Payload |

APPARATUS FOR TRANSMITTING BROADCAST SIGNALS, APPARATUS FOR RECEIVING BROADCAST SIGNALS, METHOD FOR TRANSMITTING BROADCAST SIGNALS AND METHOD FOR RECEIVING BROADCAST SIGNALS

CROSS-REFERENCE TO RELATED APPLICATIONS

This application is a Continuation of U.S. patent application Ser. No. 14/837,957, filed on Aug. 27, 2015 (now U.S. Pat. No. 9,614,642 issued on Apr. 4, 2017), which claims the benefit of U.S. Provisional Patent Application Nos. 62/126,690 and 62/098,348, filed on Mar. 1, 2015 and Dec. 31, 2014, respectively, all of which are hereby expressly incorporated by reference into the present application.

BACKGROUND OF THE INVENTION

The present invention relates to an apparatus for transmitting broadcast signals, an apparatus for receiving broadcast signals and methods for transmitting and receiving broadcast signals.

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

That is, a digital broadcast system can provide HD (high definition) images, multi-channel audio and various additional services. However, data transmission efficiency for transmission of large amounts of data, robustness of transmission/reception networks and network flexibility in consideration of mobile reception equipment need to be improved for digital broadcast.

SUMMARY OF THE INVENTION

Accordingly, the present invention is directed to an apparatus for transmitting broadcast signals and an apparatus for receiving broadcast signals for future broadcast services and methods for transmitting and receiving broadcast signals for future broadcast services.

An object of the present invention is to provide an apparatus and method for transmitting broadcast signals to multiplex data of a broadcast transmission/reception system providing two or more different broadcast services in a time domain and transmit the multiplexed data through the same RF signal bandwidth and an apparatus and method for receiving broadcast signals corresponding thereto.

Another object of the present invention is to provide an apparatus for transmitting broadcast signals, an apparatus for receiving broadcast signals and methods for transmitting and receiving broadcast signals to classify data corresponding to services by components, transmit data corresponding to each component as a data pipe, receive and process the data Still another object of the present invention is to provide an apparatus for transmitting broadcast signals, an apparatus for receiving broadcast signals and methods for transmitting and receiving broadcast signals to signal signaling information necessary to provide broadcast signals.

To achieve the object and other advantages and in accordance with the purpose of the invention, as embodied and broadly described herein, a method for receiving broadcast signals, the method comprises receiving the broadcast signals, demodulating the received broadcast signals by an OFDM (Orthogonal Frequency Division Multiplex) scheme, parsing a signal frame from the demodulated broadcast signals, decoding data in the parsed signal frame and output-processing the decoded data.

The present invention can process data according to service characteristics to control QoS (Quality of Services) for each service or service component, thereby providing various broadcast services.

The present invention can achieve transmission flexibility by transmitting various broadcast services through the same RF signal bandwidth.

The present invention can improve data transmission efficiency and increase robustness of transmission/reception of broadcast signals using a MIMO system.

According to the present invention, it is possible to provide broadcast signal transmission and reception methods and apparatus capable of receiving digital broadcast signals without error even with mobile reception equipment or in an indoor environment.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 13 illustrates PLS1 data according to an embodiment of the present invention.

FIG. 14 illustrates PLS2 data according to an embodiment of the present invention.

FIG. 25, including views (a), (b) and (c), illustrates a time interleaving according to an embodiment of the present invention.

FIG. 29 illustrates interleaved XFECBLOCKs from each interleaving array according to an embodiment of the present invention.

FIG. 30, including views (a) and (b), illustrates a protocol stack according to an embodiment of the present invention.

FIG. 39, including views (a) and (b), illustrates a compression scheme of the second header compression mode according to an embodiment of the present invention.

FIG. 50, and FIG. 51 including views (a) and (b), illustrate configurations of a baseband frame according to an embodiment of the present invention.

FIG. 53, including views (a) and (b), illustrates a signaling field that signals a configuration of a baseband frame according to an embodiment of the present invention.

FIG. 54 illustrates a configuration of a baseband frame according to an embodiment of the present invention.

DETAILED DESCRIPTION OF THE INVENTION

Figure 1:
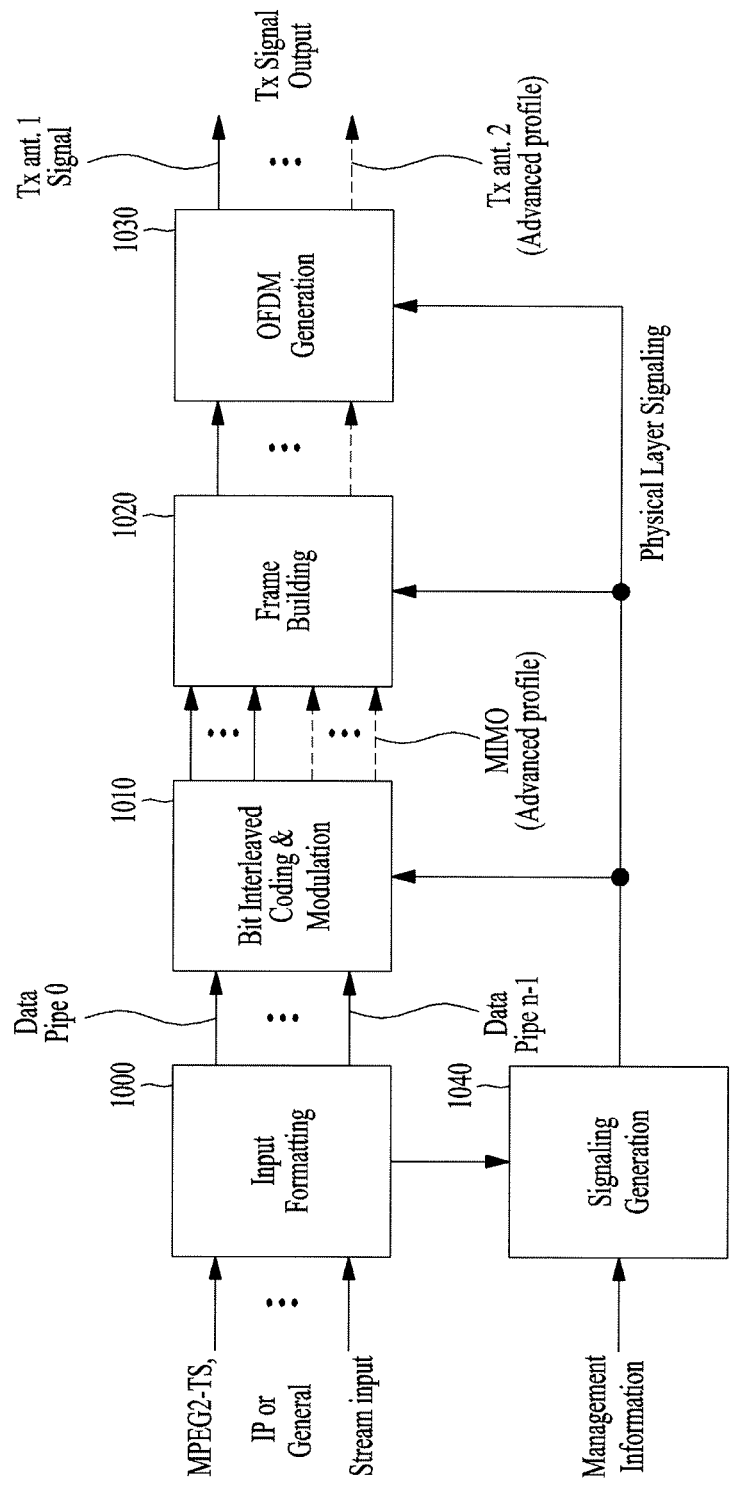
FIG. 1 illustrates a structure of an apparatus for transmitting broadcast signals for future broadcast services according to an embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

While MISO or MIMO uses two antennas in the following for convenience of description, the present invention is applicable to systems using two or more antennas.

The present invention may defines three physical layer (PL) profiles—base, handheld and advanced profiles—each optimized to minimize receiver complexity while attaining the performance required for a particular use case. The physical layer (PHY) profiles are subsets of all configurations that a corresponding receiver should implement.

The three PHY profiles share most of the functional blocks but differ slightly in specific blocks and/or parameters. Additional PHY profiles can be defined in the future. For the system evolution, future profiles can also be multiplexed with the existing profiles in a single RF channel through a future extension frame (FEF). The details of each PHY profile are described below.

1. Base Profile

The base profile represents a main use case for fixed receiving devices that are usually connected to a roof-top antenna. The base profile also includes portable devices that could be transported to a place but belong to a relatively stationary reception category. Use of the base profile could be extended to handheld devices or even vehicular by some improved implementations, but those use cases are not expected for the base profile receiver operation.

Target SNR range of reception is from approximately 10 to 20 dB, which includes the 15 dB SNR reception capability of the existing broadcast system (e.g. ATSC A/53). The receiver complexity and power consumption is not as critical as in the battery-operated handheld devices, which will use the handheld profile. Key system parameters for the base profile are listed in below table 1.

TABLE 1

| | |
|---|---|
| LDPC codeword length | 16K, 64K bits |
| Constellation size | 4~10 bpcu (bits per channel use) |
| Time de-interleaving memory size | $\leq 2^{19}$ data cells |
| Pilot patterns | Pilot pattern for fixed reception |
| FFT size | 16K, 32K points |

2. Handheld Profile

The handheld profile is designed for use in handheld and vehicular devices that operate with battery power. The devices can be moving with pedestrian or vehicle speed. The power consumption as well as the receiver complexity is very important for the implementation of the devices of the handheld profile. The target SNR range of the handheld profile is approximately 0 to 10 dB, but can be configured to reach below 0 dB when intended for deeper indoor reception.

In addition to low SNR capability, resilience to the Doppler Effect caused by receiver mobility is the most important performance attribute of the handheld profile. Key system parameters for the handheld profile are listed in the below table 2.

TABLE 2

| | |
|---|---|
| LDPC codeword length | 16K bits |
| Constellation size | 2~8 bpcu |
| Time de-interleaving memory size | $\leq 2^{18}$ data cells |
| Pilot patterns | Pilot patterns for mobile and indoor reception |
| FFT size | 8K, 16K points |

3. Advanced Profile

The advanced profile provides highest channel capacity at the cost of more implementation complexity. This profile requires using MIMO transmission and reception, and UHDTV service is a target use case for which this profile is specifically designed. The increased capacity can also be used to allow an increased number of services in a given bandwidth, e.g., multiple SDTV or HDTV services.

The target SNR range of the advanced profile is approximately 20 to 30 dB. MIMO transmission may initially use existing elliptically-polarized transmission equipment, with extension to full-power cross-polarized transmission in the future. Key system parameters for the advanced profile are listed in below table 3.

TABLE 3

| | |
|---|---|
| LDPC codeword length | 16K, 64K bits |
| Constellation size | 8~12 bpcu |
| Time de-interleaving memory size | $\leq 2^{19}$ data cells |
| Pilot patterns | Pilot pattern for fixed reception |
| FFT size | 16K, 32K points |

In this case, the base profile can be used as a profile for both the terrestrial broadcast service and the mobile broadcast service. That is, the base profile can be used to define a concept of a profile which includes the mobile profile. Also, the advanced profile can be divided advanced profile for a base profile with MIMO and advanced profile for a handheld profile with MIMO. Moreover, the three profiles can be changed according to intention of the designer.

The following terms and definitions may apply to the present invention. The following terms and definitions can be changed according to design.

auxiliary stream: sequence of cells carrying data of as yet undefined modulation and coding, which may be used for future extensions or as required by broadcasters or network operators base data pipe: data pipe that carries service signaling data baseband frame (or BBFRAME): set of Kbch bits which form the input to one FEC encoding process (BCH and LDPC encoding)

cell: modulation value that is carried by one carrier of the OFDM transmission coded block: LDPC-encoded block of PLS1 data or one of the LDPC-encoded blocks of PLS2 data data pipe: logical channel in the physical layer that carries service data or related metadata, which may carry one or multiple service(s) or service component(s).

data pipe unit: a basic unit for allocating data cells to a DP in a frame.

data symbol: OFDM symbol in a frame which is not a preamble symbol (the frame signaling symbol and frame edge symbol is included in the data symbol)

DP_ID: this 8-bit field identifies uniquely a DP within the system identified by the SYSTEM_ID dummy cell: cell carrying a pseudo-random value used to fill the remaining capacity not used for PLS signaling, DPs or auxiliary streams emergency alert channel: part of a frame that carries EAS information data frame: physical layer time slot that starts with a preamble and ends with a frame edge symbol frame repetition unit: a set of frames belonging to same or different physical layer profile including a FEF, which is repeated eight times in a super-frame fast information channel: a logical channel in a frame that carries the mapping information between a service and the corresponding base DP FECBLOCK: set of LDPC-encoded bits of a DP data FFT size: nominal FFT size used for a particular mode, equal to the active symbol period Ts expressed in cycles of the elementary period T frame signaling symbol: OFDM symbol with higher pilot density used at the start of a frame in certain combinations of FFT size, guard interval and scattered pilot pattern, which carries a part of the PLS data frame edge symbol: OFDM symbol with higher pilot density used at the end of a frame in certain combinations of FFT size, guard interval and scattered pilot pattern frame-group: the set of all the frames having the same PHY profile type in a super-frame.

future extension frame: physical layer time slot within the super-frame that could be used for future extension, which starts with a preamble Futurecast UTB system: proposed physical layer broadcasting system, of which the input is one or more MPEG2-TS or IP or general stream(s) and of which the output is an RF signal input stream: A stream of data for an ensemble of services delivered to the end users by the system.

normal data symbol: data symbol excluding the frame signaling symbol and the frame edge symbol PHY profile: subset of all configurations that a corresponding receiver should implement PLS: physical layer signaling data consisting of PLS1 and PLS2

PLS1: a first set of PLS data carried in the FSS symbols having a fixed size, coding and modulation, which carries basic information about the system as well as the parameters needed to decode the PLS2

NOTE: PLS1 data remains constant for the duration of a frame-group.

PLS2: a second set of PLS data transmitted in the FSS symbol, which carries more detailed PLS data about the system and the DPs PLS2 dynamic data: PLS2 data that may dynamically change frame-by-frame PLS2 static data: PLS2 data that remains static for the duration of a frame-group preamble signaling data: signaling data carried by the preamble symbol and used to identify the basic mode of the system preamble symbol: fixed-length pilot symbol that carries basic PLS data and is located in the beginning of a frame NOTE: The preamble symbol is mainly used for fast initial band scan to detect the system signal, its timing, frequency offset, and FFT-size.

reserved for future use: not defined by the present document but may be defined in future super-frame: set of eight frame repetition units time interleaving block (TI block): set of cells within which time interleaving is carried out, corresponding to one use of the time interleaver memory TI group: unit over which dynamic capacity allocation for a particular DP is carried out, made up of an integer, dynamically varying number of XFECBLOCKs NOTE: The TI group may be mapped directly to one frame or may be mapped to multiple frames. It may contain one or more TI blocks.

Type 1 DP: DP of a frame where all DPs are mapped into the frame in TDM fashion

Type 2 DP: DP of a frame where all DPs are mapped into the frame in FDM fashion

XFECBLOCK: set of Ncells cells carrying all the bits of one LDPC FECBLOCK

FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting block 1000, a BICM (Bit interleaved coding & modulation) block 1010, a frame building block 1020, an OFDM (Orthogonal Frequency Division Multiplexing) generation block 1030 and a signaling generation block 1040. A description will be given of the operation of each module of the apparatus for transmitting broadcast signals.

IP stream/packets and MPEG2-TS are the main input formats, other stream types are handled as General Streams. In addition to these data inputs, Management Information is input to control the scheduling and allocation of the corresponding bandwidth for each input stream. One or multiple TS stream(s), IP stream(s) and/or General Stream(s) inputs are simultaneously allowed.

The input formatting block 1000 can demultiplex each input stream into one or multiple data pipe(s), to each of which an independent coding and modulation is applied. The data pipe (DP) is the basic unit for robustness control, thereby affecting quality-of-service (QoS). One or multiple service(s) or service component(s) can be carried by a single DP. Details of operations of the input formatting block 1000 will be described later.

The data pipe is a logical channel in the physical layer that carries service data or related metadata, which may carry one or multiple service(s) or service component(s).

Also, the data pipe unit: a basic unit for allocating data cells to a DP in a frame.

In the BICM block 1010, parity data is added for error correction and the encoded bit streams are mapped to complex-value constellation symbols. The symbols are interleaved across a specific interleaving depth that is used for the corresponding DP. For the advanced profile, MIMO encoding is performed in the BICM block 1010 and the additional data path is added at the output for MIMO transmission. Details of operations of the BICM block 1010 will be described later.

The Frame Building block 1020 can map the data cells of the input DPs into the OFDM symbols within a frame. After mapping, the frequency interleaving is used for frequency-domain diversity, especially to combat frequency-selective fading channels. Details of operations of the Frame Building block 1020 will be described later.

After inserting a preamble at the beginning of each frame, the OFDM Generation block 1030 can apply conventional OFDM modulation having a cyclic prefix as guard interval. For antenna space diversity, a distributed MISO scheme is applied across the transmitters. In addition, a Peak-to-Average Power Reduction (PAPR) scheme is performed in the time domain. For flexible network planning, this proposal provides a set of various FFT sizes, guard interval lengths and corresponding pilot patterns. Details of operations of the OFDM Generation block 1030 will be described later.

The Signaling Generation block 1040 can create physical layer signaling information used for the operation of each functional block. This signaling information is also transmitted so that the services of interest are properly recovered at the receiver side. Details of operations of the Signaling Generation block 1040 will be described later.

Figure 2:
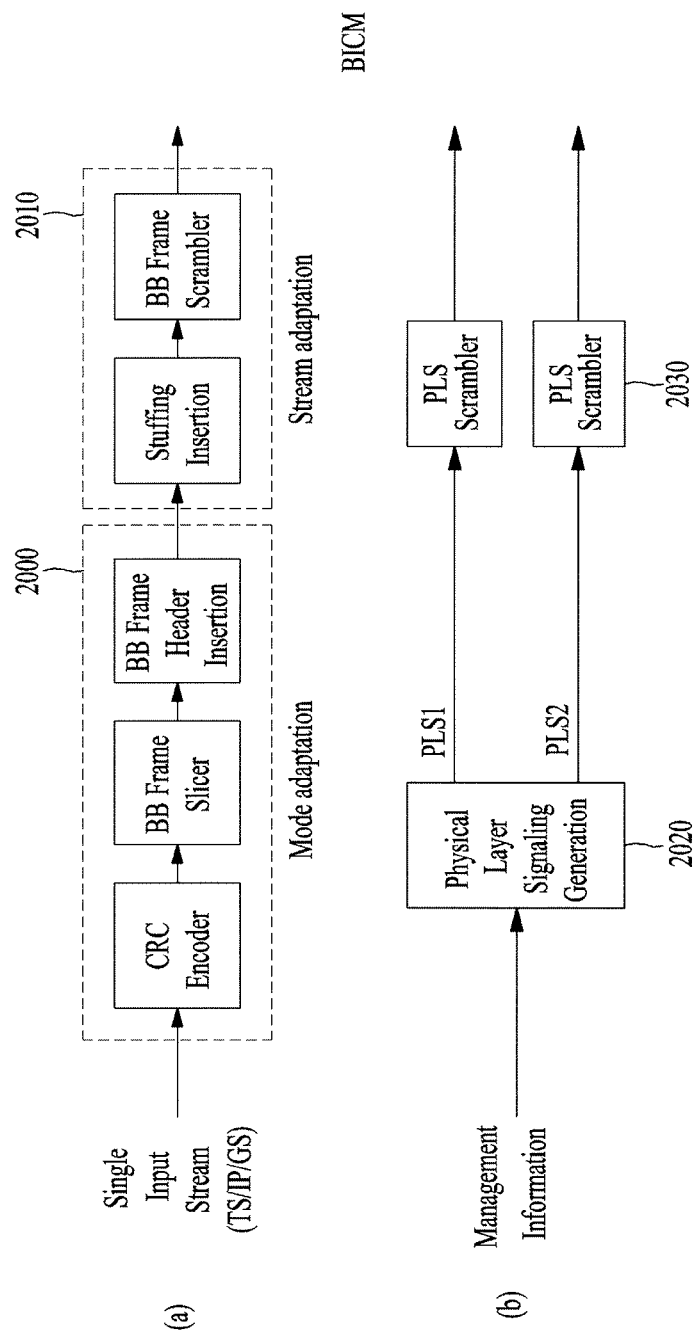
FIG. 2, including views (a) and (b), illustrates an input formatting block according to one embodiment of the present invention.
Figure 3:
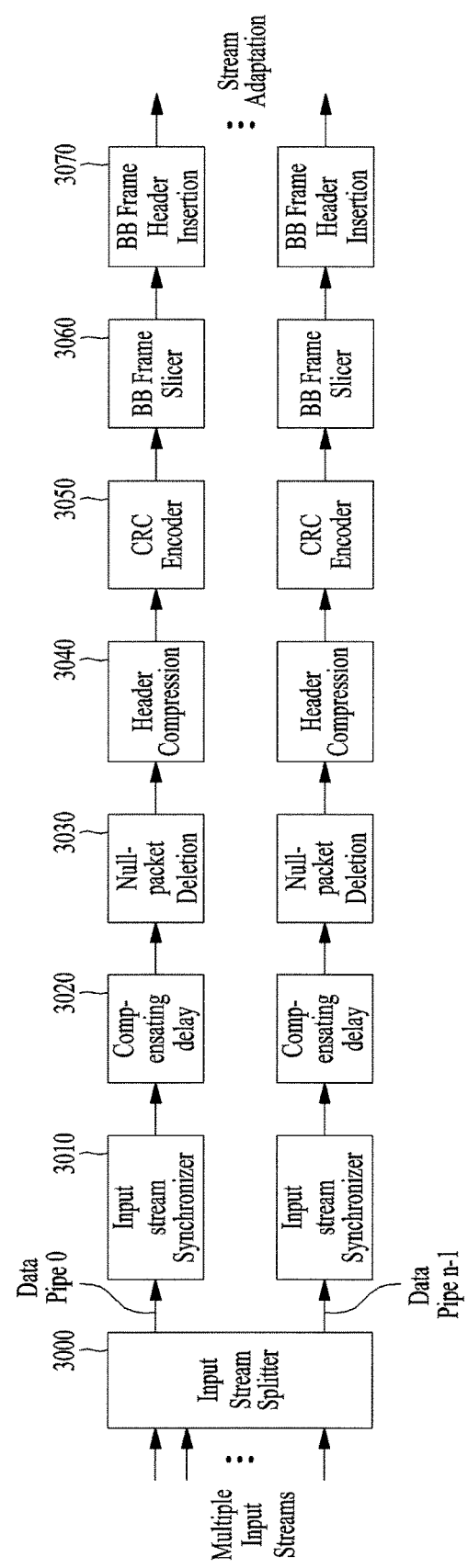
FIG. 3 illustrates an input formatting block according to another embodiment of the present invention.
Figure 4:
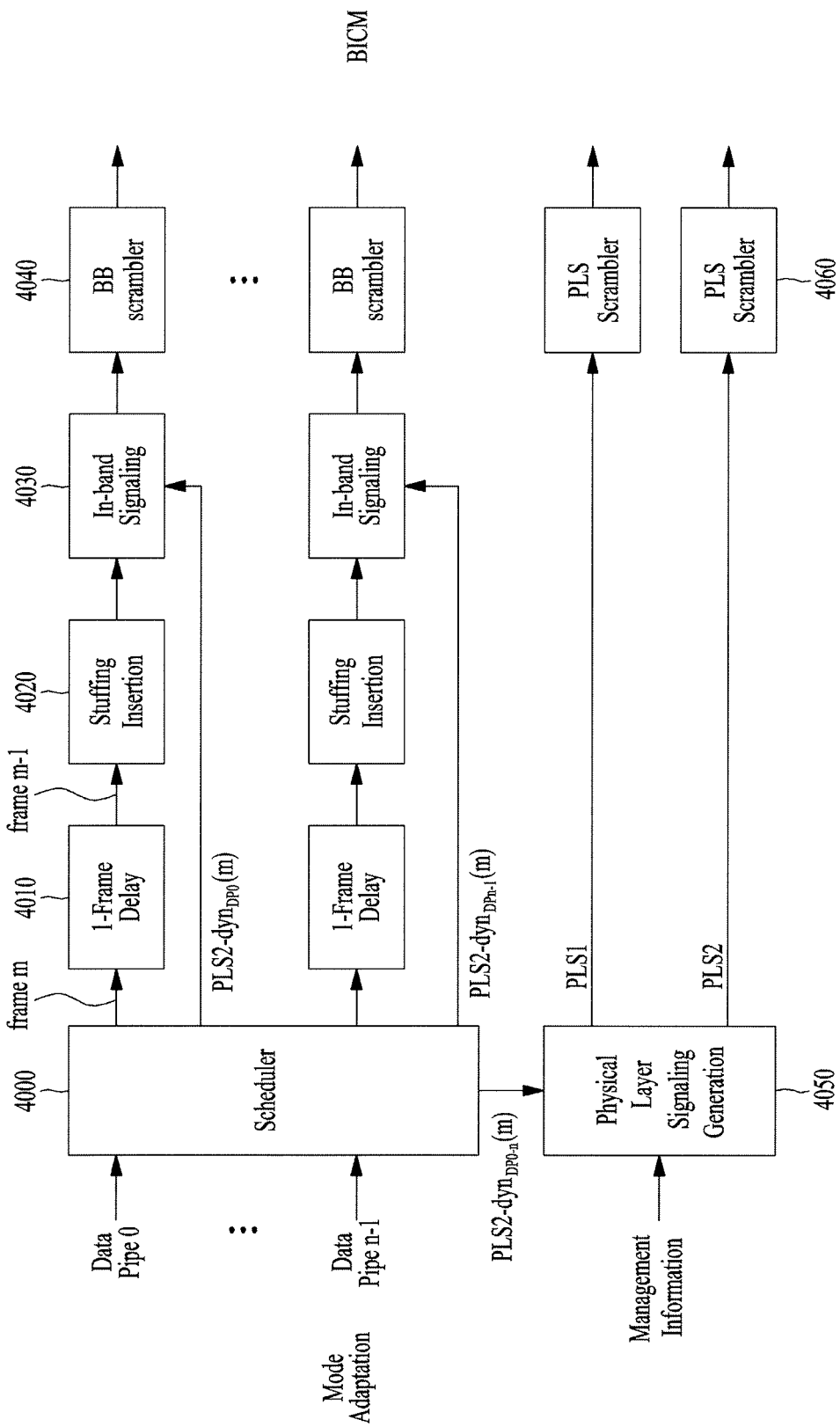
FIG. 4 illustrates an input formatting block according to another embodiment of the present invention.

FIGS. 2, 3 and 4 illustrate the input formatting block 1000 according to embodiments of the present invention. A description will be given of each figure.

FIG. 2 including views (a) and (b), illustrates an input formatting block according to one embodiment of the present invention. FIG. 2 shows an input formatting module when the input signal is a single input stream.

The input formatting block illustrated in FIG. 2 corresponds to an embodiment of the input formatting block 1000 described with reference to FIG. 1.

The input to the physical layer may be composed of one or multiple data streams. Each data stream is carried by one DP. The mode adaptation modules slice the incoming data stream into data fields of the baseband frame (BBF). The system supports three types of input data streams: MPEG2-TS, Internet protocol (IP) and Generic stream (GS). MPEG2-TS is characterized by fixed length (188 byte) packets with the first byte being a sync-byte (0x47). An IP stream is composed of variable length IP datagram packets, as signaled within IP packet headers. The system supports both IPv4 and IPv6 for the IP stream. GS may be composed of variable length packets or constant length packets, signaled within encapsulation packet headers.

FIG. 2(*a*) shows a mode adaptation block 2000 and a stream adaptation 2010 for signal DP and FIG. 2(*b*) shows a PLS generation block 2020 and a PLS scrambler 2030 for generating and processing PLS data. A description will be given of the operation of each block.

The Input Stream Splitter splits the input TS, IP, GS streams into multiple service or service component (audio, video, etc.) streams. The mode adaptation module 2010 is comprised of a CRC Encoder, BB (baseband) Frame Slicer, and BB Frame Header Insertion block.

The CRC Encoder provides three kinds of CRC encoding for error detection at the user packet (UP) level, i.e., CRC-8, CRC-16, and CRC-32. The computed CRC bytes are appended after the UP. CRC-8 is used for TS stream and CRC-32 for IP stream. If the GS stream doesn't provide the CRC encoding, the proposed CRC encoding should be applied.

BB Frame Slicer maps the input into an internal logical-bit format. The first received bit is defined to be the MSB. The BB Frame Slicer allocates a number of input bits equal to the available data field capacity. To allocate a number of input bits equal to the BBF payload, the UP packet stream is sliced to fit the data field of BBF.

BB Frame Header Insertion block can insert fixed length BBF header of 2 bytes is inserted in front of the BB Frame. The BBF header is composed of STUFFI (1 bit), SYNCD (13 bits), and RFU (2 bits). In addition to the fixed 2-Byte BBF header, BBF can have an extension field (1 or 3 bytes) at the end of the 2-byte BBF header.

The stream adaptation 2010 is comprised of stuffing insertion block and BB scrambler.

The stuffing insertion block can insert stuffing field into a payload of a BB frame. If the input data to the stream adaptation is sufficient to fill a BB-Frame, STUFFI is set to '0' and the BBF has no stuffing field. Otherwise STUFFI is set to '1' and the stuffing field is inserted immediately after the BBF header. The stuffing field comprises two bytes of the stuffing field header and a variable size of stuffing data.

The BB scrambler scrambles complete BBF for energy dispersal. The scrambling sequence is synchronous with the BBF. The scrambling sequence is generated by the feedback shift register.

The PLS generation block 2020 can generate physical layer signaling (PLS) data. The PLS provides the receiver with a means to access physical layer DPs. The PLS data consists of PLS1 data and PLS2 data.

The PLS1 data is a first set of PLS data carried in the FSS symbols in the frame having a fixed size, coding and modulation, which carries basic information about the system as well as the parameters needed to decode the PLS2 data. The PLS1 data provides basic transmission parameters including parameters required to enable the reception and decoding of the PLS2 data. Also, the PLS1 data remains constant for the duration of a frame-group.

The PLS2 data is a second set of PLS data transmitted in the FSS symbol, which carries more detailed PLS data about the system and the DPs. The PLS2 contains parameters that provide sufficient information for the receiver to decode the desired DP. The PLS2 signaling further consists of two types of parameters, PLS2 Static data (PLS2-STAT data) and PLS2 dynamic data (PLS2-DYN data). The PLS2 Static data is PLS2 data that remains static for the duration of a frame-group and the PLS2 dynamic data is PLS2 data that may dynamically change frame-by-frame.

Details of the PLS data will be described later.

The PLS scrambler 2030 can scramble the generated PLS data for energy dispersal.

The above-described blocks may be omitted or replaced by blocks having similar or identical functions.

FIG. 3 illustrates an input formatting block according to another embodiment of the present invention.

The input formatting block illustrated in FIG. 3 corresponds to an embodiment of the input formatting block 1000 described with reference to FIG. 1.

FIG. 3 shows a mode adaptation block of the input formatting block when the input signal corresponds to multiple input streams.

The mode adaptation block of the input formatting block for processing the multiple input streams can independently process the multiple input streams.

Referring to FIG. 3, the mode adaptation block for respectively processing the multiple input streams can include an input stream splitter 3000, an input stream synchronizer 3010, a compensating delay block 3020, a null packet deletion block 3030, a head compression block 3040, a CRC encoder 3050, a BB frame slicer 3060 and a BB header insertion block 3070. Description will be given of each block of the mode adaptation block.

Operations of the CRC encoder 3050, BB frame slicer 3060 and BB header insertion block 3070 correspond to those of the CRC encoder, BB frame slicer and BB header insertion block described with reference to FIG. 2 and thus description thereof is omitted.

The input stream splitter 3000 can split the input TS, IP, GS streams into multiple service or service component (audio, video, etc.) streams.

The input stream synchronizer 3010 may be referred as ISSY. The ISSY can provide suitable means to guarantee Constant Bit Rate (CBR) and constant end-to-end transmission delay for any input data format. The ISSY is always used for the case of multiple DPs carrying TS, and optionally used for multiple DPs carrying GS streams.

The compensating delay block 3020 can delay the split TS packet stream following the insertion of ISSY information to allow a TS packet recombining mechanism without requiring additional memory in the receiver.

The null packet deletion block 3030, is used only for the TS input stream case. Some TS input streams or split TS streams may have a large number of null-packets present in order to accommodate VBR (variable bit-rate) services in a CBR TS stream. In this case, in order to avoid unnecessary transmission overhead, null-packets can be identified and not transmitted. In the receiver, removed null-packets can be re-inserted in the exact place where they were originally by reference to a deleted null-packet (DNP) counter that is inserted in the transmission, thus guaranteeing constant bit-rate and avoiding the need for time-stamp (PCR) updating.

The head compression block 3040 can provide packet header compression to increase transmission efficiency for TS or IP input streams. Because the receiver can have a priori information on certain parts of the header, this known information can be deleted in the transmitter.

For Transport Stream, the receiver has a-priori information about the sync-byte configuration (0x47) and the packet length (188 Byte). If the input TS stream carries content that has only one PID, i.e., for only one service component (video, audio, etc.) or service sub-component (SVC base layer, SVC enhancement layer, MVC base view or MVC dependent views), TS packet header compression can be applied (optionally) to the Transport Stream. IP packet header compression is used optionally if the input steam is an IP stream.

The above-described blocks may be omitted or replaced by blocks having similar or identical functions.

FIG. 4 illustrates an input formatting block according to another embodiment of the present invention.

The input formatting block illustrated in FIG. 4 corresponds to an embodiment of the input formatting block 1000 described with reference to FIG. 1.

FIG. 4 illustrates a stream adaptation block of the input formatting module when the input signal corresponds to multiple input streams.

Referring to FIG. 4, the mode adaptation block for respectively processing the multiple input streams can include a scheduler 4000, an 1-Frame delay block 4010, a stuffing insertion block 4020, an in-band signaling 4030, a BB Frame scrambler 4040, a PLS generation block 4050 and a PLS scrambler 4060. Description will be given of each block of the stream adaptation block.

Operations of the stuffing insertion block 4020, the BB Frame scrambler 4040, the PLS generation block 4050 and the PLS scrambler 4060 correspond to those of the stuffing insertion block, BB scrambler, PLS generation block and the PLS scrambler described with reference to FIG. 2 and thus description thereof is omitted.

The scheduler 4000 can determine the overall cell allocation across the entire frame from the amount of FECBLOCKs of each DP. Including the allocation for PLS, EAC and FIC, the scheduler generate the values of PLS2-DYN data, which is transmitted as in-band signaling or PLS cell in FSS of the frame. Details of FECBLOCK, EAC and FIC will be described later.

The 1-Frame delay block 4010 can delay the input data by one transmission frame such that scheduling information about the next frame can be transmitted through the current frame for in-band signaling information to be inserted into the DPs.

The in-band signaling 4030 can insert un-delayed part of the PLS2 data into a DP of a frame.

The above-described blocks may be omitted or replaced by blocks having similar or identical functions.

Figure 5:
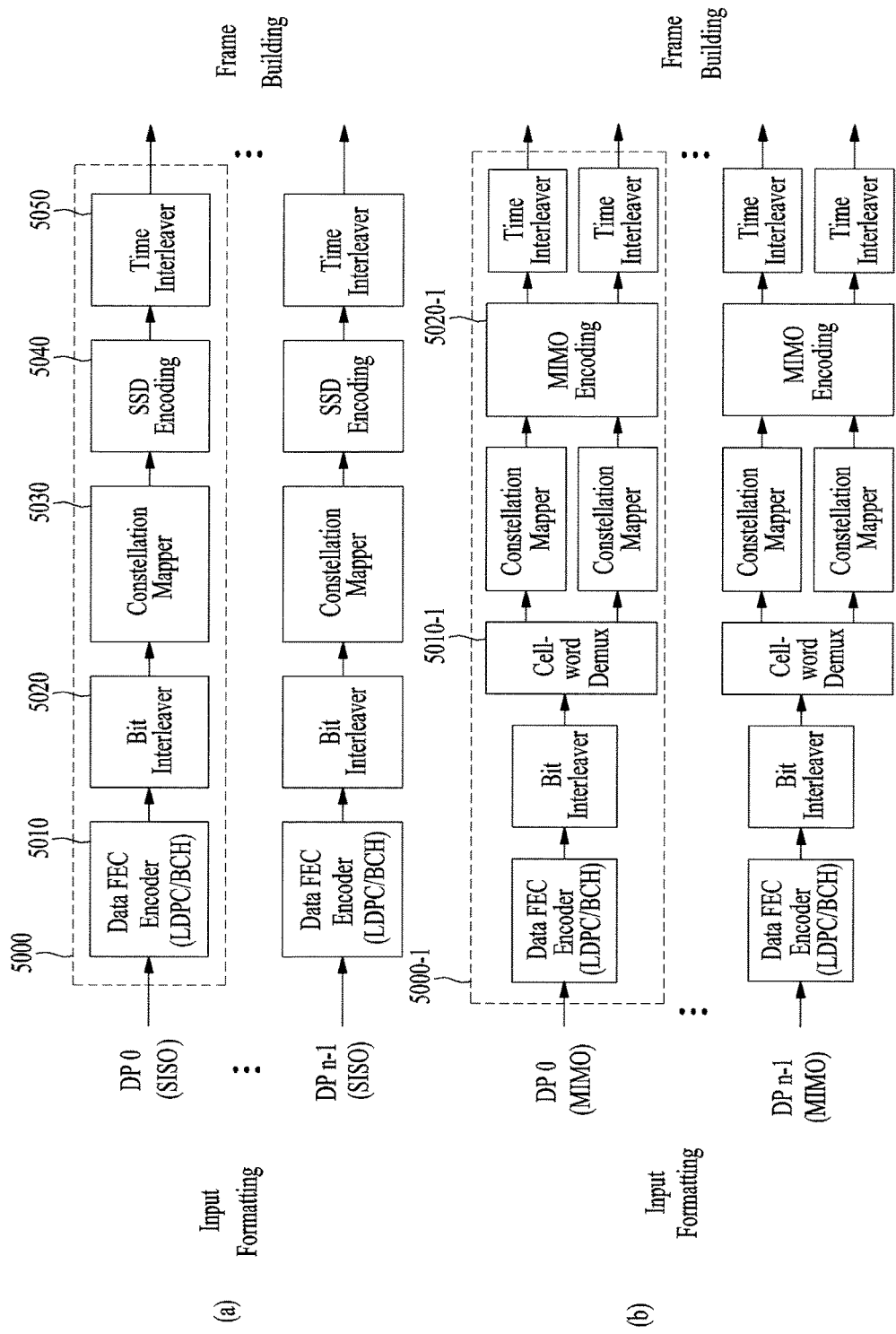
FIG. 5, including views (a) and (b), illustrates a BICM block according to an embodiment of the present invention.

FIG. 5 including views (a) and (b), illustrates a BICM block according to an embodiment of the present invention.

The BICM block illustrated in FIG. 5 corresponds to an embodiment of the BICM block 1010 described with reference to FIG. 1.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the a BICM block according to an embodiment of the present invention can independently process DPs input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each DP.

FIG. 5(a) shows the BICM block shared by the base profile and the handheld profile and FIG. 5(b) shows the BICM block of the advanced profile.

The BICM block shared by the base profile and the handheld profile and the BICM block of the advanced profile can include plural processing blocks for processing each DP.

A description will be given of each processing block of the BICM block for the base profile and the handheld profile and the BICM block for the advanced profile.

A processing block 5000 of the BICM block for the base profile and the handheld profile can include a Data FEC encoder 5010, a bit interleaver 5020, a constellation mapper 5030, an SSD (Signal Space Diversity) encoding block 5040 and a time interleaver 5050.

The Data FEC encoder 5010 can perform the FEC encoding on the input BBF to generate FECBLOCK procedure using outer coding (BCH), and inner coding (LDPC). The outer coding (BCH) is optional coding method. Details of operations of the Data FEC encoder 5010 will be described later.

The bit interleaver 5020 can interleave outputs of the Data FEC encoder 5010 to achieve optimized performance with combination of the LDPC codes and modulation scheme while providing an efficiently implementable structure. Details of operations of the bit interleaver 5020 will be described later.

The constellation mapper 5030 can modulate each cell word from the bit interleaver 5020 in the base and the handheld profiles, or cell word from the Cell-word demultiplexer 5010-1 in the advanced profile using either QPSK, QAM-16, non-uniform QAM (NUQ-64, NUQ-256, NUQ-1024) or non-uniform constellation (NUC-16, NUC-64, NUC-256, NUC-1024) to give a power-normalized constellation point, el. This constellation mapping is applied only for DPs. Observe that QAM-16 and NUQs are square shaped, while NUCs have arbitrary shape. When each constellation is rotated by any multiple of 90 degrees, the rotated constellation exactly overlaps with its original one. This "rotation-sense" symmetric property makes the capacities and the average powers of the real and imaginary components equal to each other. Both NUQs and NUCs are defined specifically for each code rate and the particular one used is signaled by the parameter DP_MOD filed in PLS2 data.

The SSD encoding block 5040 can precode cells in two (2D), three (3D), and four (4D) dimensions to increase the reception robustness under difficult fading conditions.

The time interleaver 5050 can operates at the DP level. The parameters of time interleaving (TI) may be set differently for each DP. Details of operations of the time interleaver 5050 will be described later.

A processing block 5000-1 of the BICM block for the advanced profile can include the Data FEC encoder, bit interleaver, constellation mapper, and time interleaver. However, the processing block 5000-1 is distinguished from the processing block 5000 further includes a cell-word demultiplexer 5010-1 and a MIMO encoding block 5020-1.

Also, the operations of the Data FEC encoder, bit interleaver, constellation mapper, and time interleaver in the processing block 5000-1 correspond to those of the Data FEC encoder 5010, bit interleaver 5020, constellation mapper 5030, and time interleaver 5050 described and thus description thereof is omitted.

The cell-word demultiplexer 5010-1 is used for the DP of the advanced profile to divide the single cell-word stream into dual cell-word streams for MIMO processing. Details of operations of the cell-word demultiplexer 5010-1 will be described later.

The MIMO encoding block 5020-1 can processing the output of the cell-word demultiplexer 5010-1 using MIMO encoding scheme. The MIMO encoding scheme was optimized for broadcasting signal transmission. The MIMO technology is a promising way to get a capacity increase but it depends on channel characteristics. Especially for broadcasting, the strong LOS component of the channel or a difference in the received signal power between two antennas caused by different signal propagation characteristics makes it difficult to get capacity gain from MIMO. The proposed MIMO encoding scheme overcomes this problem using a rotation-based pre-coding and phase randomization of one of the MIMO output signals.

MIMO encoding is intended for a 2×2 MIMO system requiring at least two antennas at both the transmitter and the receiver. Two MIMO encoding modes are defined in this proposal; full-rate spatial multiplexing (FR-SM) and full-rate full-diversity spatial multiplexing (FRFD-SM). The FR-SM encoding provides capacity increase with relatively small complexity increase at the receiver side while the FRFD-SM encoding provides capacity increase and additional diversity gain with a great complexity increase at the receiver side. The proposed MIMO encoding scheme has no restriction on the antenna polarity configuration.

MIMO processing is required for the advanced profile frame, which means all DPs in the advanced profile frame are processed by the MIMO encoder. MIMO processing is applied at DP level. Pairs of the Constellation Mapper outputs NUQ (e1,i and e2,i) are fed to the input of the MIMO Encoder. Paired MIMO Encoder output (g1,i and g2,i) is transmitted by the same carrier k and OFDM symbol l of their respective TX antennas.

The above-described blocks may be omitted or replaced by blocks having similar or identical functions.

Figure 6:
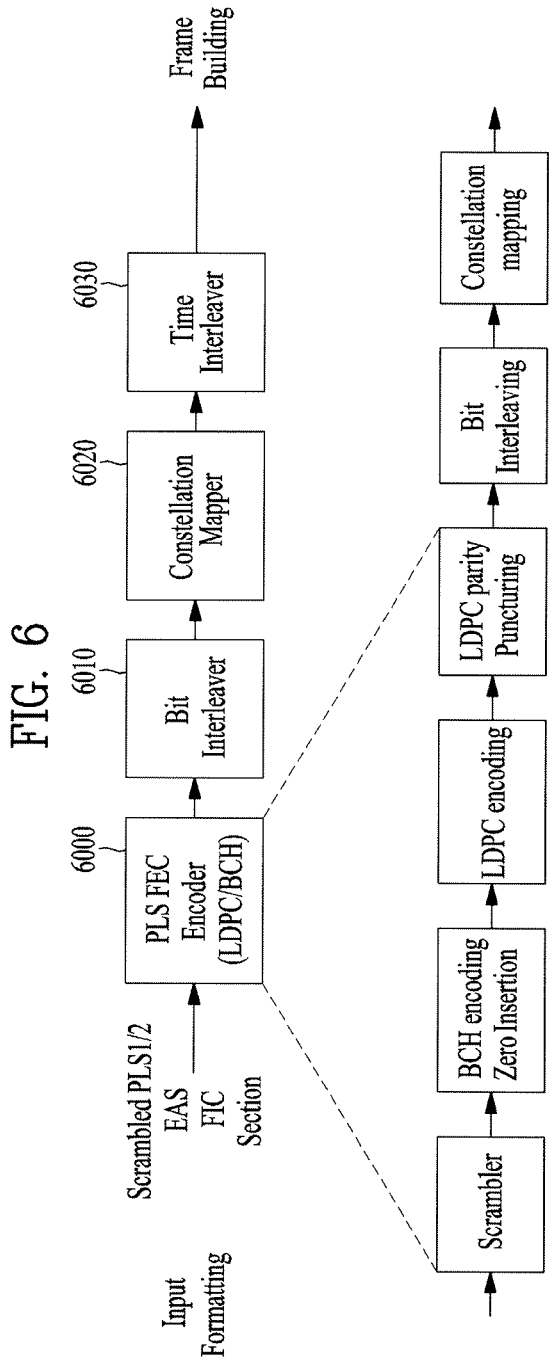
FIG. 6 illustrates a BICM block according to another embodiment of the present invention.

FIG. 6 illustrates a BICM block according to another embodiment of the present invention.

The BICM block illustrated in FIG. 6 corresponds to an embodiment of the BICM block 1010 described with reference to FIG. 1.

FIG. 6 illustrates a BICM block for protection of physical layer signaling (PLS), emergency alert channel (EAC) and fast information channel (FIC). EAC is a part of a frame that carries EAS information data and FIC is a logical channel in a frame that carries the mapping information between a service and the corresponding base DP. Details of the EAC and FIC will be described later.

Referring to FIG. 6, the BICM block for protection of PLS, EAC and FIC can include a PLS FEC encoder 6000, a bit interleaver 6010 and a constellation mapper 6020.

Also, the PLS FEC encoder 6000 can include a scrambler, BCH encoding/zero insertion block, LDPC encoding block and LDPC parity puncturing block. Description will be given of each block of the BICM block.

The PLS FEC encoder 6000 can encode the scrambled PLS 1/2 data, EAC and FIC section.

The scrambler can scramble PLS1 data and PLS2 data before BCH encoding and shortened and punctured LDPC encoding.

The BCH encoding/zero insertion block can perform outer encoding on the scrambled PLS 1/2 data using the shortened BCH code for PLS protection and insert zero bits after the BCH encoding. For PLS1 data only, the output bits of the zero insertion may be permutted before LDPC encoding.

The LDPC encoding block can encode the output of the BCH encoding/zero insertion block using LDPC code. To generate a complete coded block, Cldpc, parity bits, Pldpc are encoded systematically from each zero-inserted PLS information block, Ildpc and appended after it.

$$C_{ldpc} = [I_{ldpc} P_{ldpc}] = [i_0, i_1, \ldots, i_{K_{ldpc}-1}, p_0, p_1, \ldots, p_{N_{ldpc}-K_{ldpc}-1}]$$ [Math figure 1]

The LDPC code parameters for PLS1 and PLS2 are as following table 4.

TABLE 4

| Signaling Type | $K_{sig}$ | $K_{bch}$ | $N_{bch\_parity}$ | $K_{ldpc}$ $(=N_{bch})$ | $N_{ldpc}$ | $N_{ldpc\_parity}$ | code rate | $Q_{ldpc}$ |
|---|---|---|---|---|---|---|---|---|
| PLS1 | 342 | 1020 | 60 | 1080 | 4320 | 3240 | 1/4 | 36 |
| PLS2 <1021 |  |  |  |  |  |  |  |  |
| >1020 |  | 2100 |  | 2160 | 7200 | 5040 | 3/10 | 56 |

The LDPC parity puncturing block can perform puncturing on the PLS1 data and PLS 2 data.

When shortening is applied to the PLS1 data protection, some LDPC parity bits are punctured after LDPC encoding. Also, for the PLS2 data protection, the LDPC parity bits of PLS2 are punctured after LDPC encoding. These punctured bits are not transmitted.

The bit interleaver 6010 can interleave the each shortened and punctured PLS1 data and PLS2 data.

The constellation mapper 6020 can map the bit interleaved PLS1 data and PLS2 data onto constellations.

The above-described blocks may be omitted or replaced by blocks having similar or identical functions.

Figure 7:
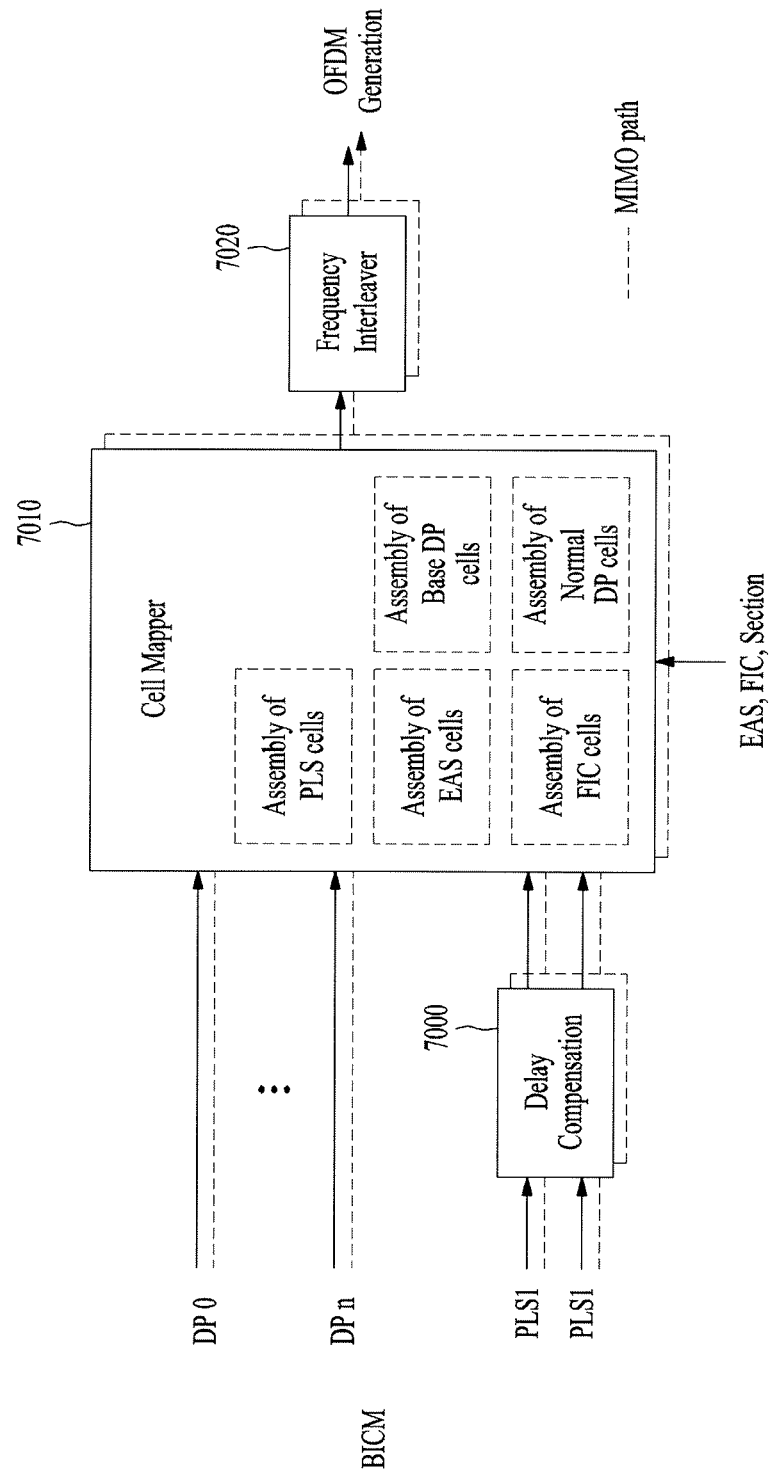
FIG. 7 illustrates a frame building block according to one embodiment of the present invention.

FIG. 7 illustrates a frame building block according to one embodiment of the present invention.

The frame building block illustrated in FIG. 7 corresponds to an embodiment of the frame building block 1020 described with reference to FIG. 1.

Referring to FIG. 7, the frame building block can include a delay compensation block 7000, a cell mapper 7010 and a frequency interleaver 7020. Description will be given of each block of the frame building block.

The delay compensation block 7000 can adjust the timing between the data pipes and the corresponding PLS data to ensure that they are co-timed at the transmitter end. The PLS data is delayed by the same amount as data pipes are by addressing the delays of data pipes caused by the Input Formatting block and BICM block. The delay of the BICM block is mainly due to the time interleaver 5050. In-band signaling data carries information of the next TI group so that they are carried one frame ahead of the DPs to be signaled. The Delay Compensating block delays in-band signaling data accordingly.

The cell mapper 7010 can map PLS, EAC, FIC, DPs, auxiliary streams and dummy cells into the active carriers of the OFDM symbols in the frame. The basic function of the cell mapper 7010 is to map data cells produced by the TIs for each of the DPs, PLS cells, and EAC/FIC cells, if any, into arrays of active OFDM cells corresponding to each of the OFDM symbols within a frame. Service signaling data (such as PSI (program specific information)/SI) can be separately gathered and sent by a data pipe. The Cell Mapper operates according to the dynamic information produced by the scheduler and the configuration of the frame structure. Details of the frame will be described later.

The frequency interleaver 7020 can randomly interleave data cells received from the cell mapper 7010 to provide frequency diversity. Also, the frequency interleaver 7020 can operate on very OFDM symbol pair comprised of two sequential OFDM symbols using a different interleaving-seed order to get maximum interleaving gain in a single frame.

The above-described blocks may be omitted or replaced by blocks having similar or identical functions.

Figure 8:
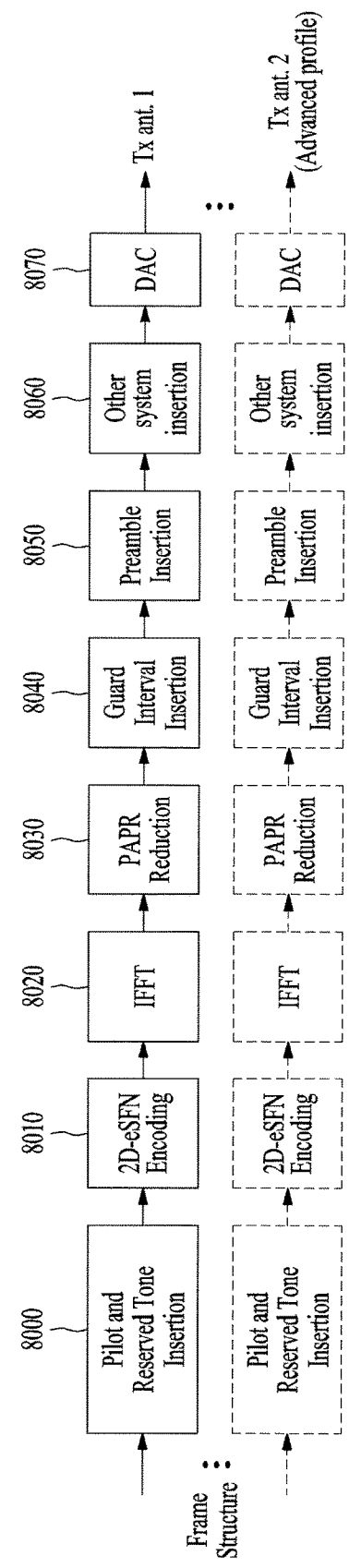
FIG. 8 illustrates an OFDM generation block according to an embodiment of the present invention.

FIG. 8 illustrates an OFDM generation block according to an embodiment of the present invention.

The OFDM generation block illustrated in FIG. 8 corresponds to an embodiment of the OFDM generation block 1030 described with reference to FIG. 1.

The OFDM generation block modulates the OFDM carriers by the cells produced by the Frame Building block, inserts the pilots, and produces the time domain signal for transmission. Also, this block subsequently inserts guard intervals, and applies PAPR (Peak-to-Average Power Radio) reduction processing to produce the final RF signal.

Referring to FIG. 8, the OFDM generation block can include a pilot and reserved tone insertion block 8000, a 2D-eSFN encoding block 8010, an IFFT (Inverse Fast Fourier Transform) block 8020, a PAPR reduction block 8030, a guard interval insertion block 8040, a preamble insertion block 8050, other system insertion block 8060 and a DAC block 8070. Description will be given of each block of the frame building block.

The pilot and reserved tone insertion block 8000 can insert pilots and the reserved tone.

Various cells within the OFDM symbol are modulated with reference information, known as pilots, which have transmitted values known a priori in the receiver. The information of pilot cells is made up of scattered pilots, continual pilots, edge pilots, FSS (frame signaling symbol) pilots and FES (frame edge symbol) pilots. Each pilot is transmitted at a particular boosted power level according to pilot type and pilot pattern. The value of the pilot information is derived from a reference sequence, which is a series of values, one for each transmitted carrier on any given symbol. The pilots can be used for frame synchronization, frequency synchronization, time synchronization, channel estimation, and transmission mode identification, and also can be used to follow the phase noise.

Reference information, taken from the reference sequence, is transmitted in scattered pilot cells in every symbol except the preamble, FSS and FES of the frame. Continual pilots are inserted in every symbol of the frame. The number and location of continual pilots depends on both the FFT size and the scattered pilot pattern. The edge carriers are edge pilots in every symbol except for the preamble symbol. They are inserted in order to allow frequency interpolation up to the edge of the spectrum. FSS pilots are inserted in FSS(s) and FES pilots are inserted in FES. They are inserted in order to allow time interpolation up to the edge of the frame.

The system according to an embodiment of the present invention supports the SFN network, where distributed MISO scheme is optionally used to support very robust transmission mode. The 2D-eSFN is a distributed MISO scheme that uses multiple TX antennas, each of which is located in the different transmitter site in the SFN network.

The 2D-eSFN encoding block 8010 can process a 2D-eSFN processing to distorts the phase of the signals transmitted from multiple transmitters, in order to create both time and frequency diversity in the SFN configuration. Hence, burst errors due to low flat fading or deep-fading for a long time can be mitigated.

The IFFT block 8020 can modulate the output from the 2D-eSFN encoding block 8010 using OFDM modulation scheme. Any cell in the data symbols which has not been designated as a pilot (or as a reserved tone) carries one of the data cells from the frequency interleaver. The cells are mapped to OFDM carriers.

The PAPR reduction block 8030 can perform a PAPR reduction on input signal using various PAPR reduction algorithm in the time domain.

The guard interval insertion block 8040 can insert guard intervals and the preamble insertion block 8050 can insert preamble in front of the signal. Details of a structure of the preamble will be described later. The other system insertion block 8060 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc. Data related to respective broadcast services can be transmitted through different frames.

The DAC block 8070 can convert an input digital signal into an analog signal and output the analog signal. The signal output from the DAC block 7800 can be transmitted through multiple output antennas according to the physical layer profiles. A Tx antenna according to an embodiment of the present invention can have vertical or horizontal polarity.

The above-described blocks may be omitted or replaced by blocks having similar or identical functions according to design.

Figure 9:
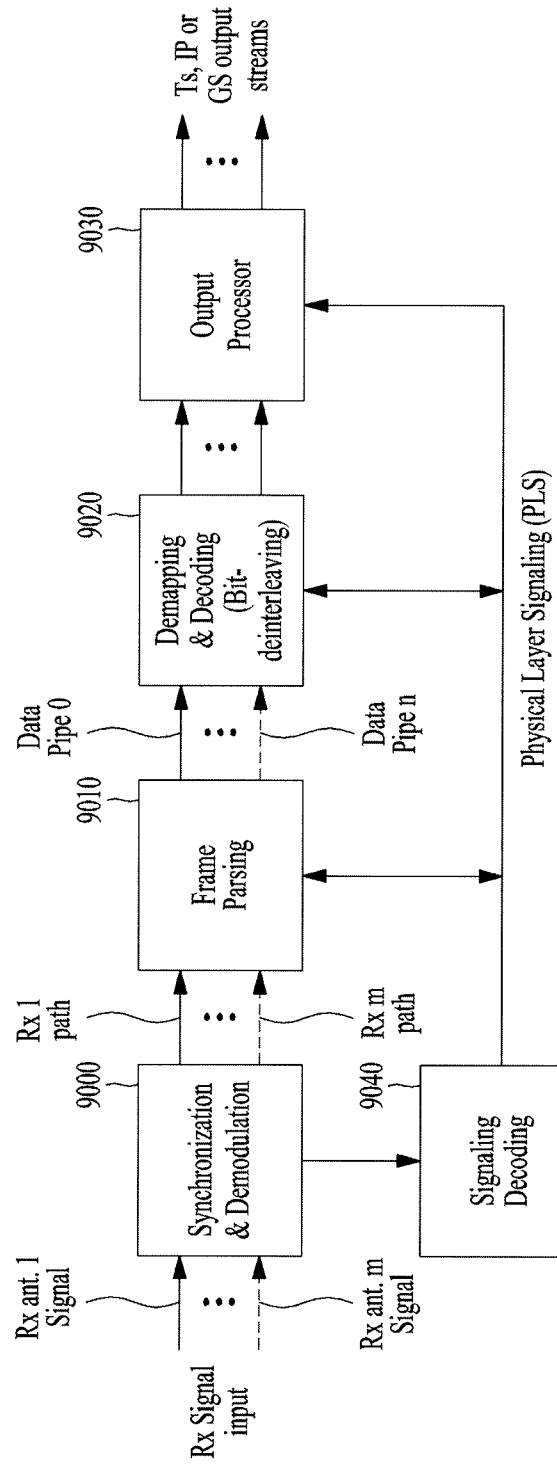
FIG. 9 illustrates a structure of an apparatus for receiving broadcast signals for future broadcast services according to an embodiment of the present invention.

FIG. 9 illustrates a structure of an apparatus for receiving broadcast signals for future broadcast services according to an embodiment of the present invention.

The apparatus for receiving broadcast signals for future broadcast services according to an embodiment of the present invention can correspond to the apparatus for transmitting broadcast signals for future broadcast services, described with reference to FIG. 1.

The apparatus for receiving broadcast signals for future broadcast services according to an embodiment of the present invention can include a synchronization & demodulation module 9000, a frame parsing module 9010, a demapping & decoding module 9020, an output processor 9030 and a signaling decoding module 9040. A description will be given of operation of each module of the apparatus for receiving broadcast signals.

The synchronization & demodulation module 9000 can receive input signals through m Rx antennas, perform signal detection and synchronization with respect to a system corresponding to the apparatus for receiving broadcast signals and carry out demodulation corresponding to a reverse procedure of the procedure performed by the apparatus for transmitting broadcast signals.

The frame parsing module 9010 can parse input signal frames and extract data through which a service selected by a user is transmitted. If the apparatus for transmitting broadcast signals performs interleaving, the frame parsing module 9010 can carry out deinterleaving corresponding to a reverse procedure of interleaving. In this case, the positions of a signal and data that need to be extracted can be obtained by decoding data output from the signaling decoding module 9040 to restore scheduling information generated by the apparatus for transmitting broadcast signals.

The demapping & decoding module 9020 can convert the input signals into bit domain data and then deinterleave the same as necessary. The demapping & decoding module 9020 can perform demapping for mapping applied for transmission efficiency and correct an error generated on a transmission channel through decoding. In this case, the demapping & decoding module 9020 can obtain transmission parameters necessary for demapping and decoding by decoding the data output from the signaling decoding module 9040.

The output processor 9030 can perform reverse procedures of various compression/signal processing procedures which are applied by the apparatus for transmitting broadcast signals to improve transmission efficiency. In this case, the output processor 9030 can acquire necessary control information from data output from the signaling decoding module 9040. The output of the output processor 8300 corresponds to a signal input to the apparatus for transmitting broadcast signals and may be MPEG-TSs, IP streams (v4 or v6) and generic streams.

The signaling decoding module 9040 can obtain PLS information from the signal demodulated by the synchronization & demodulation module 9000. As described above, the frame parsing module 9010, demapping & decoding module 9020 and output processor 9030 can execute functions thereof using the data output from the signaling decoding module 9040.

Figure 10:
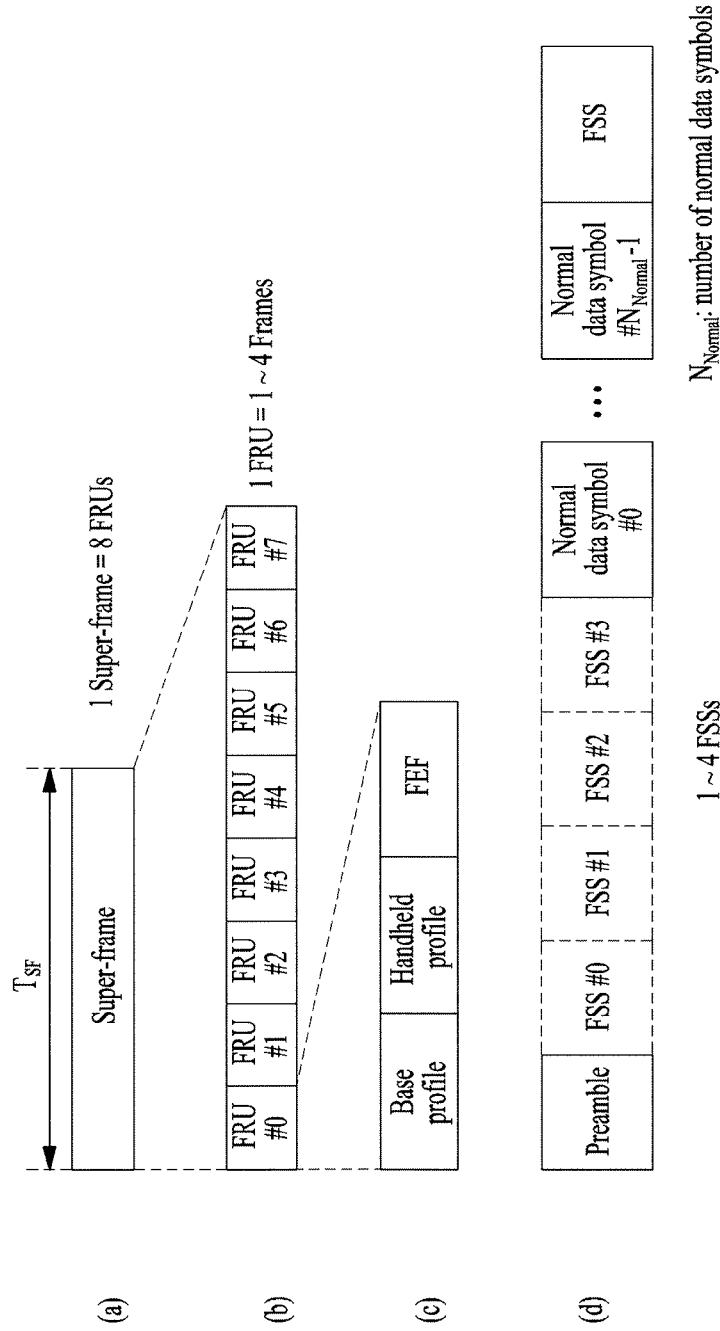
FIG. 10, including views (a), (b), (c) and (d), illustrates a frame structure according to an embodiment of the present invention.

FIG. 10 including views (a), (b), (c) and (d), illustrates a frame structure according to an embodiment of the present invention.

FIG. 10 shows an example configuration of the frame types and FRUs in a super-frame. FIG. 10(*a*) shows a super frame according to an embodiment of the present invention, FIG. 10(*b*) shows FRU (Frame Repetition Unit) according to an embodiment of the present invention, FIG. 10(*c*) shows frames of variable PHY profiles in the FRU and FIG. 10(*d*) shows a structure of a frame.

A super-frame may be composed of eight FRUs. The FRU is a basic multiplexing unit for TDM of the frames, and is repeated eight times in a super-frame.

Each frame in the FRU belongs to one of the PHY profiles, (base, handheld, advanced) or FEF. The maximum allowed number of the frames in the FRU is four and a given PHY profile can appear any number of times from zero times to four times in the FRU (e.g., base, base, handheld, advanced). PHY profile definitions can be extended using reserved values of the PHY_PROFILE in the preamble, if required.

The FEF part is inserted at the end of the FRU, if included. When the FEF is included in the FRU, the minimum number of FEFs is 8 in a super-frame. It is not recommended that FEF parts be adjacent to each other.

One frame is further divided into a number of OFDM symbols and a preamble. As shown in (d), the frame comprises a preamble, one or more frame signaling symbols (FSS), normal data symbols and a frame edge symbol (FES).

The preamble is a special symbol that enables fast Futurecast UTB system signal detection and provides a set of basic transmission parameters for efficient transmission and reception of the signal. The detailed description of the preamble will be will be described later.

The main purpose of the FSS(s) is to carry the PLS data. For fast synchronization and channel estimation, and hence fast decoding of PLS data, the FSS has more dense pilot pattern than the normal data symbol. The FES has exactly the same pilots as the FSS, which enables frequency-only interpolation within the FES and temporal interpolation, without extrapolation, for symbols immediately preceding the FES.

Figures 11, 12:
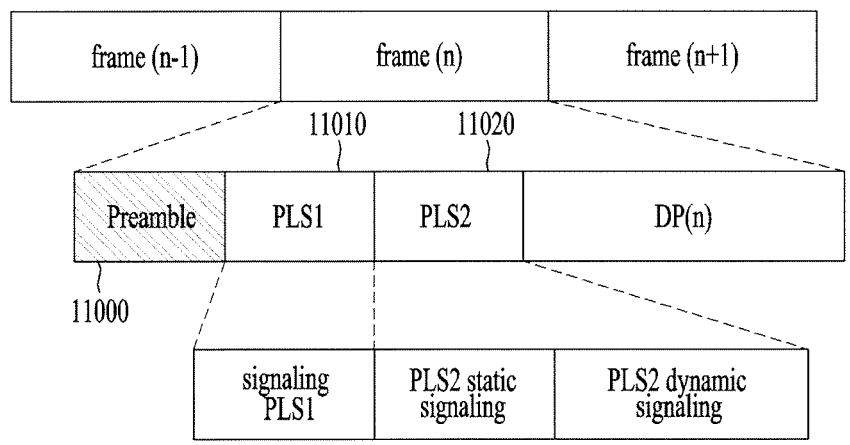
FIG. 11 illustrates a signaling hierarchy structure of the frame according to an embodiment of the present invention.
FIG. 12 illustrates preamble signaling data according to an embodiment of the present invention.

FIG. 11 illustrates a signaling hierarchy structure of the frame according to an embodiment of the present invention.

FIG. 11 illustrates the signaling hierarchy structure, which is split into three main parts: the preamble signaling data 11000, the PLS1 data 11010 and the PLS2 data 11020. The purpose of the preamble, which is carried by the preamble symbol in every frame, is to indicate the transmission type and basic transmission parameters of that frame. The PLS1 enables the receiver to access and decode the PLS2 data, which contains the parameters to access the DP of interest. The PLS2 is carried in every frame and split into two main parts: PLS2-STAT data and PLS2-DYN data. The static and dynamic portion of PLS2 data is followed by padding, if necessary.

FIG. 12 illustrates preamble signaling data according to an embodiment of the present invention.

Preamble signaling data carries 21 bits of information that are needed to enable the receiver to access PLS data and trace DPs within the frame structure. Details of the preamble signaling data are as follows:

PHY_PROFILE: This 3-bit field indicates the PHY profile type of the current frame. The mapping of different PHY profile types is given in below table 5.

TABLE 5

| Value | PHY profile |
|---|---|
| 000 | Base profile |
| 001 | Handheld profile |
| 010 | Advanced profiled |
| 011~110 | Reserved |
| 111 | FEF |

FFT_SIZE: This 2 bit field indicates the FFT size of the current frame within a frame-group, as described in below table 6.

TABLE 6

| Value | FFT size |
|---|---|
| 00 | 8K FFT |
| 01 | 16K FFT |
| 10 | 32K FFT |
| 11 | Reserved |

GI_FRACTION: This 3 bit field indicates the guard interval fraction value in the current super-frame, as described in below table 7.

TABLE 7

| Value | GI_FRACTION |
|---|---|
| 000 | 1/5 |
| 001 | 1/10 |
| 010 | 1/20 |
| 011 | 1/40 |
| 100 | 1/80 |
| 101 | 1/160 |
| 110~111 | Reserved |

EAC_FLAG: This 1 bit field indicates whether the EAC is provided in the current frame. If this field is set to '1', emergency alert service (EAS) is provided in the current frame. If this field set to '0', EAS is not carried in the current frame. This field can be switched dynamically within a super-frame.

PILOT_MODE: This 1-bit field indicates whether the pilot mode is mobile mode or fixed mode for the current frame in the current frame-group. If this field is set to '0', mobile pilot mode is used. If the field is set to '1', the fixed pilot mode is used.

PAPR_FLAG: This 1-bit field indicates whether PAPR reduction is used for the current frame in the current frame-group. If this field is set to value '1', tone reservation is used for PAPR reduction. If this field is set to '0', PAPR reduction is not used.

FRU_CONFIGURE: This 3-bit field indicates the PHY profile type configurations of the frame repetition units (FRU) that are present in the current super-frame. All profile types conveyed in the current super-frame are identified in this field in all preambles in the current super-frame. The 3-bit field has a different definition for each profile, as show in below table 8.

PAYLOAD_TYPE: This 3-bit field indicates the format of the payload data carried in the frame-group. PAYLOAD_TYPE is signaled as shown in table 9.

TABLE 9

| value | Payload type |
|---|---|
| 1XX | TS stream is transmitted |
| X1X | IP stream is transmitted |
| XX1 | GS stream is transmitted |

NUM_FSS: This 2-bit field indicates the number of FSS symbols in the current frame.

SYSTEM_VERSION: This 8-bit field indicates the version of the transmitted signal format. The SYSTEM_VERSION is divided into two 4-bit fields, which are a major version and a minor version.

Major version: The MSB four bits of SYSTEM_VERSION field indicate major version information. A change in the major version field indicates a non-backward-compatible change. The default value is '0000'. For the version described in this standard, the value is set to '0000'.

Minor version: The LSB four bits of SYSTEM_VERSION field indicate minor version information. A change in the minor version field is backward-compatible.

CELL_ID: This is a 16-bit field which uniquely identifies a geographic cell in an ATSC network. An ATSC cell coverage area may consist of one or more frequencies, depending on the number of frequencies used per Futurecast UTB system. If the value of the CELL_ID is not known or unspecified, this field is set to '0'.

NETWORK_ID: This is a 16-bit field which uniquely identifies the current ATSC network.

SYSTEM_ID: This 16-bit field uniquely identifies the Futurecast UTB system within the ATSC network. The Futurecast UTB system is the terrestrial broadcast system whose input is one or more input streams (TS, IP, GS) and

TABLE 8

| | Current PHY_PROFILE = '000' (base) | Current PHY_PROFILE = '001' (handheld) | Current PHY_PROFILE = '010' (advanced) | Current PHY_PROFILE = '111' (FEF) |
|---|---|---|---|---|
| FRU_CONFIGURE = 000 | Only base profile present | Only handheld profile present | Only advanced profile present | Only FEF present |
| FRU_CONFIGURE = 1XX | Handheld profile present | Base profile present | Base profile present | Base profile present |
| FRU_CONFIGURE = X1X | Advanced profile present | Advanced profile present | Handheld profile present | Handheld profile present |
| FRU_CONFIGURE = XX1 | FEF present | FEF present | FEF present | Advanced profile present |

RESERVED: This 7-bit field is reserved for future use.

FIG. 13 illustrates PLS1 data according to an embodiment of the present invention.

PLS1 data provides basic transmission parameters including parameters required to enable the reception and decoding of the PLS2. As above mentioned, the PLS1 data remain unchanged for the entire duration of one frame-group. The detailed definition of the signaling fields of the PLS1 data are as follows:

PREAMBLE_DATA: This 20-bit field is a copy of the preamble signaling data excluding the EAC_FLAG.

NUM_FRAME_FRU: This 2-bit field indicates the number of the frames per FRU.

whose output is an RF signal. The Futurecast UTB system carries one or more PHY profiles and FEF, if any. The same Futurecast UTB system may carry different input streams and use different RF frequencies in different geographical areas, allowing local service insertion. The frame structure and scheduling is controlled in one place and is identical for all transmissions within a Futurecast UTB system. One or more Futurecast UTB systems may have the same SYSTEM_ID meaning that they all have the same physical layer structure and configuration.

The following loop consists of FRU_PHY_PROFILE, FRU_FRAME_LENGTH, FRU_GI_FRACTION, and RESERVED which are used to indicate the FRU configuration and the length of each frame type. The loop size is fixed so that four PHY profiles (including a FEF) are signaled within the FRU. If NUM_FRAME_FRU is less than 4, the unused fields are filled with zeros.

FRU_PHY_PROFILE: This 3-bit field indicates the PHY profile type of the (i+1)th (i is the loop index) frame of the associated FRU. This field uses the same signaling format as shown in the table 8.

FRU_FRAME_LENGTH: This 2-bit field indicates the length of the (i+1)th frame of the associated FRU. Using FRU_FRAME_LENGTH together with FRU_GI_FRACTION, the exact value of the frame duration can be obtained.

FRU_GI_FRACTION: This 3-bit field indicates the guard interval fraction value of the (i+1)th frame of the associated FRU. FRU_GI_FRACTION is signaled according to the table 7.

RESERVED: This 4-bit field is reserved for future use.

The following fields provide parameters for decoding the PLS2 data.

PLS2_FEC_TYPE: This 2-bit field indicates the FEC type used by the PLS2 protection. The FEC type is signaled according to table 10. The details of the LDPC codes will be described later.

TABLE 10

| Content | PLS2 FEC type |
| --- | --- |
| 00 | 4K-1/4 and 7K-3/10 LDPC codes |
| 01~11 | Reserved |

PLS2_MOD: This 3-bit field indicates the modulation type used by the PLS2. The modulation type is signaled according to table 11.

TABLE 11

| Value | PLS2_MODE |
| --- | --- |
| 000 | BPSK |
| 001 | QPSK |
| 010 | QAM-16 |
| 011 | NUQ-64 |
| 100~111 | Reserved |

PLS2_SIZE_CELL: This 15-bit field indicates Ctotal_partial_block, the size (specified as the number of QAM cells) of the collection of full coded blocks for PLS2 that is carried in the current frame-group. This value is constant during the entire duration of the current frame-group.

PLS2_STAT_SIZE_BIT: This 14-bit field indicates the size, in bits, of the PLS2-STAT for the current frame-group. This value is constant during the entire duration of the current frame-group.

PLS2_DYN_SIZE_BIT: This 14-bit field indicates the size, in bits, of the PLS2-DYN for the current frame-group. This value is constant during the entire duration of the current frame-group.

PLS2_REP_FLAG: This 1-bit flag indicates whether the PLS2 repetition mode is used in the current frame-group. When this field is set to value '1', the PLS2 repetition mode is activated. When this field is set to value '0', the PLS2 repetition mode is deactivated.

PLS2_REP_SIZE_CELL: This 15-bit field indicates Ctotal_partial_block, the size (specified as the number of QAM cells) of the collection of partial coded blocks for PLS2 carried in every frame of the current frame-group, when PLS2 repetition is used. If repetition is not used, the value of this field is equal to 0. This value is constant during the entire duration of the current frame-group.

PLS2_NEXT_FEC_TYPE: This 2-bit field indicates the FEC type used for PLS2 that is carried in every frame of the next frame-group. The FEC type is signaled according to the table 10.

PLS2_NEXT_MOD: This 3-bit field indicates the modulation type used for PLS2 that is carried in every frame of the next frame-group. The modulation type is signaled according to the table 11.

PLS2_NEXT_REP_FLAG: This 1-bit flag indicates whether the PLS2 repetition mode is used in the next frame-group. When this field is set to value '1', the PLS2 repetition mode is activated. When this field is set to value '0', the PLS2 repetition mode is deactivated.

PLS2_NEXT_REP_SIZE_CELL: This 15-bit field indicates Ctotal_full_block, The size (specified as the number of QAM cells) of the collection of full coded blocks for PLS2 that is carried in every frame of the next frame-group, when PLS2 repetition is used. If repetition is not used in the next frame-group, the value of this field is equal to 0. This value is constant during the entire duration of the current frame-group.

PLS2_NEXT_REP_STAT_SIZE_BIT: This 14-bit field indicates the size, in bits, of the PLS2-STAT for the next frame-group. This value is constant in the current frame-group.

PLS2_NEXT_REP_DYN_SIZE_BIT: This 14-bit field indicates the size, in bits, of the PLS2-DYN for the next frame-group. This value is constant in the current frame-group.

PLS2_AP_MODE: This 2-bit field indicates whether additional parity is provided for PLS2 in the current frame-group. This value is constant during the entire duration of the current frame-group. The below table 12 gives the values of this field. When this field is set to '00', additional parity is not used for the PLS2 in the current frame-group.

TABLE 12

| Value | PLS2-AP mode |
| --- | --- |
| 00 | AP is not provided |
| 01 | AP1 mode |
| 10~11 | Reserved |

PLS2_AP_SIZE_CELL: This 15-bit field indicates the size (specified as the number of QAM cells) of the additional parity bits of the PLS2. This value is constant during the entire duration of the current frame-group.

PLS2_NEXT_AP_MODE: This 2-bit field indicates whether additional parity is provided for PLS2 signaling in every frame of next frame-group. This value is constant during the entire duration of the current frame-group. The table 12 defines the values of this field PLS2 NEXT_AP_SIZE_CELL: This 15-bit field indicates the size (specified as the number of QAM cells) of the additional parity bits of the PLS2 in every frame of the next frame-group. This value is constant during the entire duration of the current frame-group.

RESERVED: This 32-bit field is reserved for future use.

CRC_32: A 32-bit error detection code, which is applied to the entire PLS1 signaling.

FIG. 14 illustrates PLS2 data according to an embodiment of the present invention.

FIG. 14 illustrates PLS2-STAT data of the PLS2 data. The PLS2-STAT data are the same within a frame-group, while the PLS2-DYN data provide information that is specific for the current frame.

The details of fields of the PLS2-STAT data are as follows:

FIC_FLAG: This 1-bit field indicates whether the FIC is used in the current frame-group. If this field is set to '1', the FIC is provided in the current frame. If this field set to '0', the FIC is not carried in the current frame. This value is constant during the entire duration of the current frame-group.

AUX_FLAG: This 1-bit field indicates whether the auxiliary stream(s) is used in the current frame-group. If this field is set to '1', the auxiliary stream is provided in the current frame. If this field set to '0', the auxiliary stream is not carried in the current frame. This value is constant during the entire duration of current frame-group.

NUM_DP: This 6-bit field indicates the number of DPs carried within the current frame. The value of this field ranges from 1 to 64, and the number of DPs is NUM_DP+1.

DP_ID: This 6-bit field identifies uniquely a DP within a PHY profile.

DP_TYPE: This 3-bit field indicates the type of the DP. This is signaled according to the below table 13.

TABLE 13

| Value | DP Type |
| --- | --- |
| 000 | DP Type 1 |
| 001 | DP Type 2 |
| 010~111 | reserved |

DP_GROUP_ID: This 8-bit field identifies the DP group with which the current DP is associated. This can be used by a receiver to access the DPs of the service components associated with a particular service, which will have the same DP_GROUP_ID.

BASE_DP_ID: This 6-bit field indicates the DP carrying service signaling data (such as PSI/SI) used in the Management layer. The DP indicated by BASE_DP_ID may be either a normal DP carrying the service signaling data along with the service data or a dedicated DP carrying only the service signaling data DP_FEC_TYPE: This 2-bit field indicates the FEC type used by the associated DP. The FEC type is signaled according to the below table 14.

TABLE 14

| Value | FEC_TYPE |
| --- | --- |
| 00 | 16K LDPC |
| 01 | 64K LDPC |
| 10~11 | Reserved |

DP_COD: This 4-bit field indicates the code rate used by the associated DP. The code rate is signaled according to the below table 15.

TABLE 15

| Value | Code rate |
| --- | --- |
| 0000 | 5/15 |
| 0001 | 6/15 |
| 0010 | 7/15 |
| 0011 | 8/15 |
| 0100 | 9/15 |
| 0101 | 10/15 |
| 0110 | 11/15 |
| 0111 | 12/15 |

TABLE 15-continued

| Value | Code rate |
| --- | --- |
| 1000 | 13/15 |
| 1001~1111 | Reserved |

DP_MOD: This 4-bit field indicates the modulation used by the associated DP. The modulation is signaled according to the below table 16.

TABLE 16

| Value | Modulation |
| --- | --- |
| 0000 | QPSK |
| 0001 | QAM-16 |
| 0010 | NUQ-64 |
| 0011 | NUQ-256 |
| 0100 | NUQ-1024 |
| 0101 | NUC-16 |
| 0110 | NUC-64 |
| 0111 | NUC-256 |
| 1000 | NUC-1024 |
| 1001~1111 | reserved |

DP_SSD_FLAG: This 1-bit field indicates whether the SSD mode is used in the associated DP. If this field is set to value '1', SSD is used. If this field is set to value '0', SSD is not used.

The following field appears only if PHY_PROFILE is equal to '010', which indicates the advanced profile:

DP_MIMO: This 3-bit field indicates which type of MIMO encoding process is applied to the associated DP. The type of MIMO encoding process is signaled according to the table 17.

TABLE 17

| Value | MIMO encoding |
| --- | --- |
| 000 | FR-SM |
| 001 | FRFD-SM |
| 010~111 | reserved |

DP_TI_TYPE: This 1-bit field indicates the type of time-interleaving. A value of '0' indicates that one TI group corresponds to one frame and contains one or more TI-blocks. A value of '1' indicates that one TI group is carried in more than one frame and contains only one TI-block.

DP_TI_LENGTH: The use of this 2-bit field (the allowed values are only 1, 2, 4, 8) is determined by the values set within the DP_TI_TYPE field as follows:

If the DP_TI_TYPE is set to the value '1', this field indicates $P_I$, the number of the frames to which each TI group is mapped, and there is one TI-block per TI group (NTI=1). The allowed PI values with 2-bit field are defined in the below table 18.

If the DP_TI_TYPE is set to the value '0', this field indicates the number of TI-blocks NTI per TI group, and there is one TI group per frame (PI=1). The allowed PI values with 2-bit field are defined in the below table 18.

TABLE 18

| 2-bit field | $P_I$ | $N_{TI}$ |
| --- | --- | --- |
| 00 | 1 | 1 |
| 01 | 2 | 2 |

TABLE 18-continued

| 2-bit field | $P_I$ | $N_{TI}$ |
|---|---|---|
| 10 | 4 | 3 |
| 11 | 8 | 4 |

DP_FRAME_INTERVAL: This 2-bit field indicates the frame interval (IJUMP) within the frame-group for the associated DP and the allowed values are 1, 2, 4, 8 (the corresponding 2-bit field is '00', '01', '10', or '11', respectively). For DPs that do not appear every frame of the frame-group, the value of this field is equal to the interval between successive frames. For example, if a DP appears on the frames 1, 5, 9, 13, etc., this field is set to '4'. For DPs that appear in every frame, this field is set to '1'.

DP_TI_BYPASS: This 1-bit field determines the availability of time interleaver 5050. If time interleaving is not used for a DP, it is set to '1'. Whereas if time interleaving is used it is set to '0'.

DP_FIRST_FRAME_IDX: This 5-bit field indicates the index of the first frame of the super-frame in which the current DP occurs. The value of DP_FIRST_FRAME_IDX ranges from 0 to 31

DP_NUM_BLOCK_MAX: This 10-bit field indicates the maximum value of DP_NUM_BLOCKS for this DP. The value of this field has the same range as DP_NUM_BLOCKS.

DP_PAYLOAD_TYPE: This 2-bit field indicates the type of the payload data carried by the given DP. DP_PAYLOAD_TYPE is signaled according to the below table 19.

TABLE 19

| Value | Payload Type |
|---|---|
| 00 | TS. |
| 01 | IP |
| 10 | GS |
| 11 | reserved |

DP_INBAND_MODE: This 2-bit field indicates whether the current DP carries in-band signaling information. The in-band signaling type is signaled according to the below table 20.

TABLE 20

| Value | In-band mode |
|---|---|
| 00 | In-band signaling is not carried. |
| 01 | INBAND-PLS is carried only |
| 10 | INBAND-ISSY is carried only |
| 11 | INBAND-PLS and INBAND-ISSY are carried |

DP_PROTOCOL_TYPE: This 2-bit field indicates the protocol type of the payload carried by the given DP. It is signaled according to the below table 21 when input payload types are selected.

TABLE 21

| Value | If DP_PAYLOAD_TYPE Is TS | If DP_PAYLOAD_TYPE Is IP | If DP_PAYLOAD_TYPE Is GS |
|---|---|---|---|
| 00 | MPEG2-TS | IPv4 | (Note) |
| 01 | Reserved | IPv6 | Reserved |
| 10 | Reserved | Reserved | Reserved |
| 11 | Reserved | Reserved | Reserved |

DP_CRC_MODE: This 2-bit field indicates whether CRC encoding is used in the Input Formatting block. The CRC mode is signaled according to the below table 22.

TABLE 22

| Value | CRC mode |
|---|---|
| 00 | Not used |
| 01 | CRC-8 |
| 10 | CRC-16 |
| 11 | CRC-32 |

DNP_MODE: This 2-bit field indicates the null-packet deletion mode used by the associated DP when DP_PAYLOAD_TYPE is set to TS ('00'). DNP_MODE is signaled according to the below table 23. If DP_PAYLOAD_TYPE is not TS ('00'), DNP_MODE is set to the value '00'.

TABLE 23

| Value | Null-packet deletion mode |
|---|---|
| 00 | Not used |
| 01 | DNP-NORMAL |
| 10 | DNP-OFFSET |
| 11 | reserved |

ISSY_MODE: This 2-bit field indicates the ISSY mode used by the associated DP when DP_PAYLOAD_TYPE is set to TS ('00'). The ISSY_MODE is signaled according to the below table 24 If DP_PAYLOAD_TYPE is not TS ('00'), ISSY_MODE is set to the value '00'.

TABLE 24

| Value | ISSY mode |
|---|---|
| 00 | Not used |
| 01 | ISSY-UP |
| 10 | ISSY-BBF |
| 11 | reserved |

HC_MODE_TS: This 2-bit field indicates the TS header compression mode used by the associated DP when DP_PAYLOAD_TYPE is set to TS ('00'). The HC_MODE_TS is signaled according to the below table 25.

TABLE 25

| Value | Header compression mode |
|---|---|
| 00 | HC_MODE_TS 1 |
| 01 | HC_MODE_TS 2 |
| 10 | HC_MODE_TS 3 |
| 11 | HC_MODE_TS 4 |

HC_MODE_IP: This 2-bit field indicates the IP header compression mode when DP_PAYLOAD_TYPE is set to IP ('01'). The HC_MODE_IP is signaled according to the below table 26.

TABLE 26

| Value | Header compression mode |
|---|---|
| 00 | No compression |
| 01 | HC_MODE_IP 1 |
| 10~11 | reserved |

PID: This 13-bit field indicates the PID number for TS header compression when DP_PAYLOAD_TYPE is set to TS ('00') and HC_MODE_TS is set to '01' or '10'.

RESERVED: This 8-bit field is reserved for future use.

The following field appears only if FIC_FLAG is equal to '1':

FIC_VERSION: This 8-bit field indicates the version number of the FIC.

FIC_LENGTH_BYTE: This 13-bit field indicates the length, in bytes, of the FIC.

RESERVED: This 8-bit field is reserved for future use.

The following field appears only if AUX_FLAG is equal to '1':

NUM_AUX: This 4-bit field indicates the number of auxiliary streams. Zero means no auxiliary streams are used.

AUX_CONFIG_RFU: This 8-bit field is reserved for future use.

AUX_STREAM_TYPE: This 4-bit is reserved for future use for indicating the type of the current auxiliary stream.

AUX_PRIVATE_CONFIG: This 28-bit field is reserved for future use for signaling auxiliary streams.

Figures 15, 16:
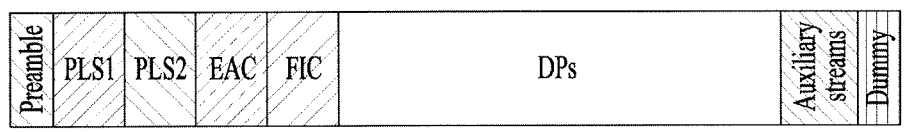
FIG. 15 illustrates PLS2 data according to another embodiment of the present invention.
FIG. 16 illustrates a logical structure of a frame according to an embodiment of the present invention.

FIG. 15 illustrates PLS2 data according to another embodiment of the present invention.

FIG. 15 illustrates PLS2-DYN data of the PLS2 data. The values of the PLS2-DYN data may change during the duration of one frame-group, while the size of fields remains constant.

The details of fields of the PLS2-DYN data are as follows:

FRAME_INDEX: This 5-bit field indicates the frame index of the current frame within the super-frame. The index of the first frame of the super-frame is set to '0'.

PLS_CHANGE_COUNTER: This 4-bit field indicates the number of super-frames ahead where the configuration will change. The next super-frame with changes in the configuration is indicated by the value signaled within this field. If this field is set to the value '0000', it means that no scheduled change is foreseen: e.g., value '1' indicates that there is a change in the next super-frame.

FIC_CHANGE_COUNTER: This 4-bit field indicates the number of super-frames ahead where the configuration (i.e., the contents of the FIC) will change. The next super-frame with changes in the configuration is indicated by the value signaled within this field. If this field is set to the value '0000', it means that no scheduled change is foreseen: e.g. value '0001' indicates that there is a change in the next super-frame.

RESERVED: This 16-bit field is reserved for future use.

The following fields appear in the loop over NUM_DP, which describe the parameters associated with the DP carried in the current frame.

DP_ID: This 6-bit field indicates uniquely the DP within a PHY profile.

DP_START: This 15-bit (or 13-bit) field indicates the start position of the first of the DPs using the DPU addressing scheme. The DP_START field has differing length according to the PHY profile and FFT size as shown in the below table 27.

TABLE 27

| | DP_START field size | |
|---|---|---|
| PHY profile | 64K | 16K |
| Base | 13 bit | 15 bit |
| Handheld | — | 13 bit |
| Advanced | 13 bit | 15 bit |

DP_NUM_BLOCK: This 10-bit field indicates the number of FEC blocks in the current TI group for the current DP. The value of DP_NUM_BLOCK ranges from 0 to 1023

RESERVED: This 8-bit field is reserved for future use.

The following fields indicate the FIC parameters associated with the EAC.

EAC_FLAG: This 1-bit field indicates the existence of the EAC in the current frame. This bit is the same value as the EAC_FLAG in the preamble.

EAS_WAKE_UP_VERSION_NUM: This 8-bit field indicates the version number of a wake-up indication.

If the EAC_FLAG field is equal to '1', the following 12 bits are allocated for EAC_LENGTH_BYTE field. If the EAC_FLAG field is equal to '0', the following 12 bits are allocated for EAC_COUNTER.

EAC_LENGTH_BYTE: This 12-bit field indicates the length, in byte, of the EAC.

EAC_COUNTER: This 12-bit field indicates the number of the frames before the frame where the EAC arrives.

The following field appears only if the AUX_FLAG field is equal to '1':

AUX_PRIVATE_DYN: This 48-bit field is reserved for future use for signaling auxiliary streams. The meaning of this field depends on the value of AUX_STREAM_TYPE in the configurable PLS2-STAT.

CRC_32: A 32-bit error detection code, which is applied to the entire PLS2.

FIG. 16 illustrates a logical structure of a frame according to an embodiment of the present invention.

As above mentioned, the PLS, EAC, FIC, DPs, auxiliary streams and dummy cells are mapped into the active carriers of the OFDM symbols in the frame. The PLS1 and PLS2 are first mapped into one or more FSS(s). After that, EAC cells, if any, are mapped immediately following the PLS field, followed next by FIC cells, if any. The DPs are mapped next after the PLS or EAC, FIC, if any. Type 1 DPs follows first, and Type 2 DPs next. The details of a type of the DP will be described later. In some case, DPs may carry some special data for EAS or service signaling data. The auxiliary stream or streams, if any, follow the DPs, which in turn are followed by dummy cells. Mapping them all together in the above mentioned order, i.e. PLS, EAC, FIC, DPs, auxiliary streams and dummy data cells exactly fill the cell capacity in the frame.

Figure 17:
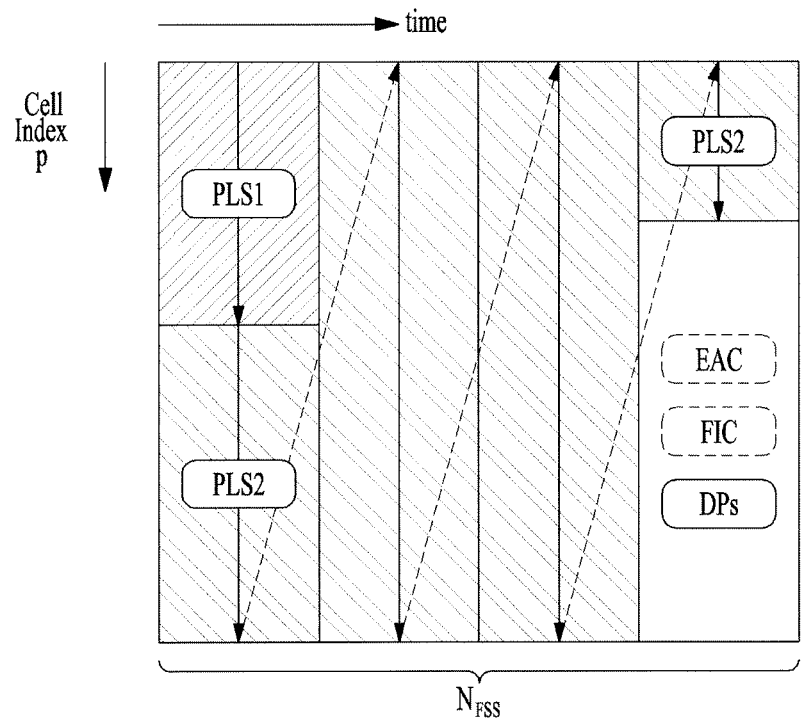
FIG. 17 illustrates PLS mapping according to an embodiment of the present invention.

FIG. 17 illustrates PLS mapping according to an embodiment of the present invention.

PLS cells are mapped to the active carriers of FSS(s). Depending on the number of cells occupied by PLS, one or more symbols are designated as FSS(s), and the number of FSS(s) NFSS is signaled by NUM_FSS in PLS1. The FSS is a special symbol for carrying PLS cells. Since robustness and latency are critical issues in the PLS, the FSS(s) has higher density of pilots allowing fast synchronization and frequency-only interpolation within the FSS.

PLS cells are mapped to active carriers of the NFSS FSS(s) in a top-down manner as shown in an example in FIG. 17. The PLS1 cells are mapped first from the first cell of the first FSS in an increasing order of the cell index. The PLS2 cells follow immediately after the last cell of the PLS1 and mapping continues downward until the last cell index of the first FSS. If the total number of required PLS cells exceeds the number of active carriers of one FSS, mapping proceeds to the next FSS and continues in exactly the same manner as the first FSS.

After PLS mapping is completed, DPs are carried next. If EAC, FIC or both are present in the current frame, they are placed between PLS and "normal" DPs.

Figure 18:
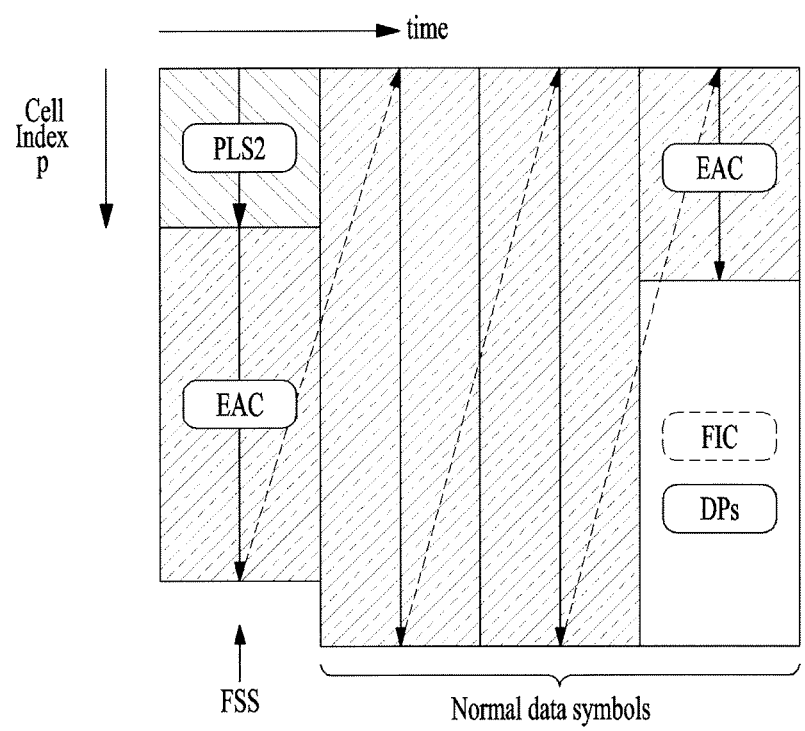
FIG. 18 illustrates EAC mapping according to an embodiment of the present invention.

FIG. 18 illustrates EAC mapping according to an embodiment of the present invention.

EAC is a dedicated channel for carrying EAS messages and links to the DPs for EAS. EAS support is provided but EAC itself may or may not be present in every frame. EAC, if any, is mapped immediately after the PLS2 cells. EAC is not preceded by any of the FIC, DPs, auxiliary streams or dummy cells other than the PLS cells. The procedure of mapping the EAC cells is exactly the same as that of the PLS.

The EAC cells are mapped from the next cell of the PLS2 in increasing order of the cell index as shown in the example in FIG. 18. Depending on the EAS message size, EAC cells may occupy a few symbols, as shown in FIG. 18.

EAC cells follow immediately after the last cell of the PLS2, and mapping continues downward until the last cell index of the last FSS. If the total number of required EAC cells exceeds the number of remaining active carriers of the last FSS mapping proceeds to the next symbol and continues in exactly the same manner as FSS(s). The next symbol for mapping in this case is the normal data symbol, which has more active carriers than a FSS.

After EAC mapping is completed, the FIC is carried next, if any exists. If FIC is not transmitted (as signaled in the PLS2 field), DPs follow immediately after the last cell of the EAC.

Figure 19:
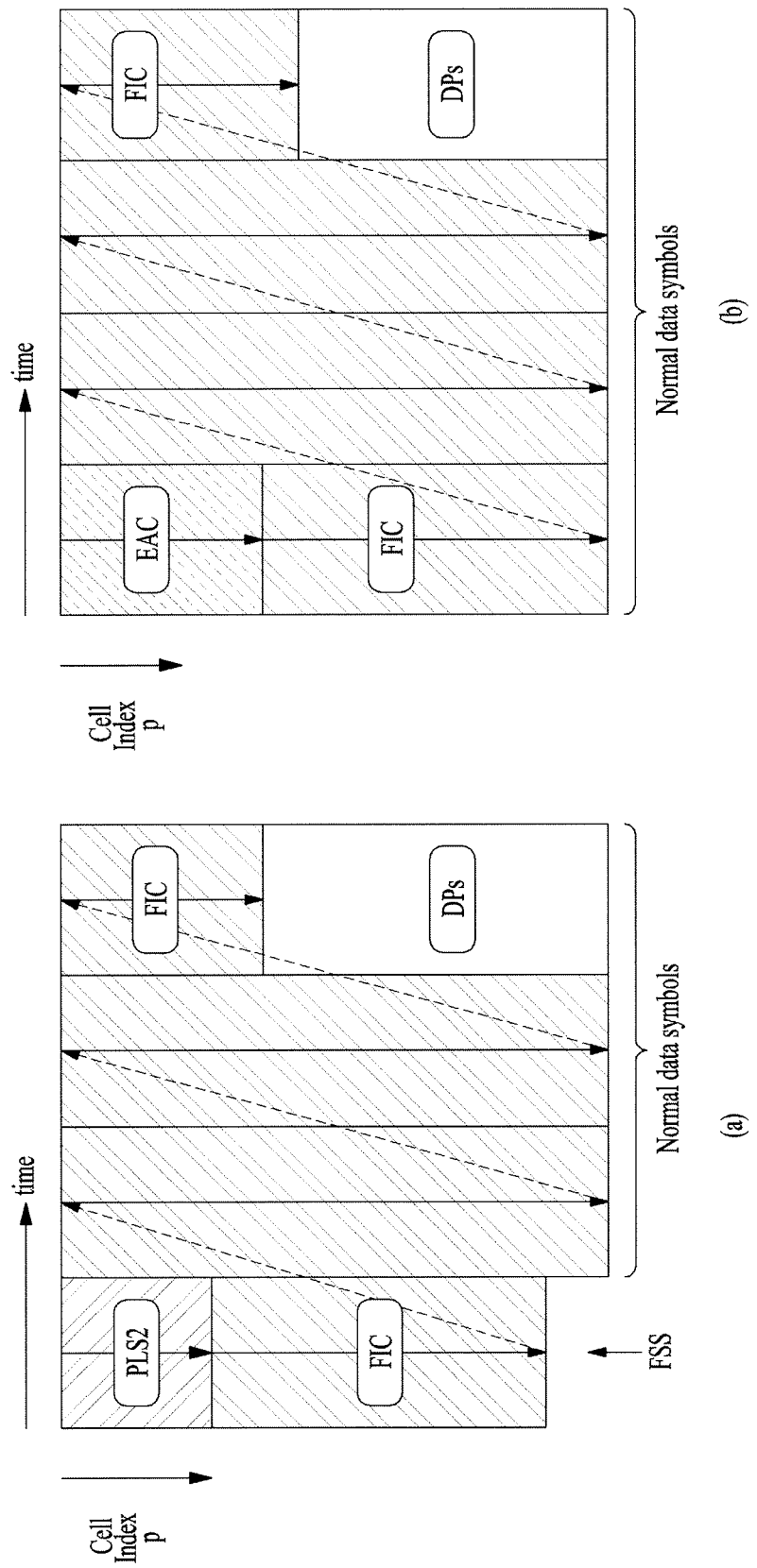
FIG. 19, including views (a) and (b), illustrates FIC mapping according to an embodiment of the present invention.

FIG. 19 including views (a) and (b), illustrates FIC mapping according to an embodiment of the present invention.

FIG. 19(a) shows an example mapping of FIC cell without EAC and FIG. 19(b) shows an example mapping of FIC cell with EAC.

FIC is a dedicated channel for carrying cross-layer information to enable fast service acquisition and channel scanning. This information primarily includes channel binding information between DPs and the services of each broadcaster. For fast scan, a receiver can decode FIC and obtain information such as broadcaster ID, number of services, and BASE_DP_ID. For fast service acquisition, in addition to FIC, base DP can be decoded using BASE_DP_ID. Other than the content it carries, a base DP is encoded and mapped to a frame in exactly the same way as a normal DP. Therefore, no additional description is required for a base DP. The FIC data is generated and consumed in the Management Layer. The content of FIC data is as described in the Management Layer specification.

The FIC data is optional and the use of FIC is signaled by the FIC_FLAG parameter in the static part of the PLS2. If FIC is used, FIC_FLAG is set to '1' and the signaling field for FIC is defined in the static part of PLS2. Signaled in this field are FIC_VERSION, and FIC_LENGTH_BYTE. FIC uses the same modulation, coding and time interleaving parameters as PLS2. FIC shares the same signaling parameters such as PLS2_MOD and PLS2_FEC. FIC data, if any, is mapped immediately after PLS2 or EAC if any. FIC is not preceded by any normal DPs, auxiliary streams or dummy cells. The method of mapping FIC cells is exactly the same as that of EAC which is again the same as PLS.

Without EAC after PLS, FIC cells are mapped from the next cell of the PLS2 in an increasing order of the cell index as shown in an example in FIG. 19(a). Depending on the FIC data size, FIC cells may be mapped over a few symbols, as shown in FIG. 19(b).

FIC cells follow immediately after the last cell of the PLS2, and mapping continues downward until the last cell index of the last FSS. If the total number of required FIC cells exceeds the number of remaining active carriers of the last FSS, mapping proceeds to the next symbol and continues in exactly the same manner as FSS(s). The next symbol for mapping in this case is the normal data symbol which has more active carriers than a FSS.

If EAS messages are transmitted in the current frame, EAC precedes FIC, and FIC cells are mapped from the next cell of the EAC in an increasing order of the cell index as shown in (b).

After FIC mapping is completed, one or more DPs are mapped, followed by auxiliary streams, if any, and dummy cells.

Figure 20:
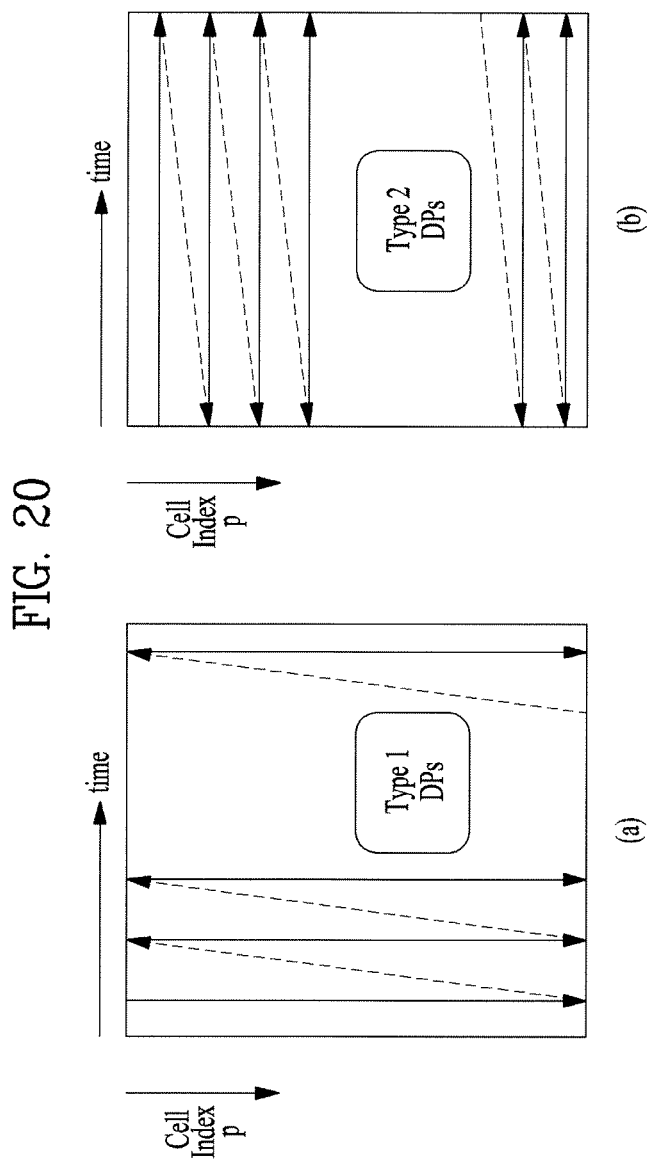
FIG. 20, including views (a) and (b), illustrates a type of DP according to an embodiment of the present invention.

FIG. 20, including views (a) and (b), illustrates a type of DP according to an embodiment of the present invention.

FIG. 20(a) shows type 1 DP and FIG. 20(b) shows type 2 DP.

After the preceding channels, i.e., PLS, EAC and FIC, are mapped, cells of the DPs are mapped. A DP is categorized into one of two types according to mapping method:

Type 1 DP: DP is mapped by TDM
Type 2 DP: DP is mapped by FDM

The type of DP is indicated by DP_TYPE field in the static part of PLS2. FIG. 20 illustrates the mapping orders of Type 1 DPs and Type 2 DPs. Type 1 DPs are first mapped in the increasing order of cell index, and then after reaching the last cell index, the symbol index is increased by one. Within the next symbol, the DP continues to be mapped in the increasing order of cell index starting from p=0. With a number of DPs mapped together in one frame, each of the Type 1 DPs are grouped in time, similar to TDM multiplexing of DPs.

Type 2 DPs are first mapped in the increasing order of symbol index, and then after reaching the last OFDM symbol of the frame, the cell index increases by one and the symbol index rolls back to the first available symbol and then increases from that symbol index. After mapping a number of DPs together in one frame, each of the Type 2 DPs are grouped in frequency together, similar to FDM multiplexing of DPs.

Type 1 DPs and Type 2 DPs can coexist in a frame if needed with one restriction; Type 1 DPs always precede Type 2 DPs. The total number of OFDM cells carrying Type 1 and Type 2 DPs cannot exceed the total number of OFDM cells available for transmission of DPs:

$$D_{DP1}+D_{DP2} \leq D_{DP} \qquad \text{[Expression 2]}$$

where DDP1 is the number of OFDM cells occupied by Type 1 DPs, DDP2 is the number of cells occupied by Type 2 DPs. Since PLS, EAC, FIC are all mapped in the same way as Type 1 DP, they all follow "Type 1 mapping rule". Hence, overall, Type 1 mapping always precedes Type 2 mapping.

Figure 21:
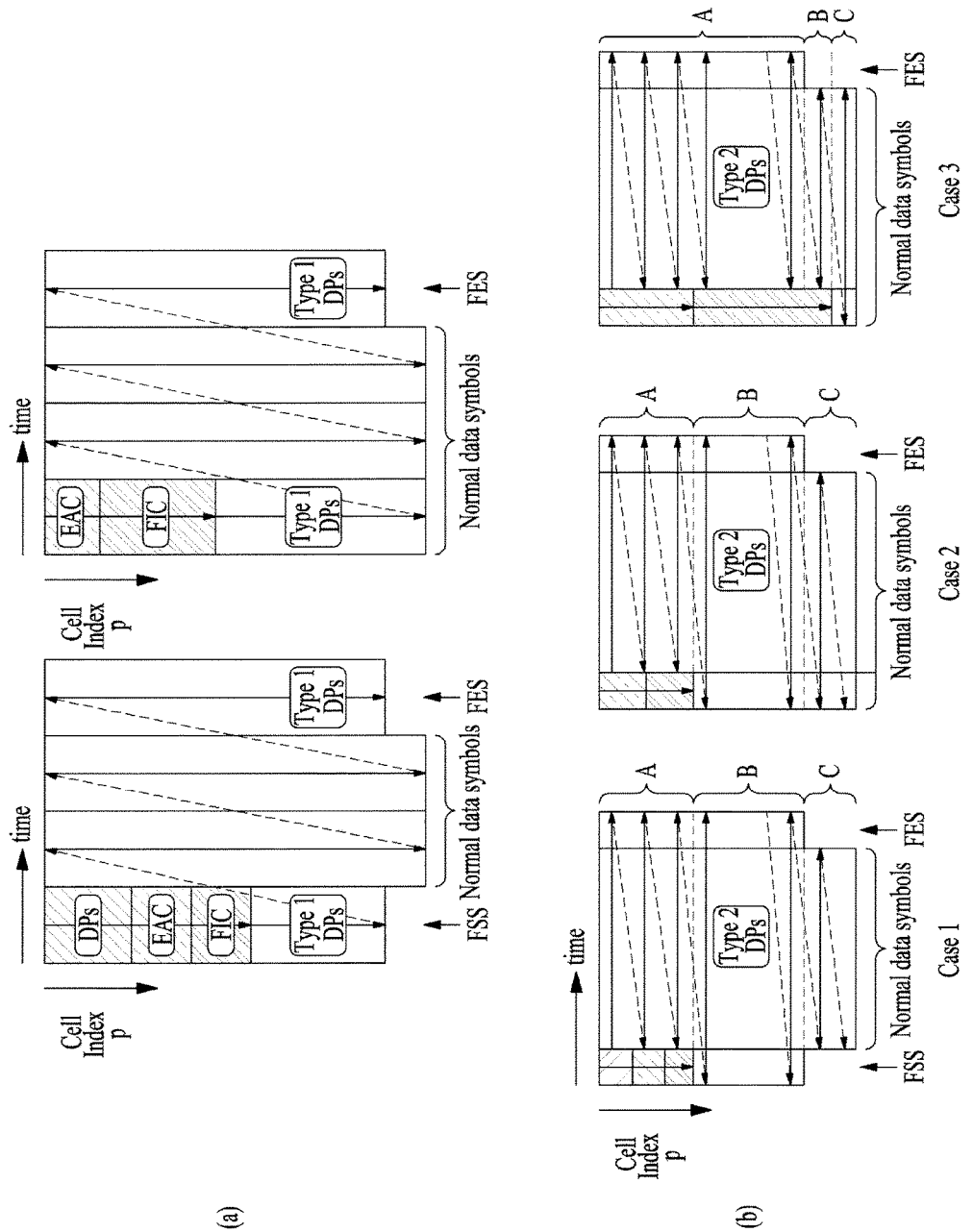
FIG. 21, including views (a) and (b), illustrates DP mapping according to an embodiment of the present invention.

FIG. 21 including views (a) and (b), illustrates DP mapping according to an embodiment of the present invention.

FIG. 21(a) shows an addressing of OFDM cells for mapping type 1 DPs and FIG. 21(b) shows an addressing of OFDM cells for mapping for type 2 DPs.

Addressing of OFDM cells for mapping Type 1 DPs (0, . . . , DDP1-1) is defined for the active data cells of Type 1 DPs. The addressing scheme defines the order in which the cells from the TIs for each of the Type 1 DPs are allocated to the active data cells. It is also used to signal the locations of the DPs in the dynamic part of the PLS2.

Without EAC and FIC, address 0 refers to the cell immediately following the last cell carrying PLS in the last FSS. If EAC is transmitted and FIC is not in the corresponding frame, address 0 refers to the cell immediately following the last cell carrying EAC. If FIC is transmitted in the corresponding frame, address 0 refers to the cell immediately following the last cell carrying FIC. Address 0 for Type 1 DPs can be calculated considering two different cases as shown in (a). In the example in (a), PLS, EAC and FIC are assumed to be all transmitted. Extension to the cases where either or both of EAC and FIC are omitted is straightforward. If there are remaining cells in the FSS after mapping all the cells up to FIC as shown on the left side of (a).

Addressing of OFDM cells for mapping Type 2 DPs (0, . . . , DDP2-1) is defined for the active data cells of Type 2 DPs. The addressing scheme defines the order in which the cells from the TIs for each of the Type 2 DPs are allocated to the active data cells. It is also used to signal the locations of the DPs in the dynamic part of the PLS2.

Three slightly different cases are possible as shown in (b). For the first case shown on the left side of (b), cells in the last FSS are available for Type 2 DP mapping. For the second case shown in the middle, FIC occupies cells of a normal symbol, but the number of FIC cells on that symbol is not larger than CFSS. The third case, shown on the right side in (b), is the same as the second case except that the number of FIC cells mapped on that symbol exceeds CFSS.

The extension to the case where Type 1 DP(s) precede Type 2 DP(s) is straightforward since PLS, EAC and FIC follow the same "Type 1 mapping rule" as the Type 1 DP(s).

A data pipe unit (DPU) is a basic unit for allocating data cells to a DP in a frame.

A DPU is defined as a signaling unit for locating DPs in a frame. A Cell Mapper 7010 may map the cells produced by the TIs for each of the DPs. A Time interleaver 5050 outputs a series of TI-blocks and each TI-block comprises a variable number of XFECBLOCKs which is in turn composed of a set of cells. The number of cells in an XFECBLOCK, Ncells, is dependent on the FECBLOCK size, Nldpc, and the number of transmitted bits per constellation symbol. A DPU is defined as the greatest common divisor of all possible values of the number of cells in a XFECBLOCK, Ncells, supported in a given PHY profile. The length of a DPU in cells is defined as LDPU. Since each PHY profile supports different combinations of FECBLOCK size and a different number of bits per constellation symbol, LDPU is defined on a PHY profile basis.

Figure 22:
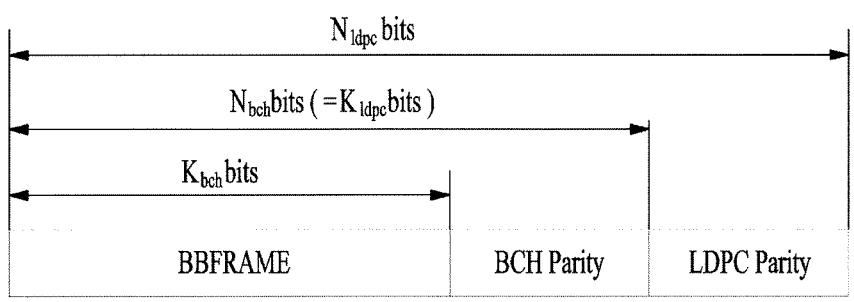
FIG. 22 illustrates an FEC structure according to an embodiment of the present invention.

FIG. 22 illustrates an FEC structure according to an embodiment of the present invention.

FIG. 22 illustrates an FEC structure according to an embodiment of the present invention before bit interleaving. As above mentioned, Data FEC encoder may perform the FEC encoding on the input BBF to generate FECBLOCK procedure using outer coding (BCH), and inner coding (LDPC). The illustrated FEC structure corresponds to the FECBLOCK. Also, the FECBLOCK and the FEC structure have same value corresponding to a length of LDPC codeword.

The BCH encoding is applied to each BBF (Kbch bits), and then LDPC encoding is applied to BCH-encoded BBF (Kldpc bits=Nbch bits) as illustrated in FIG. 22.

The value of Nldpc is either 64800 bits (long FEC-BLOCK) or 16200 bits (short FECBLOCK).

The below table 28 and table 29 show FEC encoding parameters for a long FECBLOCK and a short FECBLOCK, respectively.

TABLE 28

| LDPC Rate | $N_{ldpc}$ | $K_{ldpc}$ | $K_{bch}$ | BCH error correction capability | $N_{bch} - K_{bch}$ |
| --- | --- | --- | --- | --- | --- |
| 5/15 | 64800 | 21600 | 21408 | 12 | 192 |
| 6/15 | | 25920 | 25728 | | |
| 7/15 | | 30240 | 30048 | | |
| 8/15 | | 34560 | 34368 | | |
| 9/15 | | 38880 | 38688 | | |
| 10/15 | | 43200 | 43008 | | |
| 11/15 | | 47520 | 47328 | | |
| 12/15 | | 51840 | 51648 | | |
| 13/15 | | 56160 | 55968 | | |

TABLE 29

| LDPC Rate | $N_{ldpc}$ | $K_{ldpc}$ | $K_{bch}$ | BCH error correction capability | $N_{bch} - K_{bch}$ |
| --- | --- | --- | --- | --- | --- |
| 5/15 | 16200 | 5400 | 5232 | 12 | 168 |
| 6/15 | | 6480 | 6312 | | |
| 7/15 | | 7560 | 7392 | | |
| 8/15 | | 8640 | 8472 | | |
| 9/15 | | 9720 | 9552 | | |
| 10/15 | | 10800 | 10632 | | |
| 11/15 | | 11880 | 11712 | | |
| 12/15 | | 12960 | 12792 | | |
| 13/15 | | 14040 | 13872 | | |

The details of operations of the BCH encoding and LDPC encoding are as follows:

A 12-error correcting BCH code is used for outer encoding of the BBF. The BCH generator polynomial for short FECBLOCK and long FECBLOCK are obtained by multiplying together all polynomials.

LDPC code is used to encode the output of the outer BCH encoding. To generate a completed Bldpc (FECBLOCK), Pldpc (parity bits) is encoded systematically from each Ildpc (BCH-encoded BBF), and appended to Ildpc. The completed Bldpc (FECBLOCK) are expressed as follow expression.

$$B_{ldpc} = [I_{ldpc} P_{ldpc}] = [i_0, i_1, \ldots, i_{K_{ldpc}-1}, p_0, p_1, \ldots, p_{N_{ldpc}-K_{ldpc}-1}]$$ [expression3]

The parameters for long FECBLOCK and short FEC-BLOCK are given in the above table 28 and 29, respectively.

The detailed procedure to calculate Nldpc–Kldpc parity bits for long FECBLOCK, is as follows:

1) Initialize the parity bits, $$p_0 = p_1 = p_2 = \ldots = p_{N_{ldpc}-K_{ldpc}-1} = 0$$ [expression4]

2) Accumulate the first information bit—i0, at parity bit addresses specified in the first row of an addresses of parity check matrix. The details of addresses of parity check matrix will be described later. For example, for rate 13/15:

$$p_{983} = p_{983} \oplus i_0 \quad p_{2815} = p_{2815} \oplus i_0$$

$$p_{4837} = p_{4837} \oplus i_0 \quad p_{4989} = p_{4989} \oplus i_0$$

$$p_{6138} = p_{6138} \oplus i_0 \quad p_{6458} = p_{6458} \oplus i_0$$

$$p_{6921} = p_{6921} \oplus i_0 \quad p_{6974} = p_{6974} \oplus i_0$$

$p_{7572}=p_{7572} \oplus i_0 \ p_{8260}=p_{8260} \oplus i_0$ $p_{8496}=p_{8496} \oplus i_0$  [expression 5]

3) For the next 359 information bits, is, s=1, 2, . . . , 359 accumulate is at parity bit addresses using following expression.

$\{x+(s \bmod 360) \times Q_{ldpc}\} \bmod(N_{ldpc}-K_{ldpc})$  [expression 6]

where x denotes the address of the parity bit accumulator corresponding to the first bit i0, and Qldpc is a code rate dependent constant specified in the addresses of parity check matrix. Continuing with the example, Qldpc=24 for rate 13/15, so for information bit i1, the following operations are performed:

$p_{1007}=p_{1007} \oplus i_0 \ p_{2839}=p_{2839} \oplus i_0$ $p_{4861}=p_{4861} \oplus i_0 \ p_{5013}=p_{5013} \oplus i_0$ $p_{6162}=p_{6162} \oplus i_0 \ p_{6482}=p_{6482} \oplus i_0$ $p_{6945}=p_{6945} \oplus i_0 \ p_{6998}=p_{6998} \oplus i_0$ $p_{7596}=p_{7596} \oplus i_0 \ p_{8284}=p_{8284} \oplus i_0$ $p_{8520}=p_{8520} \oplus i_0$  [expression 7]

4) For the 361st information bit i360, the addresses of the parity bit accumulators are given in the second row of the addresses of parity check matrix. In a similar manner the addresses of the parity bit accumulators for the following 359 information bits is, s=361, 362, . . . , 719 are obtained using the expression 6, where x denotes the address of the parity bit accumulator corresponding to the information bit i360, i.e., the entries in the second row of the addresses of parity check matrix.

5) In a similar manner, for every group of 360 new information bits, a new row from addresses of parity check matrixes used to find the addresses of the parity bit accumulators.

After all of the information bits are exhausted, the final parity bits are obtained as follows:

6) Sequentially perform the following operations starting with i=1

$p_i=p_i \oplus p_{i-1}, i=1,2,\ldots,N_{ldpc}-K_{ldpc}-1$  [Math figure 8]

where final content of pi, i=0, 1, . . . , Nldpc−Kldpc−1 is equal to the parity bit pi.

TABLE 30

| Code Rate | $Q_{ldpc}$ |
|---|---|
| 5/15 | 120 |
| 6/15 | 108 |
| 7/15 | 96 |
| 8/15 | 84 |
| 9/15 | 72 |
| 10/15 | 60 |
| 11/15 | 48 |
| 12/15 | 36 |
| 13/15 | 24 |

This LDPC encoding procedure for a short FECBLOCK is in accordance with t LDPC encoding procedure for the long FECBLOCK, except replacing the table 30 with table 31, and replacing the addresses of parity check matrix for the long FECBLOCK with the addresses of parity check matrix for the short FECBLOCK.

TABLE 31

| Code Rate | $Q_{ldpc}$ |
|---|---|
| 5/15 | 30 |
| 6/15 | 27 |
| 7/15 | 24 |
| 8/15 | 21 |
| 9/15 | 18 |
| 10/15 | 15 |
| 11/15 | 12 |
| 12/15 | 9 |
| 13/15 | 6. |

Figure 23:
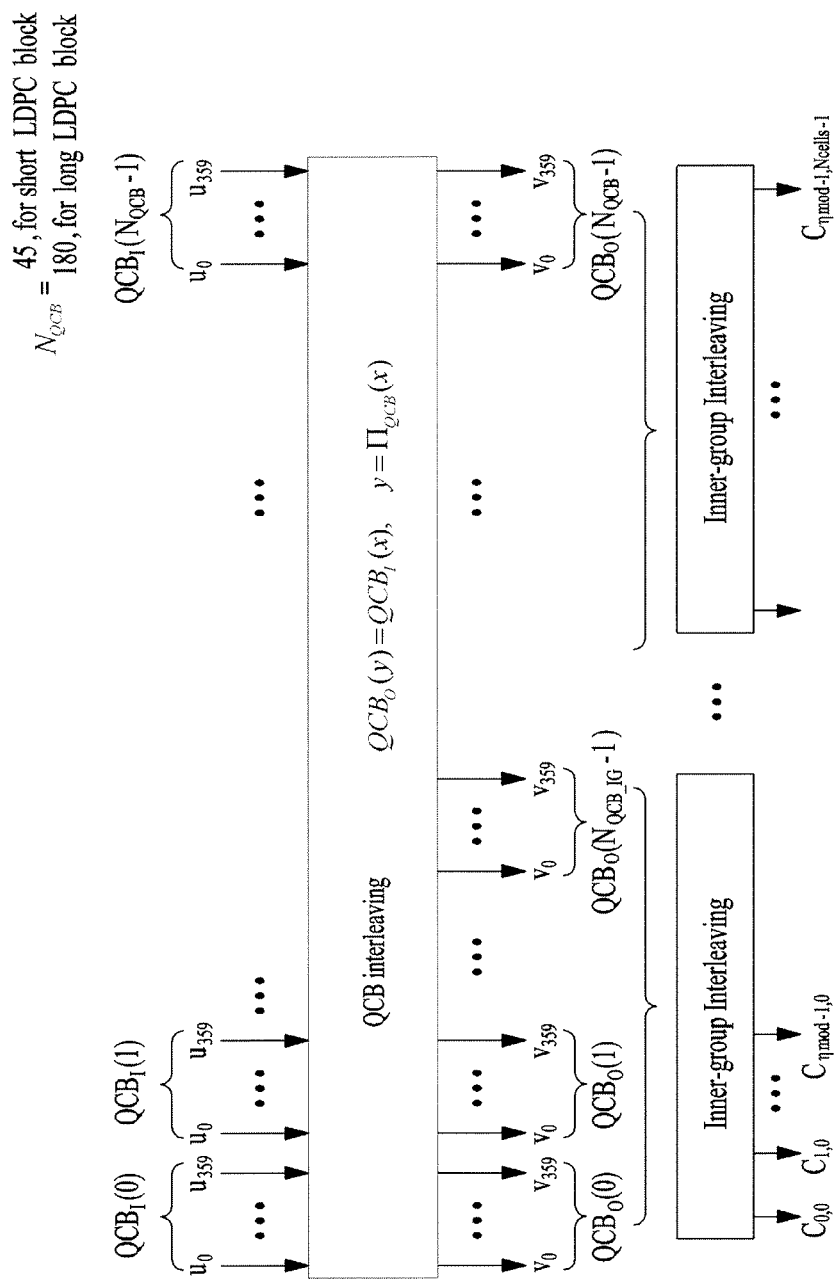
FIG. 23 illustrates a bit interleaving according to an embodiment of the present invention.

FIG. 23 illustrates a bit interleaving according to an embodiment of the present invention.

The outputs of the LDPC encoder are bit-interleaved, which consists of parity interleaving followed by Quasi-Cyclic Block (QCB) interleaving and inner-group interleaving.

shows Quasi-Cyclic Block (QCB) interleaving and (b) shows inner-group interleaving.

The FECBLOCK may be parity interleaved. At the output of the parity interleaving, the LDPC codeword consists of 180 adjacent QC blocks in a long FECBLOCK and 45 adjacent QC blocks in a short FECBLOCK. Each QC block in either a long or short FECBLOCK consists of 360 bits. The parity interleaved LDPC codeword is interleaved by QCB interleaving. The unit of QCB interleaving is a QC block. The QC blocks at the output of parity interleaving are permutated by QCB interleaving as illustrated in FIG. 23, where Ncells=64800/η mod or 16200/η mod according to the FECBLOCK length. The QCB interleaving pattern is unique to each combination of modulation type and LDPC code rate.

After QCB interleaving, inner-group interleaving is performed according to modulation type and order (η mod) which is defined in the below table 32. The number of QC blocks for one inner-group, NQCB_IG, is also defined.

TABLE 32

| Modulation type | $\eta_{mod}$ | $N_{QCB\_IG}$ |
|---|---|---|
| QAM-16 | 4 | 2 |
| NUC-16 | 4 | 4 |
| NUQ-64 | 6 | 3 |
| NUC-64 | 6 | 6 |
| NUQ-256 | 8 | 4 |
| NUC-256 | 8 | 8 |
| NUQ-1024 | 10 | 5 |
| NUC-1024 | 10 | 10. |

The inner-group interleaving process is performed with NQCB_IG QC blocks of the QCB interleaving output. Inner-group interleaving has a process of writing and reading the bits of the inner-group using 360 columns and NQCB_IG rows. In the write operation, the bits from the QCB interleaving output are written row-wise. The read operation is performed column-wise to read out m bits from each row, where m is equal to 1 for NUC and 2 for NUQ.

Figure 24:
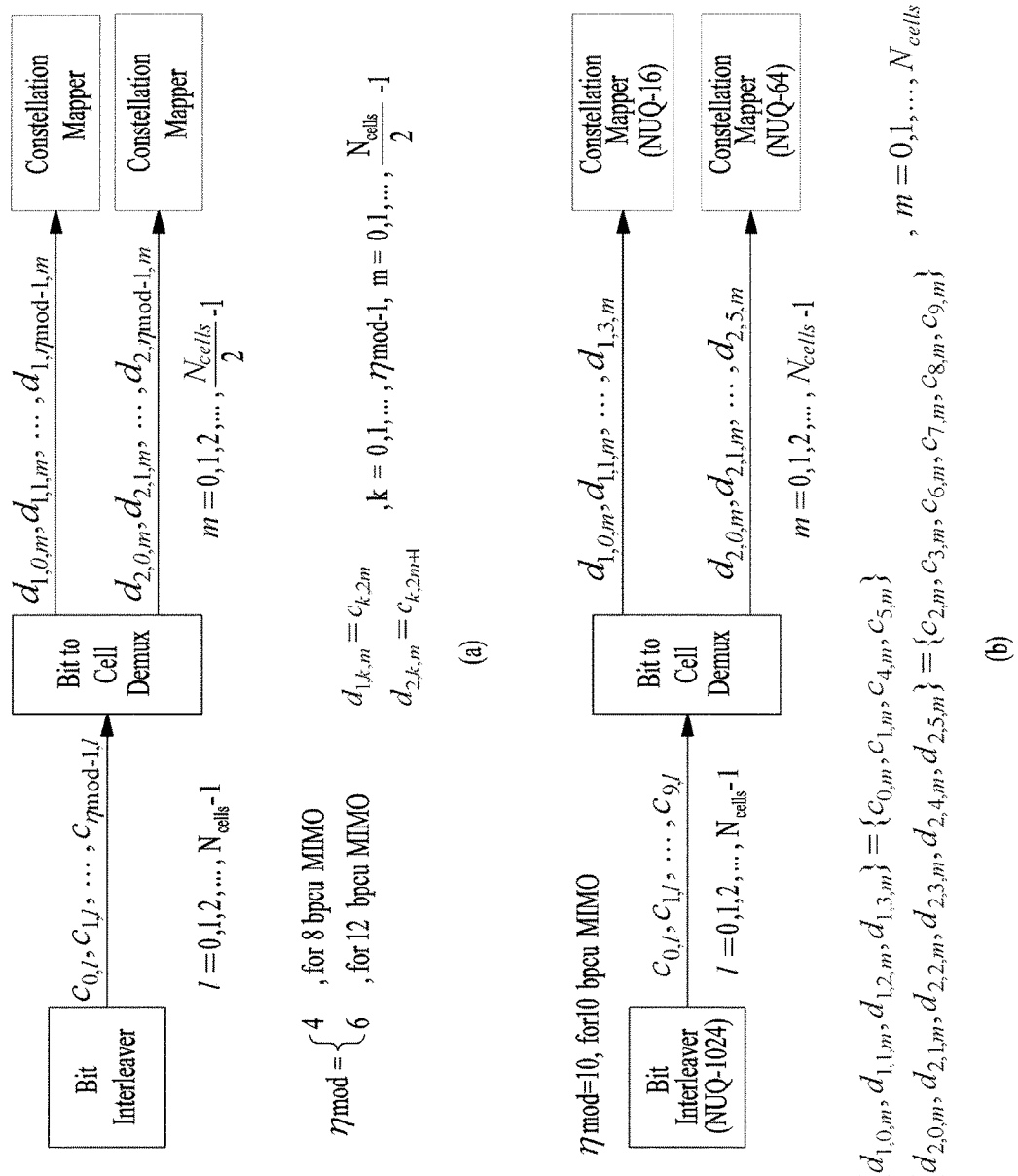
FIG. 24, including views (a) and (b), illustrates a cell-word demultiplexing according to an embodiment of the present invention.

FIG. 24 including views (a) and (b), illustrates a cell-word demultiplexing according to an embodiment of the present invention.

FIG. 24(a) shows a cell-word demultiplexing for 8 and 12 bpcu MIMO and FIG. 24(b) shows a cell-word demultiplexing for 10 bpcu MIMO.

Each cell word (c0,1, c1,1, . . . , c η mod−1,1) of the bit interleaving output is demultiplexed into (d1,0,m, d1,1, m . . . , d1, η mod−1,m) and (d2,0,m, d2,1,m . . . , d2, η mod−1,m) as shown in (a), which describes the cell-word demultiplexing process for one XFECBLOCK.

For the 10 bpcu MIMO case using different types of NUQ for MIMO encoding, the Bit Interleaver for NUQ-1024 is re-used. Each cell word (c0,1, c1,1, . . . , c9,1) of the Bit Interleaver output is demultiplexed into (d1,0,m, d1,1, m . . . , d1,3,m) and (d2,0,m, d2,1,m . . . , d2,5,m), as shown in (b).

FIG. 25, including views (a), (b) and (c), illustrates a time interleaving according to an embodiment of the present invention.

FIGs. (a) to (c) show examples of TI mode.

The time interleaver operates at the DP level. The parameters of time interleaving (TI) may be set differently for each DP.

The following parameters, which appear in part of the PLS2-STAT data, configure the TI:

DP_TI_TYPE (allowed values: 0 or 1): Represents the TI mode; '0' indicates the mode with multiple TI blocks (more than one TI block) per TI group. In this case, one TI group is directly mapped to one frame (no inter-frame interleaving). '1' indicates the mode with only one TI block per TI group. In this case, the TI block may be spread over more than one frame (inter-frame interleaving).

DP_TI_LENGTH: If DP_TI_TYPE='0', this parameter is the number of TI blocks NTI per TI group. For DP_TI_TYPE='1', this parameter is the number of frames PI spread from one TI group.

DP_NUM_BLOCK_MAX (allowed values: 0 to 1023): Represents the maximum number of XFECBLOCKs per TI group.

DP_FRAME_(allowed values: 1, 2, 4, 8): Represents the number of the frames IJUMP between two successive frames carrying the same DP of a given PHY profile.

DP_TI_BYPASS (allowed values: 0 or 1): If time interleaving is not used for a DP, this parameter is set to '1'. It is set to '0' if time interleaving is used.

Additionally, the parameter DP_NUM_BLOCK from the PLS2-DYN data is used to represent the number of XFECBLOCKs carried by one TI group of the DP.

When time interleaving is not used for a DP, the following TI group, time interleaving operation, and TI mode are not considered. However, the Delay Compensation block for the dynamic configuration information from the scheduler will still be required. In each DP, the XFECBLOCKs received from the SSD/MIMO encoding are grouped into TI groups. That is, each TI group is a set of an integer number of XFECBLOCKs and will contain a dynamically variable number of XFECBLOCKs. The number of XFECBLOCKs in the TI group of index n is denoted by NxBLOCK_Group (n) and is signaled as DP_NUM_BLOCK in the PLS2-DYN data. Note that NxBLOCK_Group(n) may vary from the minimum value of 0 to the maximum value NxBLOCK_Group_MAX (corresponding to DP_NUM_BLOCK_MAX) of which the largest value is 1023.

Each TI group is either mapped directly onto one frame or spread over PI frames. Each TI group is also divided into more than one TI blocks (NTI), where each TI block corresponds to one usage of time interleaver memory. The TI blocks within the TI group may contain slightly different numbers of XFECBLOCKs. If the TI group is divided into multiple TI blocks, it is directly mapped to only one frame. There are three options for time interleaving (except the extra option of skipping the time interleaving) as shown in the below table 33.

TABLE 33

| Modes | Descriptions |
|---|---|
| Option-1 | Each TI group contains one TI block and is mapped directly to one frame as shown in (a). This option is signaled in the PLS2-STAT by DP_TI_TYPE = '0' and DP_TI_LENGTH = '1' ($N_{TI}$ = 1). |
| Option-2 | Each TI group contains one TI block and is mapped to more than one frame. (b) shows an example, where one TI group is mapped to two frames, i.e., DP_TI_LENGTH = '2' ($P_I$ = 2) and DP_FRAME_INTERVAL ($I_{JUMP}$ = 2). This provides greater time diversity for low data-rate services. This option is signaled in the PLS2-STAT by DP_TI_TYPE = '1'. |
| Option-3 | Each TI group is divided into multiple TI blocks and is mapped directly to one frame as shown in (c). Each TI block may use full TI memory, so as to provide the maximum bit-rate for a DP. This option is signaled in the PLS2-STAT signaling by DP_TI_TYPE = '0' and DP_TI_LENGTH = $N_{TI}$, while $P_I$ = 1. |

In each DP, the TI memory stores the input XFECBLOCKs (output XFECBLOCKs from the SSD/MIMO encoding block). Assume that input XFECBLOCKs are defined as $(d_{n,s,0,0}, d_{n,s,0,1}, \ldots, d_{n,s,0,N_{cells}-1}, d_{n,s,1,0}, \ldots, d_{n,s,1,N_{cells}-1}, \ldots, d_{n,s,N_{xBLOCK\_TI}(n,s)-1,0}, \ldots, d_{n,s,N_{xBLOCK\_TI}(n,s)-1,N_{cells}-1})$, where $d_{n,s,r,q}$ is the qth cell of the rth XFECBLOCK in the sth TI block of the nth TI group and represents the outputs of SSD and MIMO encodings as follows $$d_{n,s,r,q} = \begin{cases} f_{n,s,r,q}, & \text{the output of } SSD \text{ ... encoding} \\ g_{n,s,r,q}, & \text{the output of } MIMO \text{ encoding} \end{cases}.$$

In addition, assume that output XFECBLOCKs from the time interleaver 5050 are defined as $(H_{n,s,0}, H_{n,s,1}, \ldots, h_{n,s,i}, \ldots, h_{n,s,N_{xBLOCK\_TI}(n,s) \times N_{cells}-1})$, where $h_{n,s,i}$ is the ith output cell (for i=0, . . . , $N_{xBLOCK\_TI}$ (n, s)$\times N_{cells}$−1) in the sth TI block of the nth TI group.

Typically, the time interleaver will also act as a buffer for DP data prior to the process of frame building. This is achieved by means of two memory banks for each DP. The first TI-block is written to the first bank. The second TI-block is written to the second bank while the first bank is being read from and so on.

The TI is a twisted row-column block interleaver. For the sth TI block of the nth TI group, the number of rows $N_r$ of a TI memory is equal to the number of cells $N_{cells}$, i.e., $N_r = N_{cells}$ while the number of columns $N_c$ is equal to the number $N_{xBLOCK\_TI}(n, s)$.

Figure 26:
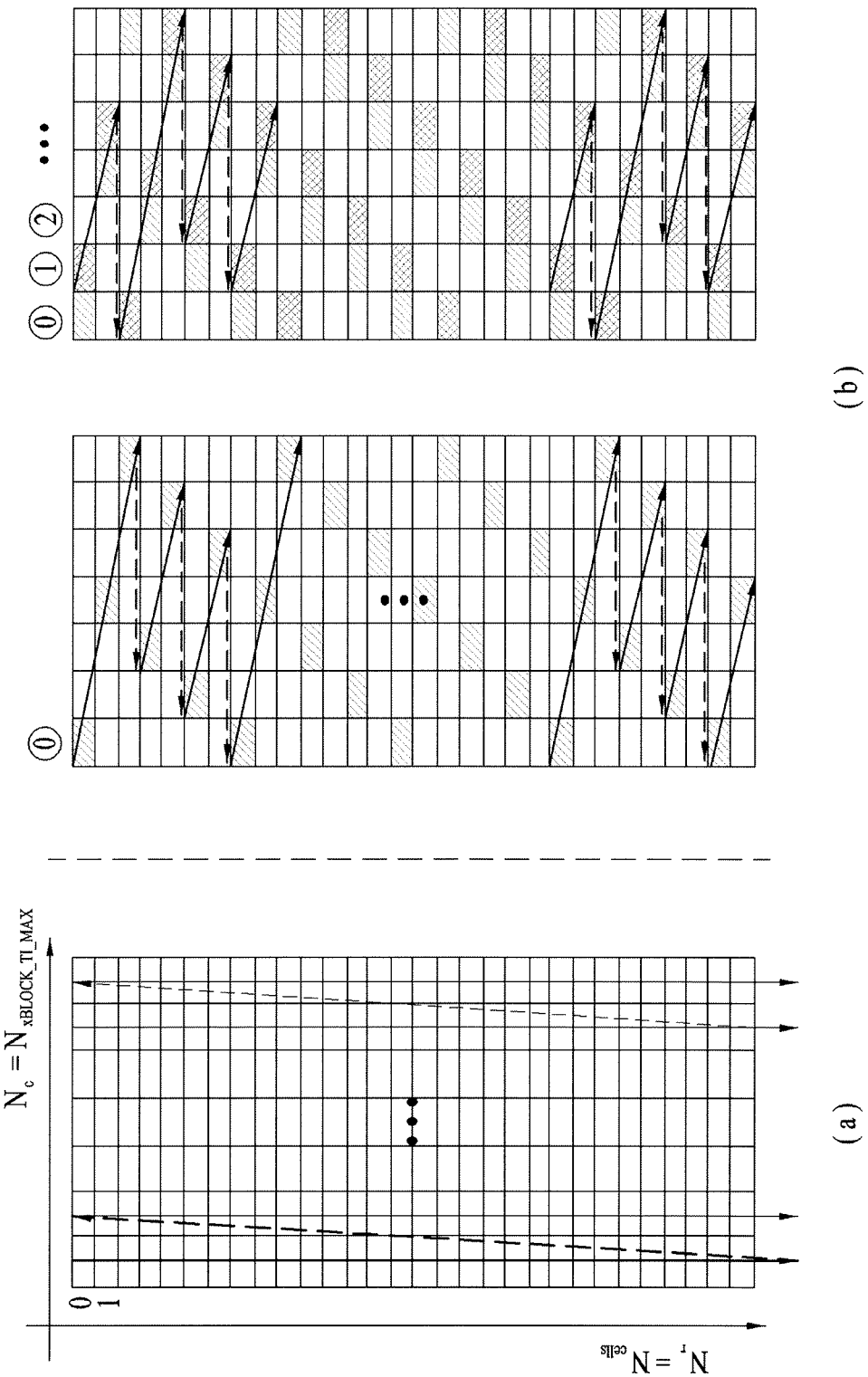
FIG. 26, including views (a) and (b), illustrates the basic operation of a twisted row-column block interleaver according to an embodiment of the present invention.

FIG. 26, including views (a) and (b), illustrates the basic operation of a twisted row-column block interleaver according to an embodiment of the present invention.

FIG. 26 (a) shows a writing operation in the time interleaver and FIG. 26(b) shows a reading operation in the time interleaver The first XFECBLOCK is written column-wise into the first column of the TI memory, and the second XFECBLOCK is written into the next column, and so on as shown in (a). Then, in the interleaving array, cells are read out diagonal-wise. During diagonal-wise reading from the first row (rightwards along the row beginning with the left-most column) to the last row, $N_r$, cells are read out as shown in (b). In detail, assuming $z_{n,s,i}$ (i=0, . . . , $N_r, N_c$) as the TI memory cell position to be read sequentially, the reading process in such an interleaving array is performed by calculating the row index $R_{n,s,i}$, the column index $C_{n,s,i}$, and the associated twisting parameter $T_{n,s,i}$ as follows expression.

$$\text{GENERATE}(R_{n,s,i}, C_{n,s,i}) = \qquad \text{[expression 9]}$$

$$\{$$
$$R_{n,s,i} = \mod(i, N_r),$$
$$T_{n,s,i} = \mod(S_{shift} \times R_{n,s,i}, N_c),$$
$$C_{n,s,i} = \mod\left(T_{n,s,i} + \left\lfloor \frac{i}{N_r} \right\rfloor, N_c\right)$$
$$\}$$

where $S_{shift}$ is a common shift value for the diagonal-wise reading process regardless of $N_{xBLOCK\_TI}(n, s)$, and it is determined by $N_{xBLOCK\_TI\_MAX}$ given in the PLS2-STAT as follows expression.

[expression 10]

$$\text{for}$$
$$\begin{cases} N'_{xBLOCK\_TI\_MAX} = N_{xBLOCK\_TI\_MAX} + 1, & \text{if } N'_{xBLOCK\_TI\_MAX} \bmod 2 = 0 \\ N'_{xBLOCK\_TI\_MAX} = N_{xBLOCK\_TI\_MAX}, & \text{if } N_{xBLOCK\_TI\_MAX} \bmod 2 = 1 \end{cases},$$
$$S_{shift} = \frac{N'_{xBLOCK\_TI\_MAX} - 1}{2}$$

As a result, the cell positions to be read are calculated by a coordinate as $z_{n,s,i} = N_r C_{n,s,i} + R_{n,s,i}$.

Figure 27:
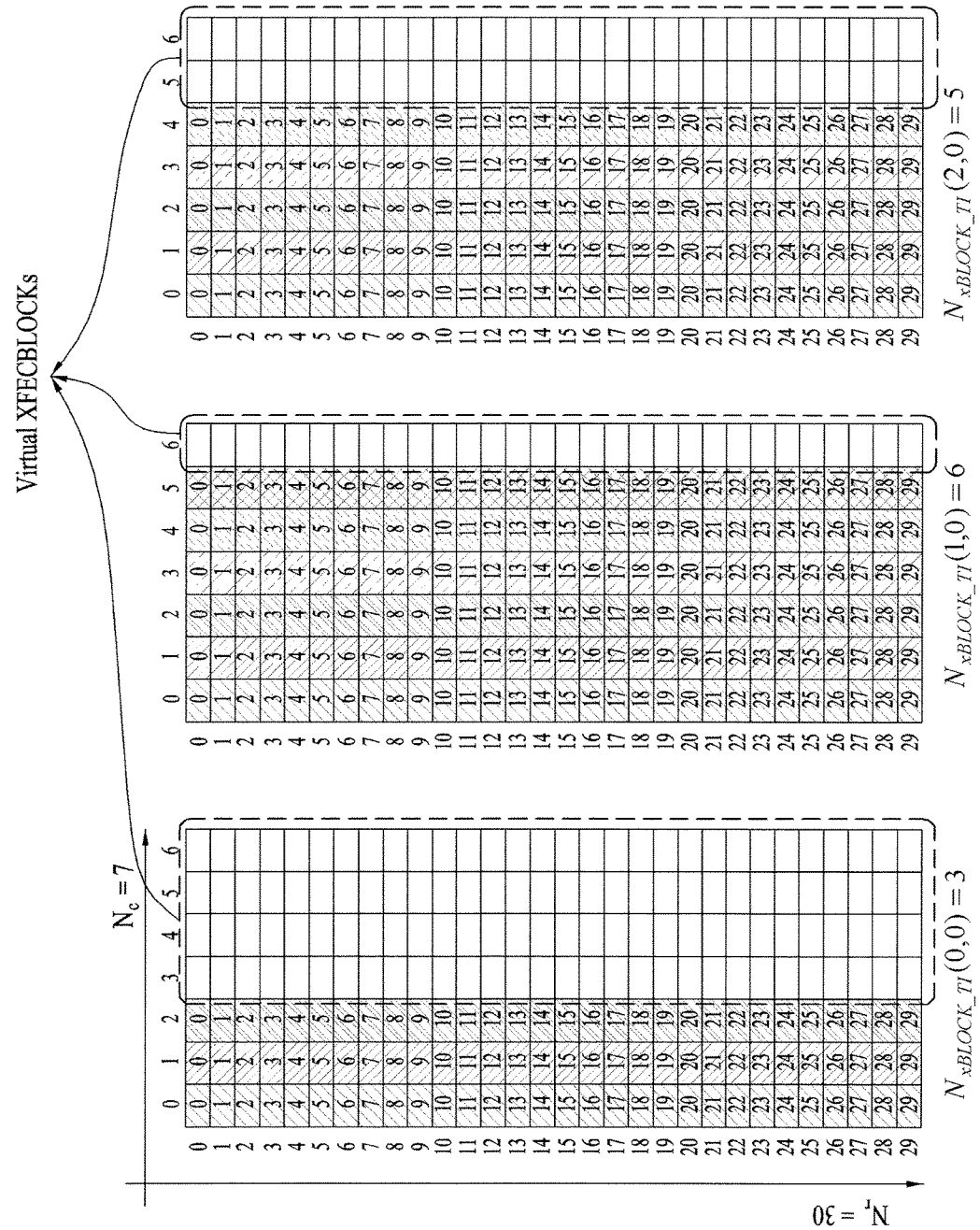
FIG. 27 illustrates an operation of a twisted row-column block interleaver according to another embodiment of the present invention.

FIG. 27 illustrates an operation of a twisted row-column block interleaver according to another embodiment of the present invention.

More specifically, FIG. 27 illustrates the interleaving array in the TI memory for each TI group, including virtual XFECBLOCKs when $N_{xBLOCK\_TI}(0,0) = N_{xBLOCK\_TI}(1,0) = 6$, $N_{xBLOCK\_TI}(2, 0) = 5$.

The variable number $N_{xBLOCK\_TI}(n, s) = N_r$ will be less than or equal to $N'_{xBLOCK\_TI\_MAX}$. Thus, in order to achieve a single-memory deinterleaving at the receiver side, regardless of $N_{xBLOCK\_TI}(n, s)$, the interleaving array for use in a twisted row-column block interleaver is set to the size of $N_r \times N_c = N_{cells} \times N'_{xBLOCK\_TI\_MAX}$ by inserting the virtual XFECBLOCKs into the TI memory and the reading process is accomplished as follow expression.

[expression11]

```
p = 0;
for i = 0;i < N_cells N'_xBLOCK_TI_MAX;i = i + 1
{GENERATE(R_{n,s,i},C_{n,s,i});
V_i = N_r C_{n,s,j} + R_{n,s,j}
    if V_i < N_cells N_xBLOCK_TI(n,s)
    {
        Z_{n,s,p} = V_i; p = p + 1;
    }
}
```

The number of TI groups is set to 3. The option of time interleaver is signaled in the PLS2-STAT data by DP_TI_TYPE='0', DP_FRAME_INTERVAL='1', and DP_TI_LENGTH='1', i.e., NTI=1, IJUMP=1, and PI=1. The number of XFECBLOCKs, each of which has Ncells=30 cells, per TI group is signaled in the PLS2-DYN data by NxBLOCK_TI(0,0)=3, NxBLOCK_TI(1,0)=6, and NxBLOCK_TI(2,0)=5, respectively. The maximum number of XFECBLOCK is signaled in the PLS2-STAT data by NxBLOCK_Group_MAX, which leads to $\lfloor N_{xBLOCK\_Group\_MAX} / N_{TI} \rfloor = N_{xBLOCK\_TI\_MAX} = 6$.

Figure 28:
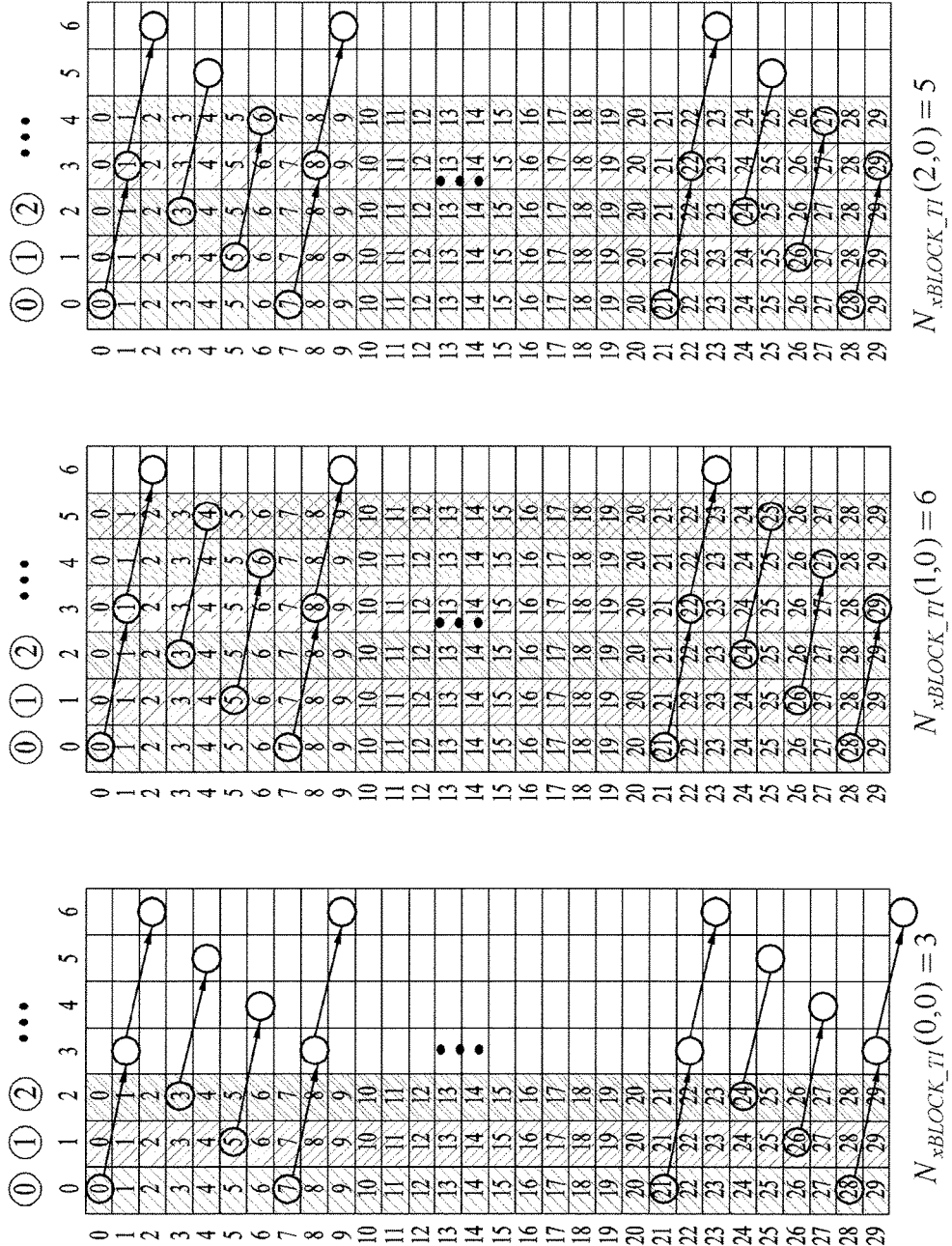
FIG. 28 illustrates a diagonal-wise reading pattern of a twisted row-column block interleaver according to an embodiment of the present invention.

FIG. 28 illustrates a diagonal-wise reading pattern of a twisted row-column block interleaver according to an embodiment of the present invention.

More specifically FIG. 28 shows a diagonal-wise reading pattern from each interleaving array with parameters of $N'_{xBLOCK\_TI\_MAX} = 7$ and Sshift=(7−1)/2=3. Note that in the reading process shown as pseudocode above, if $V_i \geq N_{cells} N_{xBLOCK\_TI}(n, s)$, the value of Vi is skipped and the next calculated value of Vi is used.

Figure 29:
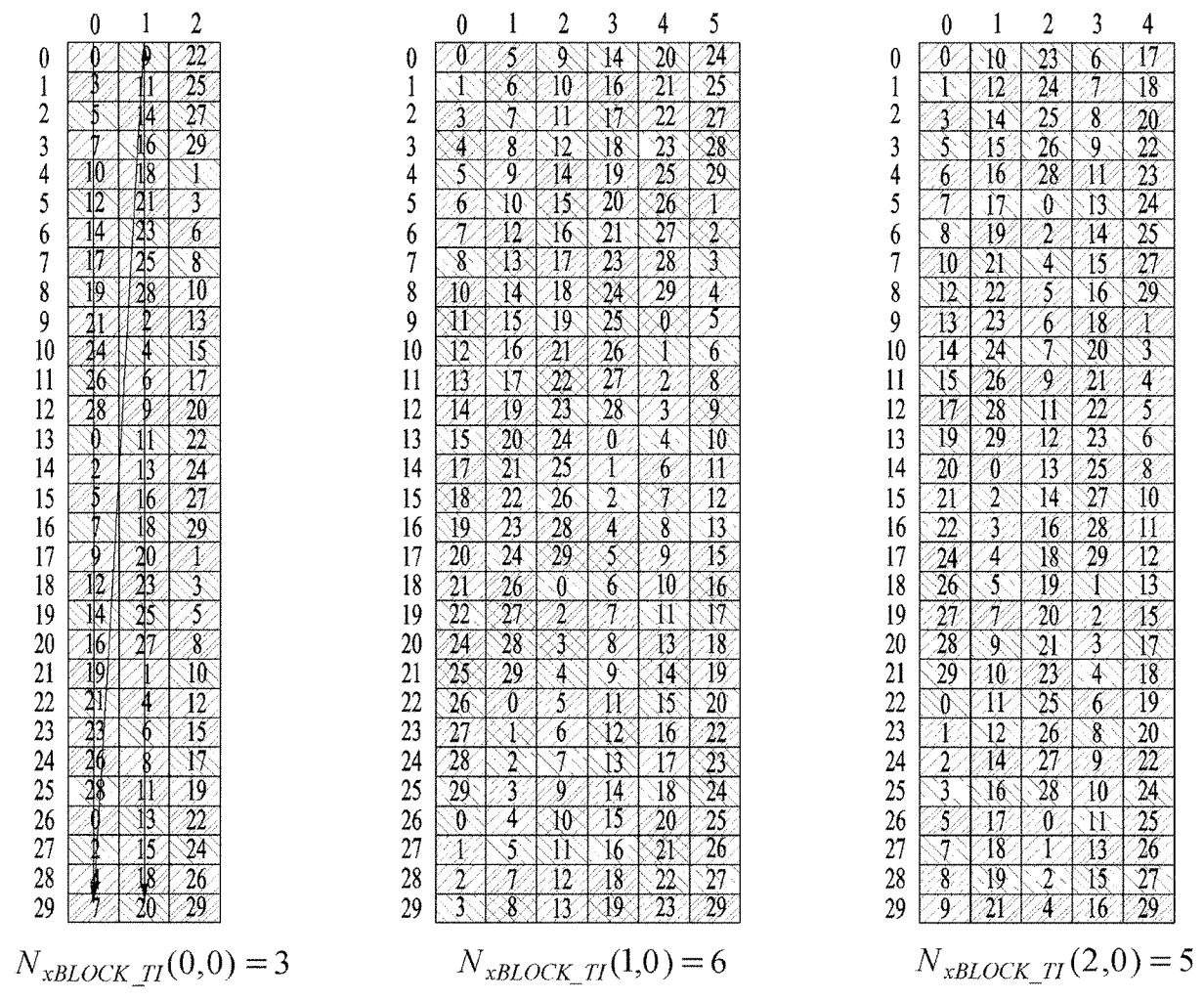

FIG. 29 illustrates interleaved XFECBLOCKs from each interleaving array according to an embodiment of the present invention.

FIG. 29 illustrates the interleaved XFECBLOCKs from each interleaving array with parameters of $N'_{xBLOCK\_TI\_MAX} = 7$ and Sshift=3.

FIG. 30, including views (a) and (b), illustrates a protocol stack according to an embodiment of the present invention. As illustrated in FIG. 30(*a*), a link layer may perform link layer signaling, encapsulation, and/or overhead reduction. The link layer may perform overhead reduction and encapsulation on a packet received from an upper layer to deliver the packet to a physical layer. The present invention proposes a configuration of the link layer of the protocol stack and proposes a scheme of delivering an MPEG-2 TS packet which is delivered from an upper layer to a physical layer. In the present invention, the broadcast signal transmission apparatus may encapsulate the MPEG-2 TS packet in the link layer and deliver the packet to the physical layer. The broadcast signal transmission apparatus may perform overhead reduction on the MPEG-2 TS packet in the link layer, thereby efficiently using radio resources.

The link layer may be referred to as an encapsulation layer or a layer 2. Hereinafter, a description will be given using the term link layer. In actual application of the present invention, the above other terms may be used instead or a new name may be applied.

FIG. 30(*b*) illustrates a flow of data between layers in the broadcast signal transmission apparatus and the broadcast signal reception apparatus. The broadcast signal transmission apparatus may use an IP and/or MPEG-2 TS packet, which is used in digital broadcasting, as input data.

The IP and/or MPEG-2 TS packet input to the broadcast signal transmission apparatus may be delivered to the physical layer through the link layer. The physical layer may have difficulty in adaptively processing packets for various protocols. Therefore, the link layer of the broadcast signal transmission apparatus may encapsulate packets which use different protocols in packets having a constant format and deliver the encapsulated packet to the physical layer. This process may be defined as encapsulation. To efficiently use radio resources in the encapsulation process, the link layer may use an overhead reduction scheme suitable for an upper layer protocol corresponding to each packet. A link layer signal and data encapsulated in the link layer are delivered to the physical layer, and the physical layer may transmit a broadcast signal through the above-described process. Here, the link layer signal may include the following three types of signaling information. First signaling information is signaling information which is delivered from an upper layer to the link layer and to be delivered to an upper layer of the broadcast signal reception apparatus. Second signaling information corresponds to a signal which is generated in the link layer to provide information for data processing of a link layer of the broadcast signal reception apparatus. Third signaling information is generated in the upper layer or the link layer. However, the third signaling information corresponds to a signal delivered for rapid detection of a broadcast signal in the physical layer.

The broadcast signal reception apparatus may restore data and signals, delivered from the physical layer, to data formats processable in an upper layer and deliver the restored data and signals. In this instance, it is possible to verify whether a packet delivered from the physical layer is a signal or data by reading a header of the packet or using another scheme. In addition, a delivered signal may be used to restore a packet, overhead of which is reduced, to an original packet.

Figure 31:
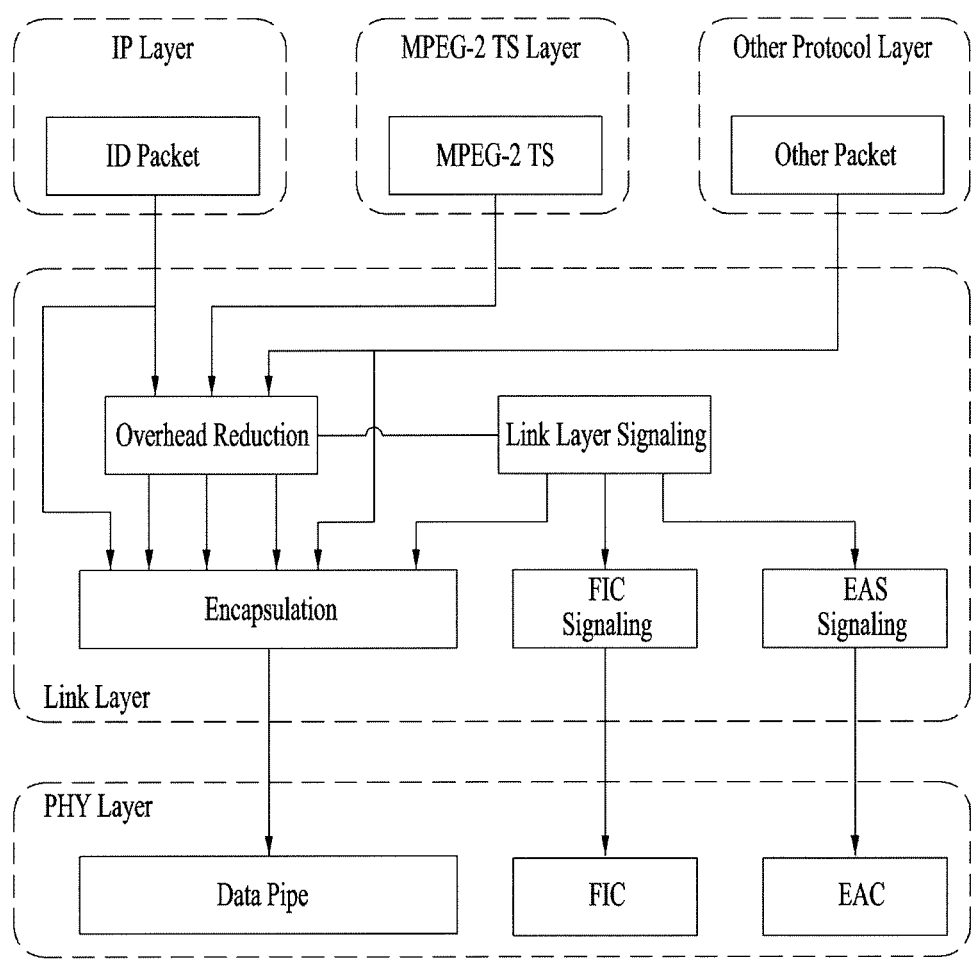
FIG. 31 illustrates an interface and an operation of the link layer included in the broadcast signal transmission apparatus according to an embodiment of the present invention.

FIG. 31 illustrates an interface and an operation of the link layer included in the broadcast signal transmission apparatus according to an embodiment of the present invention. An IP packet may be subjected to an overhead reduction function and encapsulated and then delivered to the physical layer, or directly encapsulated without being subjected to the overhead reduction function and delivered to the physical layer.

An MPEG-2 TS packet is subjected to the overhead reduction function, encapsulated, and then delivered to the physical layer. The MPEG-2 TS packet may be directly encapsulated without being subjected to the overhead reduction function. However, exclusion of fixed overhead such as sync byte (0x47), etc. positioned at a head of the packet may assist in efficiently using a resource in a radio interval. The overhead reduction function to be described below may be applied to the header compression block 3040 described with reference to FIG. 3.

Even when a packet delivered through the link layer is not the IP or MPEG-2 TS packet, the packet may be delivered to the physical layer through a similar process to that of the IP packet. In this instance, whether to apply the overhead reduction function to the packet may be determined according to characteristics of the packet.

The broadcast signal transmission apparatus reduces a size of an input packet using a scheme corresponding to the packet in an overhead reduction process. The broadcast signal transmission apparatus may extract and generate particular information related to overhead reduction in the overhead reduction process, and transmit the particular information through signaling. The signaling enables a receiver to restore a packet changed in the overhead reduction process to an original packet to be transmitted.

A signal may be transmitted and the transmission may be managed in the link layer of the broadcast signal transmission apparatus. In addition, a signaling transmission module may be configured according to physically and logically separated transmission paths in the physical layer of the broadcast signal transmission apparatus, and a signal which is not transmitted through a particular transmission path may be encapsulated and transmitted through a physical layer pipe (PLP). The PLP corresponds to a logical unit for transmission of data in the physical layer, and may be referred to as the data pipe described above. As described in the foregoing, a signal managed in the link layer may include information delivered from an upper layer, a system parameter, a signal generated in the link layer, etc.

Figure 32:
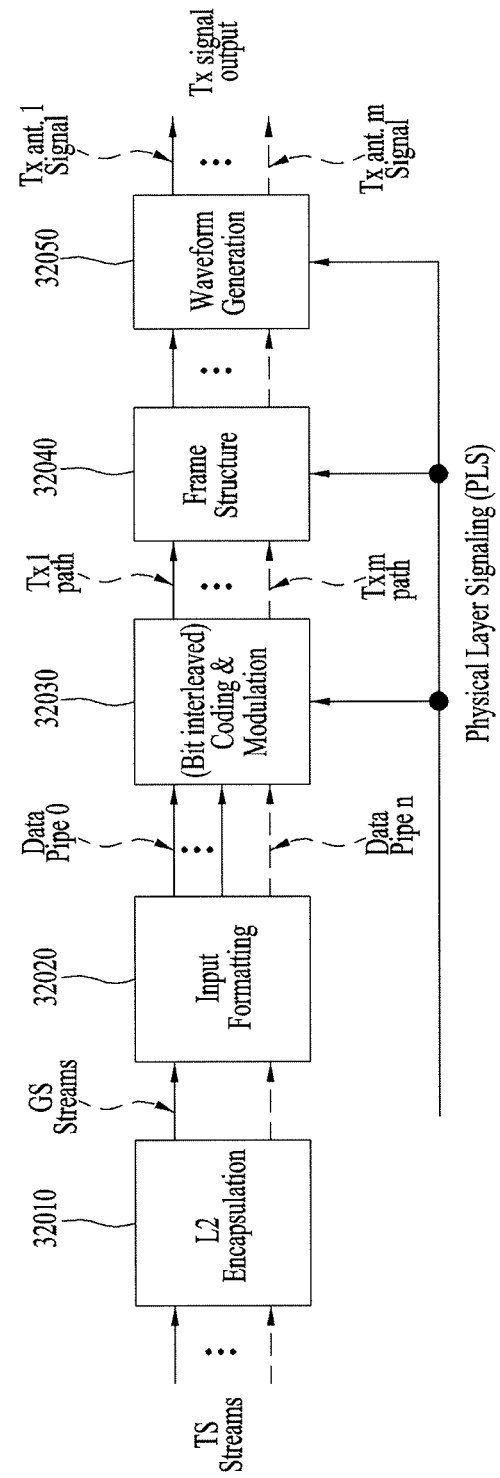
FIG. 32 illustrates a broadcast signal transmission apparatus according to an embodiment of the present invention.

FIG. 32 illustrates a broadcast signal transmission apparatus according to an embodiment of the present invention. The broadcast signal transmission apparatus may include a link layer (L2) encapsulator 32010, an input formatter 32020, an interleaver and encoder 32030, a frame builder 32040, and/or a modulator 32050. In the present invention, the L2 encapsulator 32010 may perform overhead reduction on a packet delivered from an upper layer, and then output the packet to the input formatter 32020 which belongs to a physical layer. The input formatter 32020 may output an input stream in PLPs, and the interleaver and encoder 32030 may interleave and encode input PLP data. In addition, the frame builder 32040 may build a frame using the encoded PLP data, and the modulator 32050 may generate and transmit a broadcast signal using an OFDM modulation scheme. The broadcast signal transmission apparatus may transmit the broadcast signal using a transmitter.

An input signal input to the input formatter 32020 may correspond to a transport stream (TS), an IP stream, and a general stream (GS), and the L2 encapsulator 32010 may encapsulate the input signal according to an L2 structure to generate a GS.

The L2 encapsulator 32010 included in the broadcast signal transmission apparatus of the present invention may receive a TS to generate a GS using a technology of compressing a TS header and deleting a null packet. In this way, the broadcast signal transmission apparatus may perform more efficient transmission when compared to a scheme of directly inputting a TS to the input formatter 32020.

Figure 33:
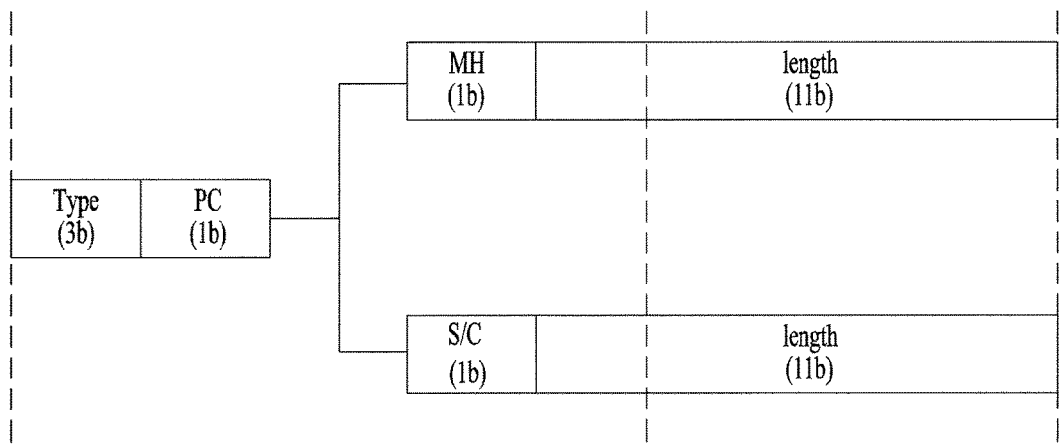
FIG. 33, including views (a) and (b), illustrates a structure of a link layer packet according to an embodiment of the present invention.

FIG. 33, including views (a) and (b), illustrates a structure of a link layer packet according to an embodiment of the present invention.

A link layer is an upper layer of a physical layer. In a broadcast system, generic stream encapsulation (GSE), a type-length-value (TLV) structure, and a basic broadcast protocol (BBP) correspond to the link layer. The link layer packet has a fixed header of a fixed size and may have a structure including an extended header of a variable size according to a configuration of the packet. A payload including data received from an upper layer may be positioned at a tail of a basic header and the extended header of the link layer packet.

A header of the link layer packet may include a field that indicates a type of the payload included in the packet. In the fixed header, the first 3 bits may designate a packet type of an upper layer. In other words, the link layer packet starts with a type field (3 bits) as illustrated in FIG. 33(*a*), and the type field may signal a type of a stream encapsulated by the link layer as illustrated in FIG. 33(*b*).

For example, the type field may be set to a value of 000 when the link layer packet encapsulates an IPv4 packet, and the type field may be set to a value of 010 when the link layer packet encapsulates an MPEG-2 TS.

Figure 34:
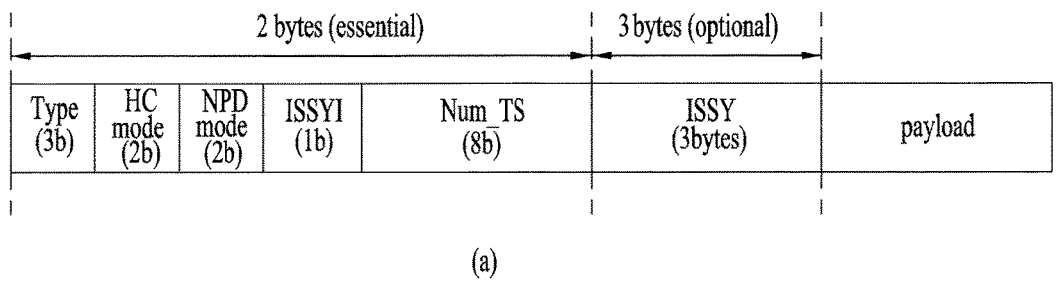
FIG. 34, including views (a), (b) and (c), illustrates a structure of the link layer packet according to an embodiment of the present invention.

FIG. 34, including views (a), (b) and (c), illustrates a structure of the link layer packet according to an embodiment of the present invention.

The broadcast signal transmission apparatus may use the structure of the link layer packet as in FIG. 34(*a*) to transmit an MPEG-2 TS. The link layer packet may include a type field, an HC_mode field, an NPD mode field, an ISSYI field, a Num_TS field, an ISSY field and/or a payload. The broadcast signal transmission apparatus may set the type field of the link layer packet which transmits the TS to 010. In other words, the type field may indicate that a payload transmitted through the link layer packet is a TS packet. The link layer packet may configure fields positioned subsequent to the type field as fields for transmission of the TS. In other words, the link layer packet may include the HC_mode field, the NPD_mode field, and the Num_TS field corresponding to the fields for transmission of the TS.

The HC_mode field has 2 bits, and may include information about a header compression mode of the TS packet transmitted through the payload. As illustrated in FIG. 34(*b*), the header compression mode may include four modes. When a value of the HC_mode field is 00, the value indicates HC_mode1, and a header of the TS of 188 bytes may be compressed by deleting Sync byte (0x47) included in the header. The broadcast signal transmission apparatus may compress a length of the header corresponding to 188 bytes into 187 bytes through HC_mode1. When a value of the HC_mode field is 01, the value indicates HC_mode2, and the header may be compressed by compressing a PID (13 bits). HC_mode2 may include a scheme of deleting Sync byte (0x47) of HC_mode1. The broadcast signal transmission apparatus may compress a length of the header corresponding to 188 bytes into 186 bytes through HC_mode2. When a value of the HC_mode field is 10, the value indicates HC_mode3. When a PID of the TS to be transmitted is the same as another PID, a header may be compressed by deleting the PID (13 bits). HC_mode3 may include a scheme of deleting Sync byte (0x47) of HC_mode1. The broadcast signal transmission apparatus may compress a length of the header corresponding to 188 bytes into 185 bytes through HC_mode3. When a value of the HC_mode field is 11, the value indicates HC_mode4. When all fields in addition to a PID of the TS to be transmitted are the same as other fields and another PID, the header may be compressed by deleting a TS header. HC_mode4 may include a scheme of deleting Sync byte (0x47) of HC_mode1. The broadcast signal transmission apparatus may compress a length of the header corresponding to 188 bytes into 184 bytes through HC_mode4.

The NPD_mode field has 2 bits, and may include information about a null packet deletion mode of the TS transmitted through the payload. As illustrated in FIG. 34(c), the null packet deletion mode may include four modes. When a value of the NPD_mode field is 00, null packets may be transmitted without being deleted. When a value of the NPD_mode field is 01, null packets are deleted, and the number of deleted null packets may be indicated by inserting a DNP (8 bits) into a tail of each TS packet. When a value of the NPD_mode field is 10, a series of TS packets is transmitted until a null packet appears. When the null packet appears, the null packet may be deleted and a 1-byte DNP may be inserted into a tail of an L2 payload. This scheme may be used in a case of a low frequency of null packets. When a value of the NPD_mode field is 11, a series of TS packets is transmitted until a null packet appears. When the null packet appears, the null packet may be deleted and a 2-byte DNP may be inserted into a tail of the L2 payload. This scheme may be used in a case of a low frequency of null packets.

The ISSYI field has 1 bit, and may include information that indicates whether the ISSY field is used. When a value of the ISSYI field is 0, the ISSY field may not be used and an L2 header may have 2 bytes. When a value of the ISSYI field is 1, the ISSYI field may be present, and the ISSYI field may transmit an ISSY value of an initial TS packet according to an ISSY field rule used in DVB-T2.

The Num_TS field has 8 bits, and may signal the number of TS packets encapsulated in the link layer.

Figure 35:
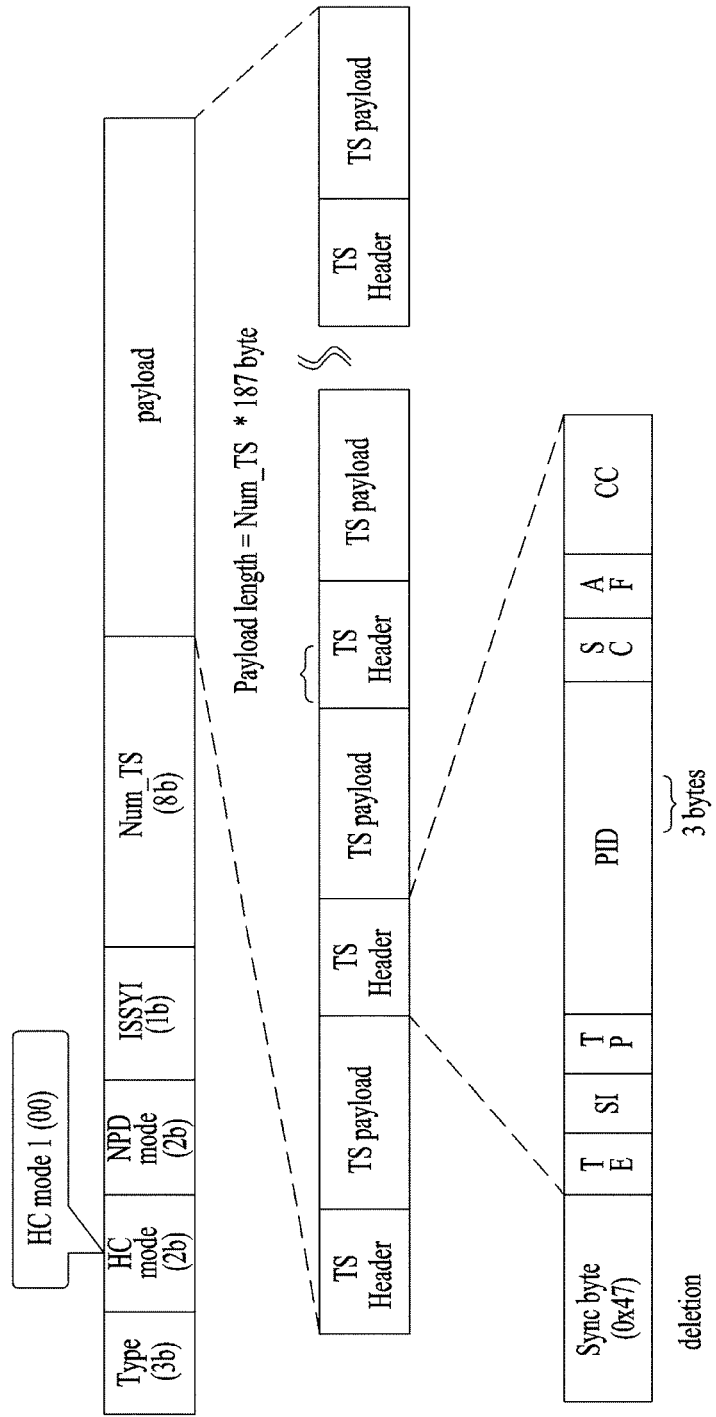
FIG. 35 illustrates a first header compression scheme according to an embodiment of the present invention.

FIG. 35 illustrates a first header compression scheme according to an embodiment of the present invention. A first header compression mode may be expressed by HC_mode1. When a header compression mode used for a link layer packet is HC_mode1, a value of the HC_mode field may be set to 00. In addition, a TS packet of 187 bytes configured by excluding Sync byte from a TS packet of 188 bytes may be included in a payload of the link layer packet. In this case, a length of the payload is 187*Num_TS, and a total length of the link layer packet may be obtained by adding the length of the payload to a length of an L2 header (2 or 5 bytes). In other words, a TS packet header corresponding to a portion of information transmitted through the payload may be compressed from 4 bytes into 3 bytes and transmitted. As described in the foregoing, the Num_TS field may indicate the number of TS packets encapsulated in the link layer.

Figure 36:
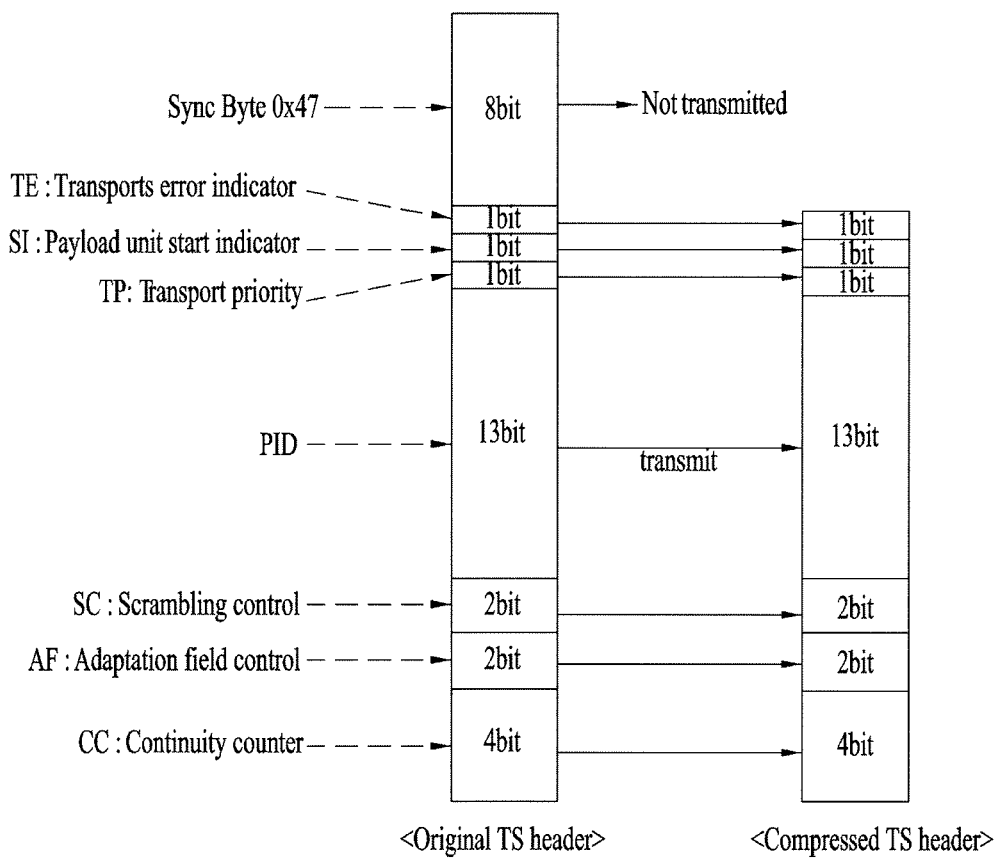
FIG. 36 illustrates a TS packet header compressed by the first header compression mode according to an embodiment of the present invention.

FIG. 36 illustrates a TS packet header compressed by the first header compression mode according to an embodiment of the present invention. As illustrated in the figure, a TS packet header to be subjected to header compression may include Sync Byte, transport error indicator (TE), payload unit start indicator (SI), transport priority (TP), PID, scrambling control (SC), adaptation field control (AF) and/or continuity counter (CC) fields. The broadcast signal transmission apparatus of the invention may delete Sync Byte using HC_mode1 which is the first header compression mode. Therefore, after header compression, the TS packet header may include the TE, SI, TP, PID, SC, AF and/or CC fields. In other words, the broadcast signal transmission apparatus does not transmit Sync Byte in HC_mode1. In this way, the TS packet header of 4 bytes may be compressed into 3 bytes.

Figure 37:
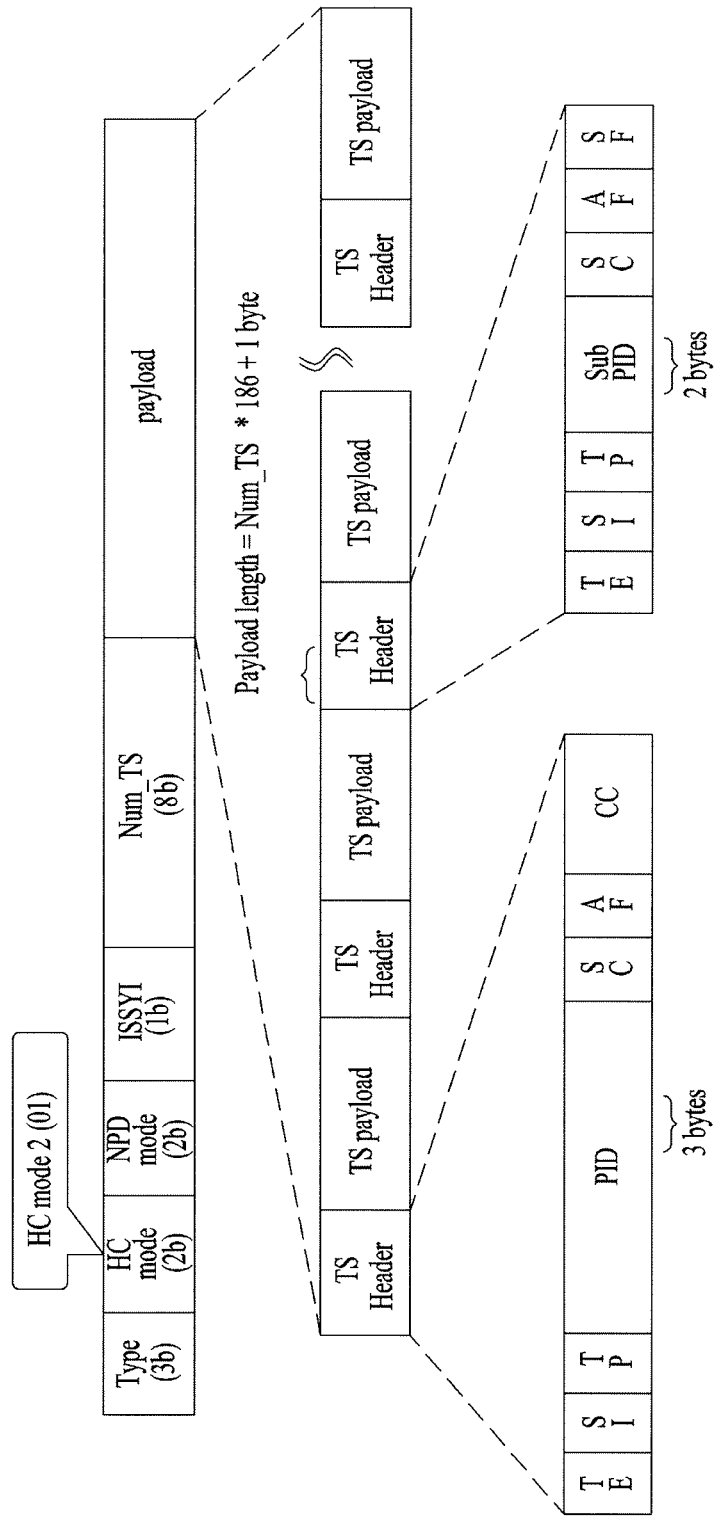
FIG. 37 illustrates a second header compression scheme according to an embodiment of the present invention.

FIG. 37 illustrates a second header compression scheme according to an embodiment of the present invention. A second header compression mode may be expressed by HC_mode2. When a header compression mode used for the link layer packet is HC_mode2, a value of the HC_mode field may be set to 01. In addition, a first TS packet having 187 bytes which is obtained by excluding Sync byte from a TS packet of 188 bytes may be included in a payload of the link layer packet. From a second TS packet included in the payload, a TS packet may have a total length of 186 bytes which includes 2 bytes of a TS header. In other words, in HC_mode2, a broadcast signal transmitter may compress a PID into a sub-PID for TS packets excluding the first TS packet included in the payload. The broadcast signal transmitter may compress a PID of 13 bits into a sub-PID of 8 bits.

In this case, a length of the payload is 186*Num_TS+1 bytes, and a total length of the link layer packet may be obtained by adding the length of the payload to a length of an L2 header (2 or 5 bytes). In other words, in information transmitted through the payload, a first TS packet header may be compressed from 4 bytes into 3 bytes, and each of the other TS packet headers may be compressed from 4 bytes into 2 bytes and transmitted. As described in the foregoing, the Num_TS field may indicate the number of TS packets encapsulated in the link layer.

Figure 38:
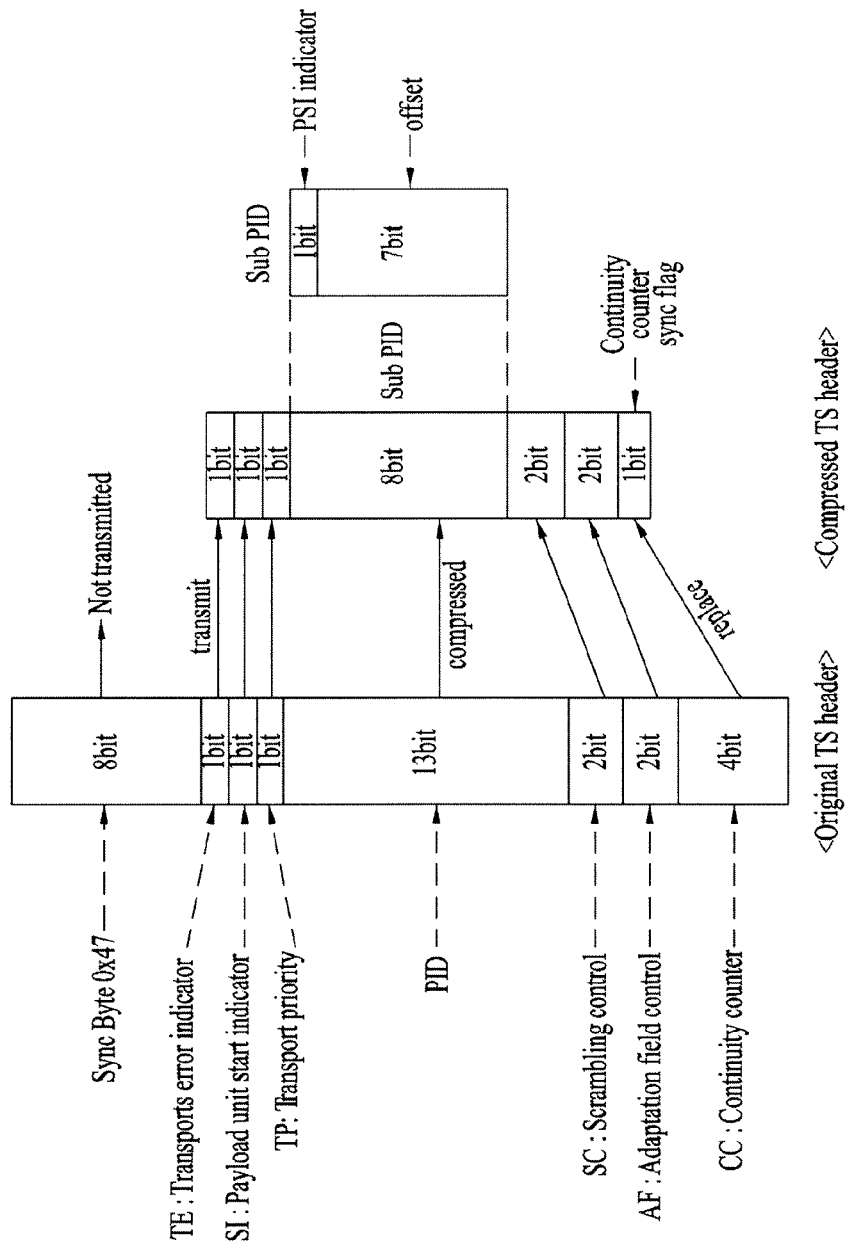
FIG. 38 illustrates a TS packet header compressed by the second header compression mode according to an embodiment of the present invention.

FIG. 38 illustrates a TS packet header compressed by the second header compression mode according to an embodiment of the present invention. As illustrated in the figure, a TS packet header to be subjected to header compression may include Sync Byte, TE, SI, TP, PID, SC, AF and/or CC fields. The broadcast signal transmission apparatus of the present invention may delete Sync Byte and compress a PID using HC_mode2 which is the second header compression mode. Therefore, after header compression, the TS packet header may include TE, SI, TP, sub-PID, SC, AF and/or continuity counter sync flag (SF) fields. In other words, the broadcast signal transmission apparatus does not transmit Sync Byte and compresses the PID in HC_mode2. In this way, the TS packet header of 4 bytes may be compressed into 2 bytes. The broadcast signal transmission apparatus may use an indicator and an index value when compressing the PID of 13 bits. In other words, the broadcast signal transmission apparatus may configure a sub-PID using a PSI indicator of 1 bit and an index of 7 bits. In other words, the PID of 13 bits may be compressed into a sub-PID of 8 bits through header compression. In addition, the broadcast signal transmission apparatus may replace the CC field with the SF field in HC_mode2. The broadcast signal transmission apparatus may further reduce 3 bits by replacing the CC field of 4 bits with the SF field of 1 bit. The broadcast signal transmission apparatus may reduce 2 bytes (16 bits) from the TS packet header to be subjected to compression by deleting Sync Byte to reduce 8 bits, compressing the PID to reduce 5 bits, and replacing the CC field to reduce 3 bits for the TS packet header. In other words, the TS packet header of 4 bytes may be compressed into 2 bytes.

FIG. 39, including views (a) and (b), illustrates a compression scheme of the second header compression mode according to an embodiment of the present invention. A sub-PID may include a PSI indicator of 1 bit and an index of 7 bits. As illustrated in FIG. 39(*a*), when the PSI indicator of the sub-PID corresponds to a value of 1, the index of 7 bits may have a PID of a PSI packet defined in advance. For example, when a packet to be transmitted is a PAT (PID=0), the broadcast signal transmission apparatus may set the PSI indicator included in the sub-PID to 1 and set the index to 000000, thereby transmitting the packet. In this case, the broadcast signal reception apparatus may decompress a sub-PID of 1000000 into 0x0000 which is a PID of a PAT using a predetermined table. In other words, when the PSI indicator is 1, it is possible to directly identify a PSI or PSIP table corresponding to information included in the packet using an index value.

On the other hand, when a data PID is compressed, the broadcast signal transmission apparatus sets the PSI indicator to 0, and the index expresses an offset with respect to a PID transmitted as the first 3 bytes by sign bits of 7 bits. For example, in a TS including a number 100 (video) PID and a number 102 (audio) PID, when the number 100 PID is transmitted in a TS header of the first 3 bytes included in a link layer packet, indices included in sub-PIDs of subsequent TS packets of the number 100 PID and the number 102 PID may be expressed by 0 and 2.

The broadcast signal reception apparatus may obtain an actually desired PID by adding an index value to a first received PID in the link layer packet.

Even though a continuity counter has 4 bytes, the continuity counter may be initially transmitted once. From a second packet, a continuity counter may be compressed into a continuity counter sync flag of 1 bit. As illustrated in FIG. 39(*b*), the continuity counter sync flag may be expressed by 1 when the continuity counter is 0000, and expressed by 0 otherwise.

Figure 40:
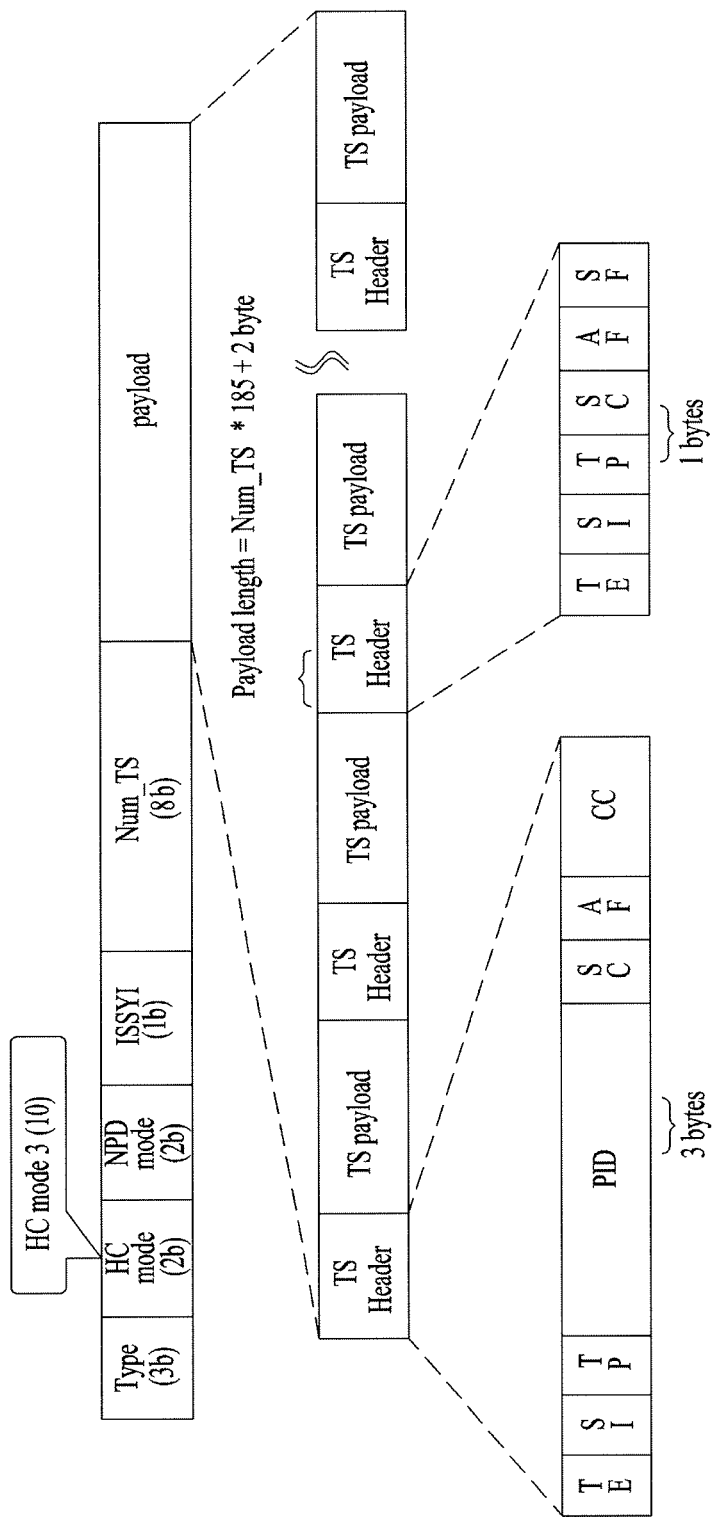
FIG. 40 illustrates a third header compression scheme according to an embodiment of the present invention.

FIG. 40 illustrates a third header compression scheme according to an embodiment of the present invention. A third header compression mode may be expressed by HC_mode3. When a header compression mode used for the link layer packet is HC_mode3, a value of the HC_mode field may be set to 10. In addition, a first TS packet having 187 bytes which is obtained by excluding Sync byte from a TS packet of 188 bytes may be included in a payload of the link layer packet. From a second TS packet included in the payload, a TS packet may have a total length of 185 bytes which includes 1 byte of a TS header. In other words, in HC_mode3, a broadcast signal transmitter may delete PIDs of TS packets excluding the first TS packet included in the payload. This scheme may be used when TS packets included in the link layer packet have the same PID. In other words, the scheme may be used when a PID among a plurality of fields included in the TS header is the same and the other fields are different between the TS packets.

In this case, a length of the payload is 185*Num_TS+2 bytes, and a total length of the link layer packet may be obtained by adding the length of the payload to a length of an L2 header (2 or 5 bytes). In other words, in information transmitted through the payload, a first TS packet header may be compressed from 4 bytes into 3 bytes, and each of the other TS packet headers may be compressed from 4 bytes into 1 byte and transmitted. As described in the foregoing, the Num_TS field may indicate the number of TS packets encapsulated in the link layer.

Figure 41:
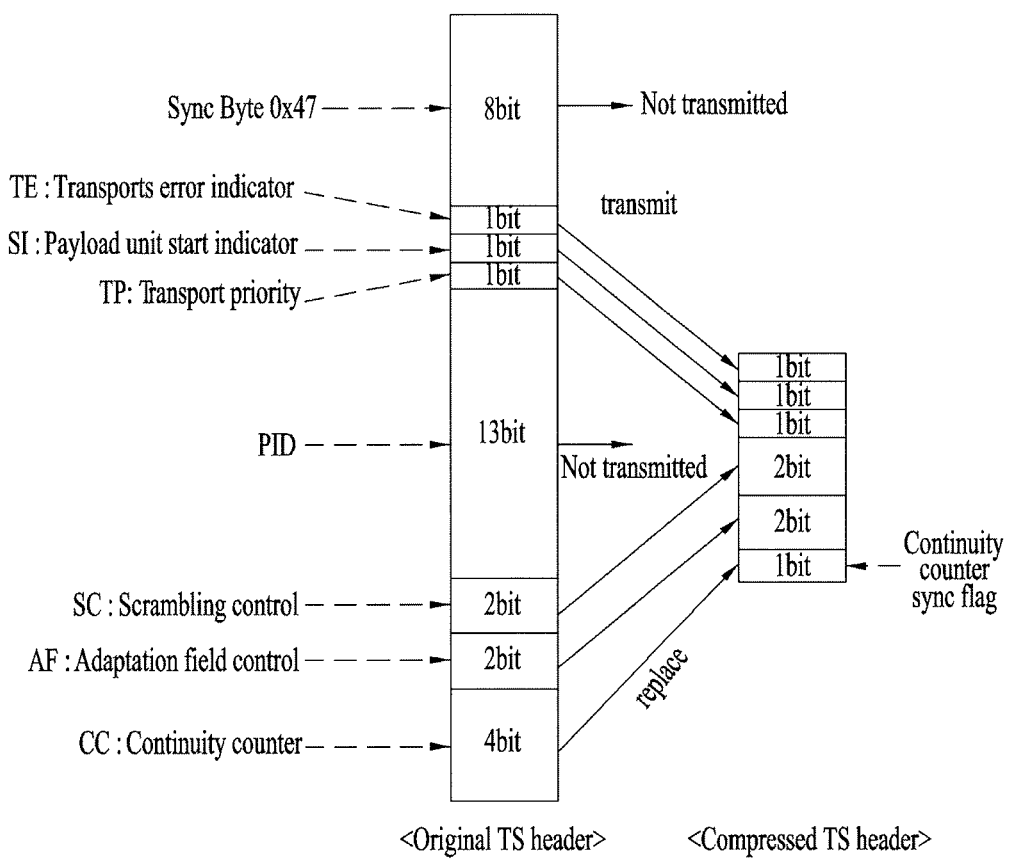
FIG. 41 illustrates a TS packet header compressed by the third header compression mode according to an embodiment of the present invention.

FIG. 41 illustrates a TS packet header compressed by the third header compression mode according to an embodiment of the present invention. As illustrated in the figure, a TS packet header to be subjected to header compression may include Sync Byte, TE, SI, TP, PID, SC, AF and/or CC fields. The broadcast signal transmission apparatus of the present invention may delete Sync Byte and a PID using HC_mode3 which is the third header compression mode. Therefore, after header compression, the TS packet header may include TE, SI, TP, SC, AF and/or SF fields. In other words, the broadcast signal transmission apparatus does not transmit Sync Byte and the PID in HC_mode3. In this way, the TS packet header of 4 bytes may be compressed into 1 byte. The broadcast signal transmission apparatus may delete the PID corresponding to 13 bits. In addition, in HC_mode3, the broadcast signal transmission apparatus may replace the CC field with the SF field. The broadcast signal transmission apparatus may further reduce 3 bits by replacing the CC field of 4 bits by the SF field of 1 bit. The broadcast signal transmission apparatus may reduce 3 bytes (24 bits) when compared to the TS packet header to be subjected to compression by deleting Sync Byte to reduce 8 bits, deleting the PID to reduce 13 bits, and replacing the CC field to reduce 3 bits with respect to the TS packet header. In other words, the TS packet header of 4 bytes may be compressed into 1 byte.

Figure 42:
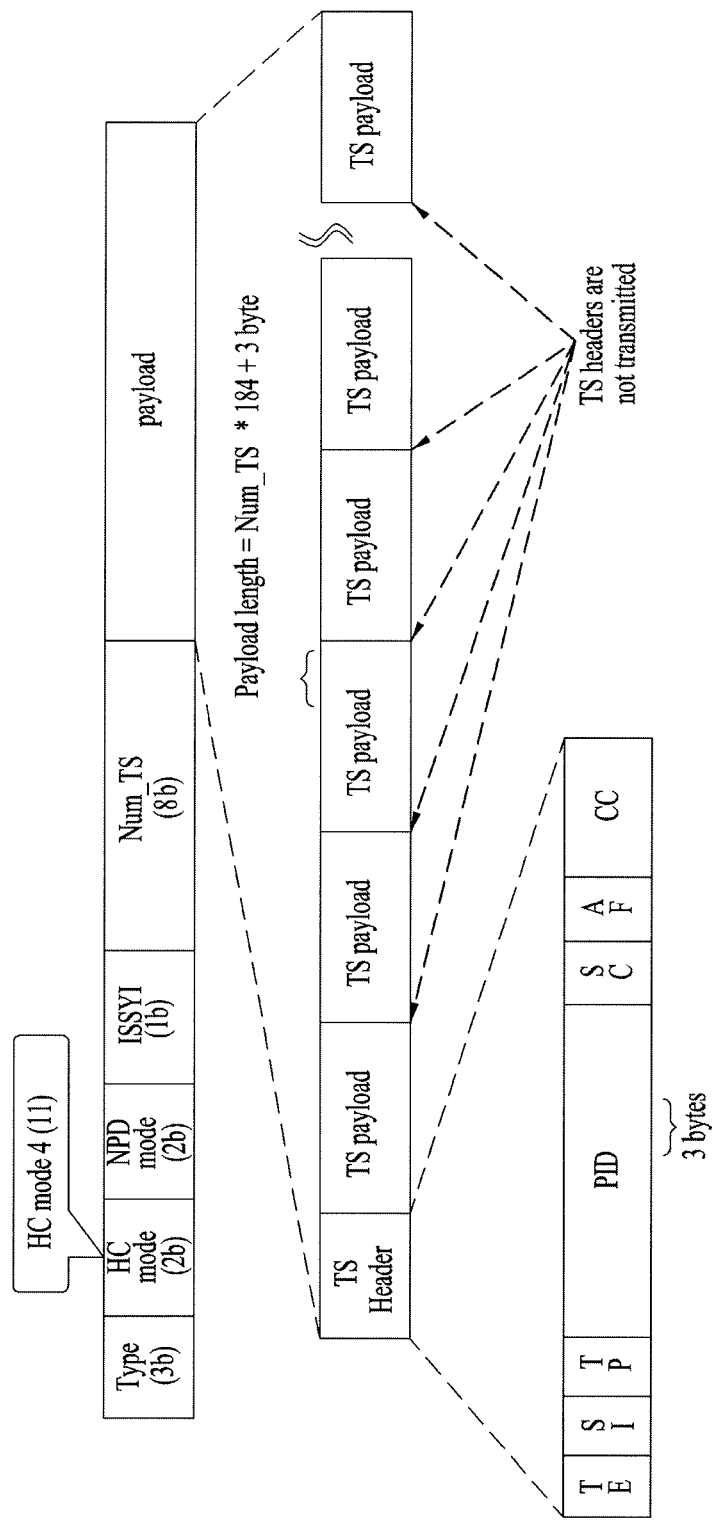
FIG. 42 illustrates a forth header compression scheme according to an embodiment of the present invention.

FIG. 42 illustrates a forth header compression scheme according to an embodiment of the present invention. A forth header compression mode may be expressed by HC_mode4. When a header compression mode used for a link layer packet is HC_mode4, a value of the HC_mode field may be set to 11. In addition, a payload of the link layer packet may include a first TS packet having 187 bytes which is obtained by excluding Sync byte from a TS packet of 188 bytes. From a second TS packet included in the payload, a TS packet may not include a TS header and may have a total length of 184 bytes. In other words, in HC_mode4, a broadcast signal transmitter may delete TS headers of TS packets except for the first TS packet included in the payload. This scheme may be used when TS packets included in the link layer packet have the same TS header. In other words, the scheme may be used when a plurality of fields included in a TS header have the same value.

In this case, a length of the payload is 184*Num_TS+3 bytes, and a total length of the link layer packet may be obtained by adding the length of the payload to a length of an L2 header (2 or 5 bytes). In other words, a first TS packet header corresponding to a portion of information transmitted through the payload may be compressed from 4 bytes into 3 bytes and the other TS packet headers may be deleted. As described in the foregoing, the Num_TS field may indicate the number of TS packets encapsulated in the link layer.

Hereinafter, a description will be given of null packet deletion. Some TS input streams or divided TSs may have a great number of null packets to accommodate a variable bit-rate (VBR) service in a CBR TS. In this case, a null packet may be checked and not transmitted to avoid unnecessary transmission overhead. In a receiver, a deleted null packet may be reinserted into an accurate original place with reference to a deleted null-packet (DNP) counter inserted during transmission, and thus a CBR is ensured and a time stamp (PCR) may not be updated. A null packet deletion scheme to be described below may be applied to the null packet deletion block 3030 described with reference to FIG. 3.

Figure 43:
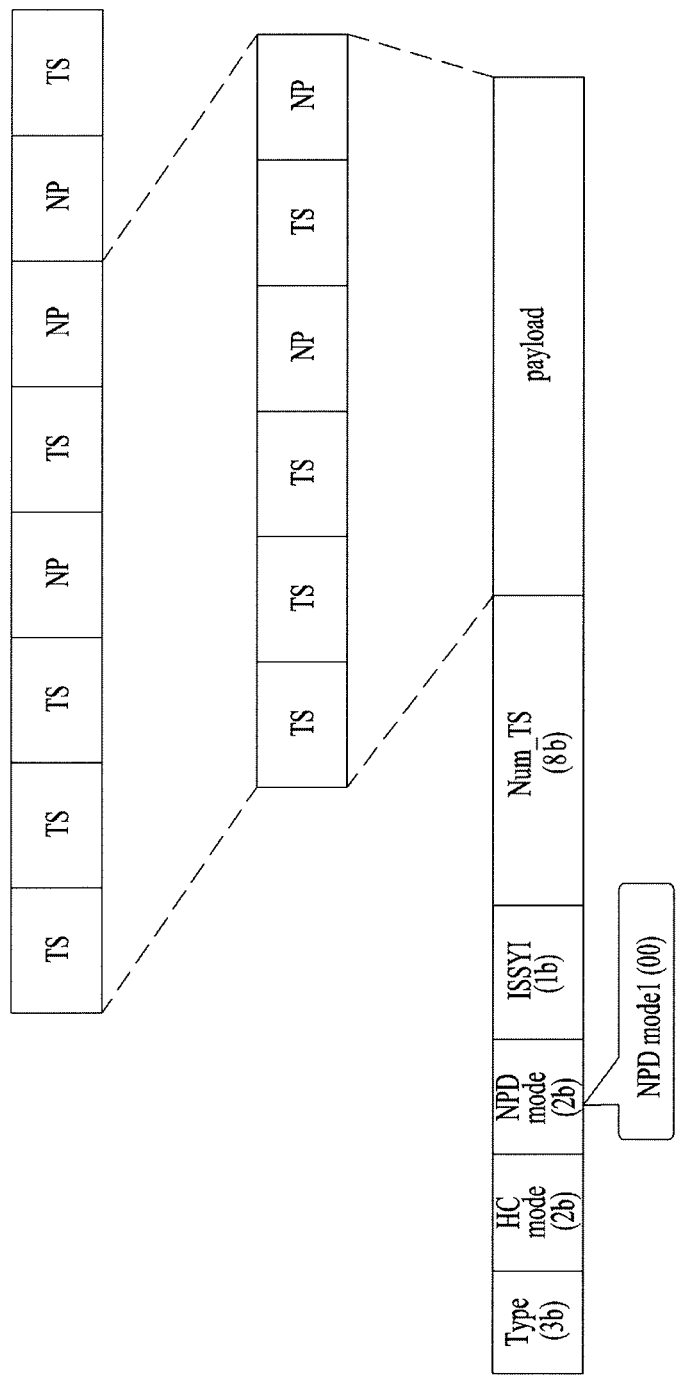
FIG. 43 illustrates a first null packet deletion scheme according to an embodiment of the present invention.

FIG. 43 illustrates a first null packet deletion scheme according to an embodiment of the present invention. A first null packet deletion mode may be expressed by NPD_mode1. When a null packet deletion mode used for a link layer packet is NPD_mode1, a value of an NPD_mode field may be set to 00. NPD_mode1 is a mode in which null packet deletion is not performed. In this mode, a null packet may be transmitted through an L2 payload, and a DNP may not be present.

Figure 44:
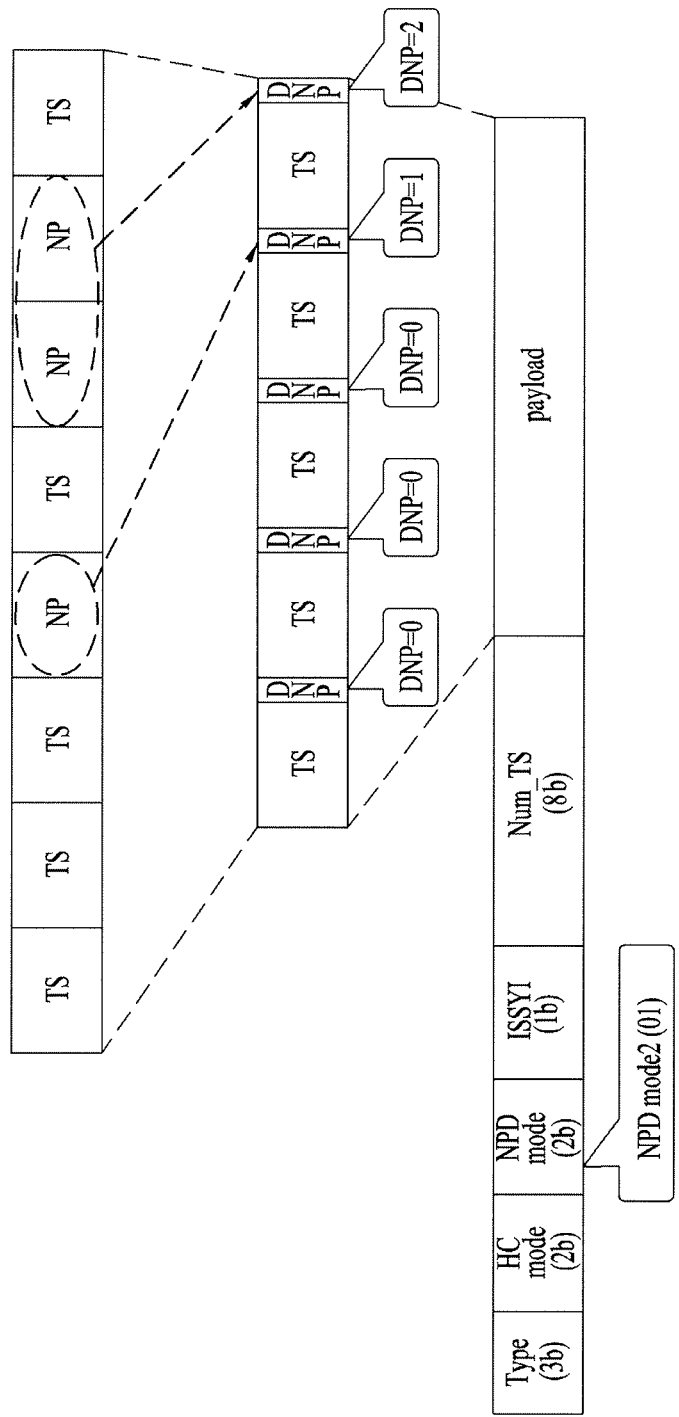
FIG. 44 illustrates a second null packet deletion scheme according to an embodiment of the present invention.

FIG. 44 illustrates a second null packet deletion scheme according to an embodiment of the present invention. A second null packet deletion mode may be expressed by NPD_mode2. When a null packet deletion mode used for a link layer packet is NPD_mode2, a value of an NPD_mode field may be set to 01. NPD_mode2 may be used in a case of a high frequency of null packets. The broadcast signal transmission apparatus may delete null packets using NPD_mode2 and signal the number of deleted null packets through a DNP of 8 bits. The DNP may be inserted between TS packets included in an L2 payload. In other words, the broadcast signal transmission apparatus may insert each DNP into a tail of a separate TS packet included in an L2 packet. Here, the DNP may indicate whether a deleted null packet is present between each TS and a subsequent TS and the number of deleted null packets. Therefore, a DNP positioned between a first TS packet and a second TS packet may have a value of 0 when there is no deleted null packet between the first TS packet and the second TS packet, and have a value indicating the number of deleted null packets when null packets are deleted. The DNP may have a value within a range of 0 to 255 which is expressed by 1 byte.

The broadcast signal transmission apparatus may delete null packets among TS packets and null packets such that a payload included in the L2 packet is reduced by a size of the deleted null packets. In addition, the broadcast signal transmission apparatus may insert a DNP of 8 bits (1 byte) between TS packets included in the L2 packet, and a total length of the L2 packet may increase by a size of the inserted DNPs. In other words, the total length of the L2 packet may increase by Num_TS*1 byte. As illustrated in the figure, a null packet is not present from a first TS packet to a third TS packet. When one null packet is generated after the third TS packet, the broadcast signal transmission apparatus may set a value of a DNP positioned after the third TS packet to 1. In addition, when two null packets are generated after a fourth TS packet, the broadcast signal transmission apparatus may set a value of a DNP positioned after the fourth TS packet to 2. As described in the foregoing, the broadcast signal transmission apparatus may report the number of deleted null packets by signaling the number of deleted null packets at a rear of each TS packet using a DNP, and the receiver may restore the deleted null packets using a DNP value.

Figure 45:
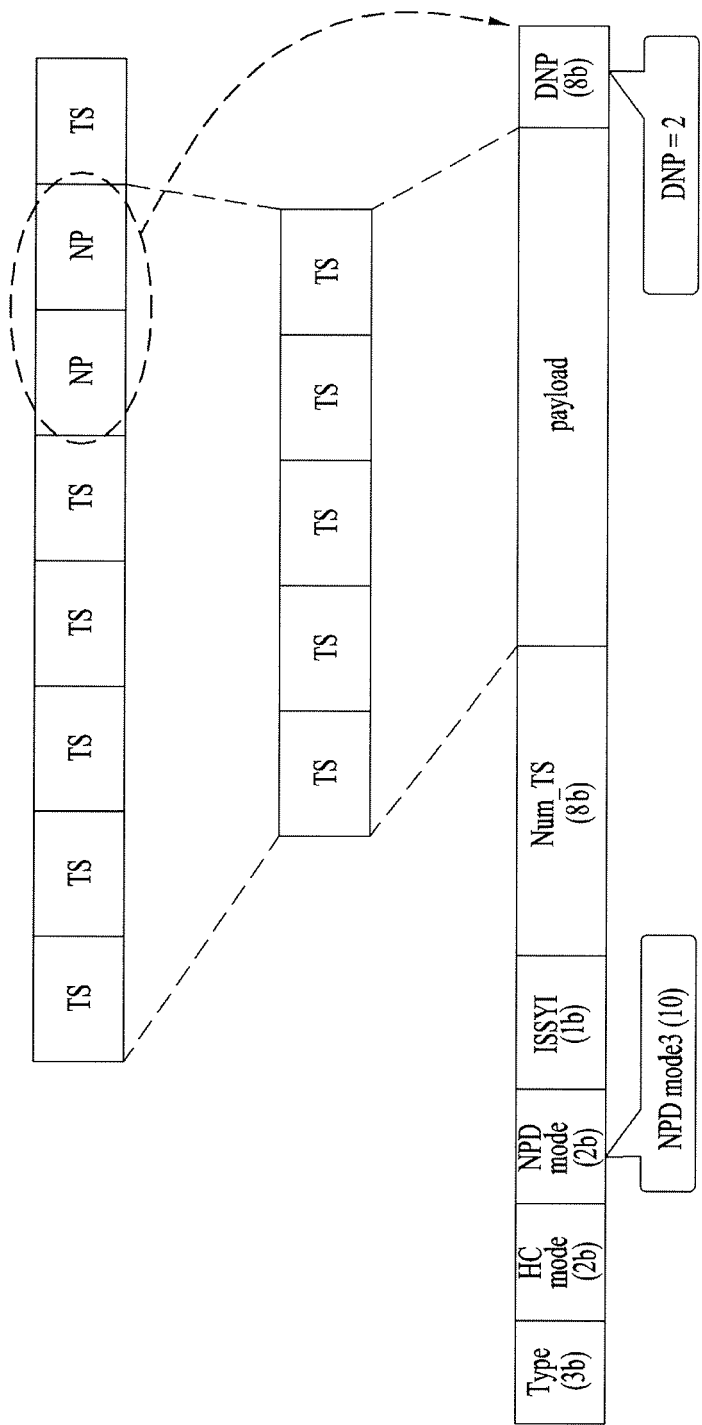
FIG. 45 illustrates a third null packet deletion scheme according to an embodiment of the present invention.

FIG. 45 illustrates a third null packet deletion scheme according to an embodiment of the present invention. A third null packet deletion mode may be expressed by NPD_mode3. When a null packet deletion mode used for a link layer packet is NPD_mode3, a value of an NPD_mode field may be set to 10. NPD_mode3 may be used in a case of a low frequency of null packets. The broadcast signal transmission apparatus may merge a plurality of TSs using NPD_mode3 until a null packet is generated. Thereafter, the broadcast signal transmission apparatus may count the number of generated null packets and signal the number using a DNP field of 8 bits positioned at a tail of a payload of an L2 packet. Here, the DNP field may signal that a maximum of 255 null packets are deleted.

When the broadcast signal transmission apparatus uses NPD_mode3, a total length of the L2 packet may increase by 1 byte which is a length of the DNP field.

Figure 46:
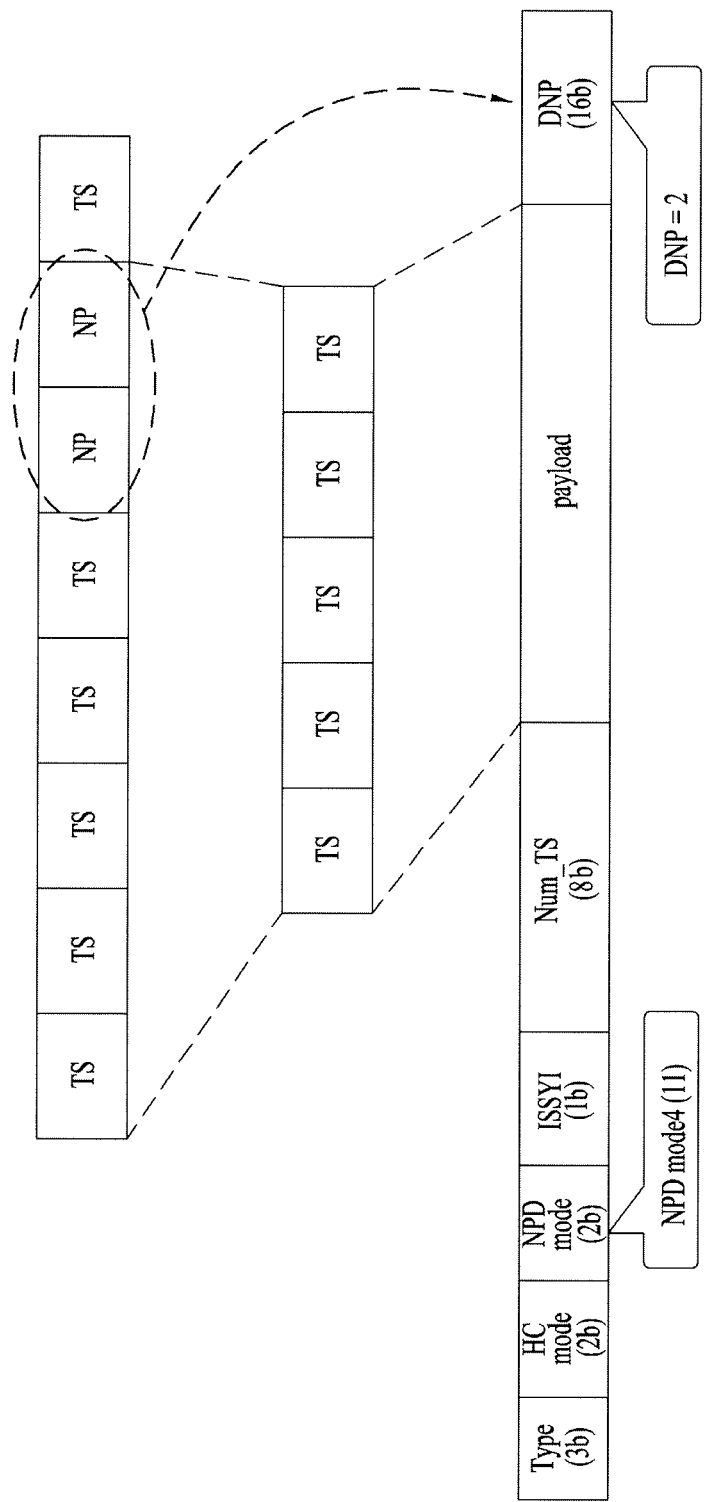
FIG. 46 illustrates a fourth null packet deletion scheme according to an embodiment of the present invention.

FIG. 46 illustrates a fourth null packet deletion scheme according to an embodiment of the present invention. A fourth null packet deletion mode may be expressed by NPD_mode4. When a null packet deletion mode used for a link layer packet is NPD_mode4, a value of an NPD_mode field may be set to 11. NPD_mode4 may be used in a case of a low frequency of null packets. The broadcast signal transmission apparatus may merge a plurality of TSs using NPD_mode4 until a null packet is generated. Thereafter, the broadcast signal transmission apparatus may count the number of generated null packets and signal the number using a DNP field of 16 bits positioned at a tail of a payload of an L2 packet. Here, the DNP field may signal that a maximum of 65535 null packets are deleted.

When the broadcast signal transmission apparatus uses NPD_mode4, a total length of the L2 packet may increase by 2 bytes which is a length of the DNP field.

Hereinafter, a description will be given of a configuration of a header of a baseband frame. Hereinafter, the baseband frame may be referred to as a baseband packet. A configuration of a header of a conventional baseband frame has a disadvantage in that data transmission efficiency decreases when the broadcast signal transmission apparatus has option data to be transmitted at all times. The header configuration of the baseband frame of the present invention has an advantage in that a baseband frame may be efficiently configured using an independent extension field when option data is inserted into each baseband frame.

Figure 47:
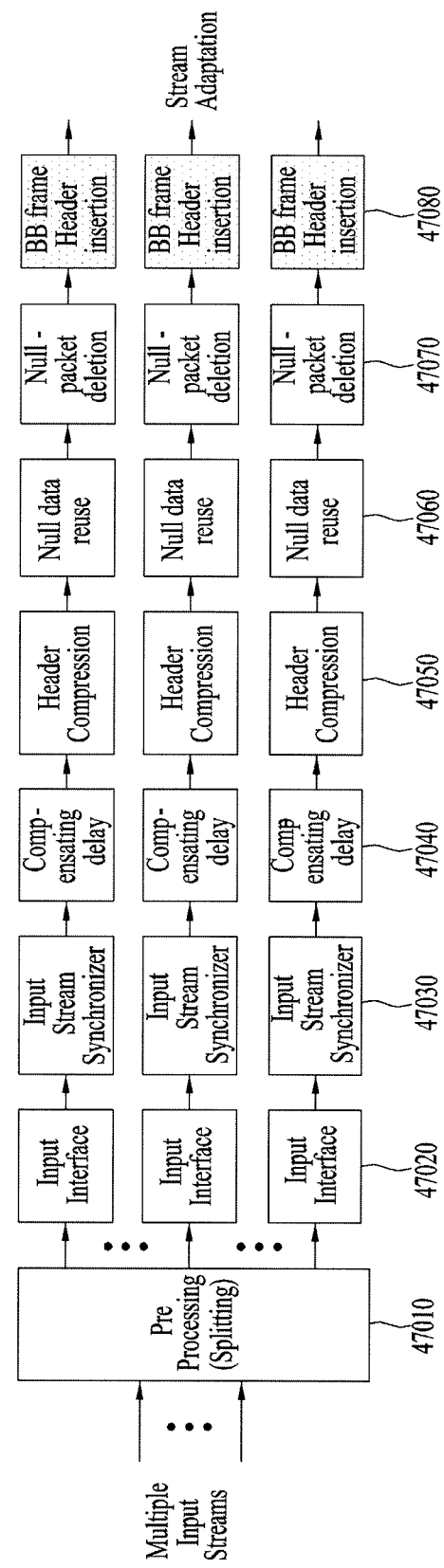
FIG. 47 illustrates an input format block according to another embodiment of the present invention.

FIG. 47 illustrates an input format block according to another embodiment of the present invention.

The input format block illustrated in FIG. 47 may correspond to an example of the input format block 1000 described with reference to FIG. 1. The header configuration of the baseband frame of the present invention to be described below may be similarly applied to the above-described input format block or a general input format block in addition to the input format block described with reference to FIG. 47.

FIG. 47 illustrates a mode adaptation block of the input format block of the broadcast signal transmission apparatus according to an embodiment of the present invention.

The mode adaptation block of the input format block for processing multiple input streams may independently process a plurality of input streams.

As illustrated in FIG. 47, the mode adaptation block for separately processing multiple input streams may include an input stream splitter 47010, an input interface 47020, an input stream synchronizer 47030, a compensation delay block 47040, a header compression block 47050, a null data reuse block 47060, a null packet deletion block 47070, and/or a baseband header insertion block 47080. In the present specification, the BB header insertion block 47080 may be included in a baseband framing block or a baseband formatter. The baseband framing block or the baseband formatter may include a baseband packet generation block, a baseband header insertion block, and a baseband scrambling block. The above description with reference to FIGS. 2 and 3 may be similarly applied to a description of the respective blocks, and thus a description of the respective blocks will be omitted. The header configuration of the baseband frame to be described below may be applied to an operation of the baseband header insertion block 47080 of the mode adaptation block. In other words, hereinafter, a description will be given of a method of generating a baseband header.

Figure 48:
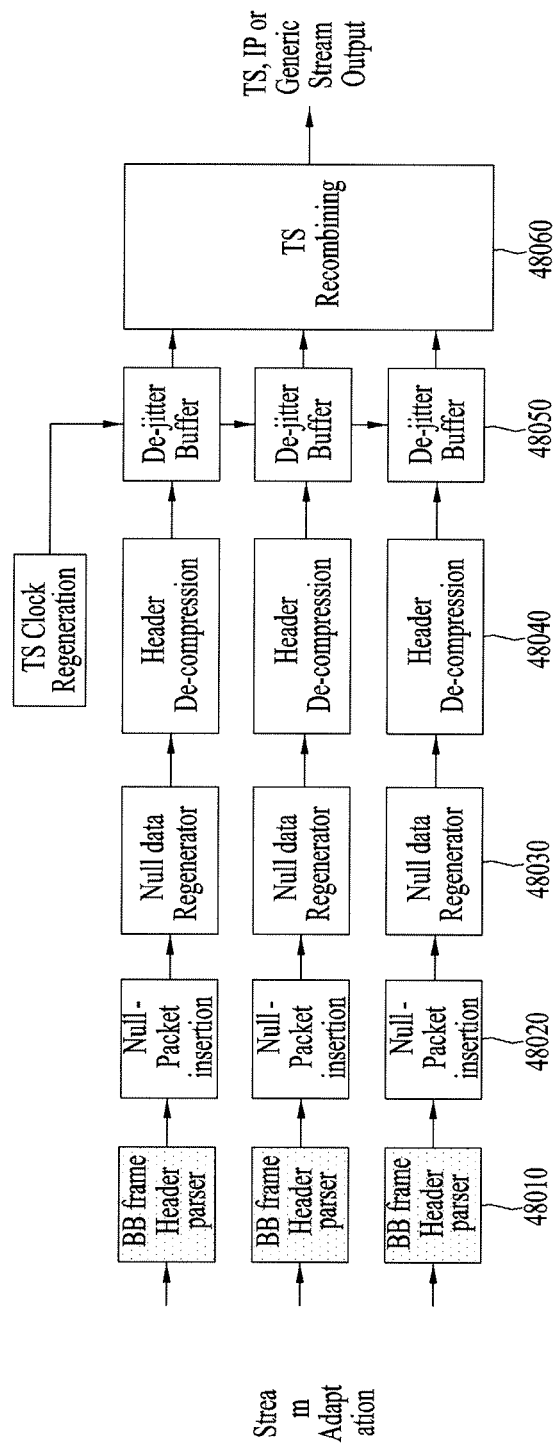
FIG. 48 illustrates a broadcast signal reception apparatus according to an embodiment of the present invention.

FIG. 48 illustrates a broadcast signal reception apparatus according to an embodiment of the present invention.

The broadcast signal reception apparatus may include a baseband frame header parser 48010, a null packet insertion block 48020, a null data regenerator 48030, a header de-compression block 48040, a de-jitter buffer block 48050, a TS recombining block 48060, and a TS clock regeneration block 48070. A header configuration of a baseband frame of the present invention may be used when a baseband header parser parses a baseband frame header. The broadcast signal reception apparatus may parse the proposed header configuration using the baseband frame header parser 48010. The null packet insertion block 48020 may reinsert a deleted null packet on a transmitting side. The null data regenerator 48030 may regenerate deleted null data, and the header de-compression block 48040 may decompress and extract compressed header information. The de-jitter buffer block 48050 may compensate for jitter using the TS clock regeneration block 48070, and recombine TS data which has been packetized into a plurality of TS packets using the TS recombining block 48060. The broadcast signal reception apparatus may restore and output a data stream through this process. As described in the foregoing, the header configuration of the baseband frame of the present invention may indicate the header configuration parsed by the baseband frame header parser 48010.

Figure 49:
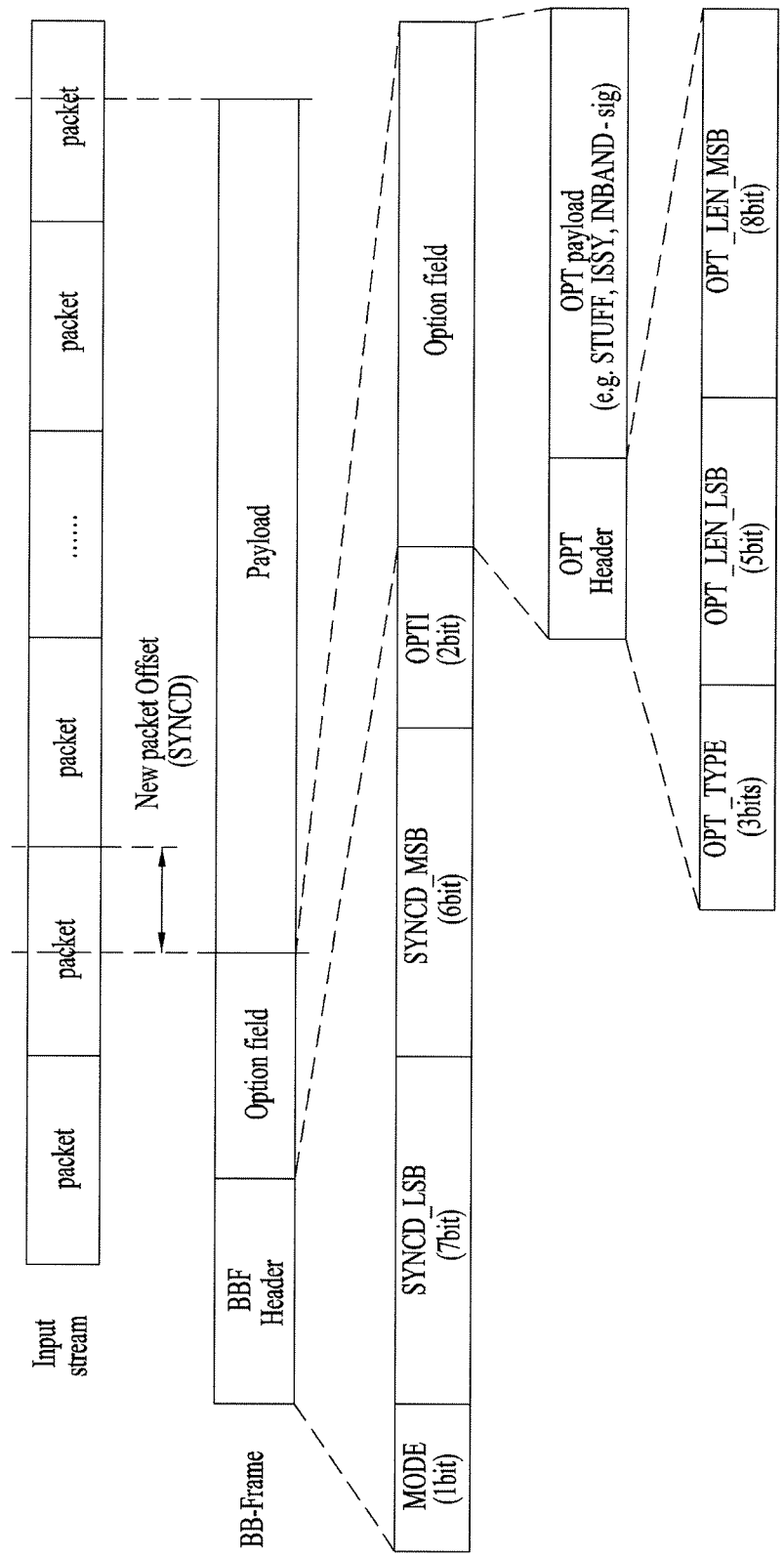
FIG. 49 illustrates a packet configuration of a baseband frame according to an embodiment of the present invention.

FIG. 49 illustrates a packet configuration of a baseband frame according to an embodiment of the present invention. In FIG. 49(*a*), a baseband frame header packetizes a signal (input stream: a TS, an IP stream, and a GS) transmitted through a physical layer in baseband frames such that the signal may be input to a BICM block with a suitable length and configuration. Hereinafter, the baseband frame header may be referred to as a base field. The baseband frame may include a header part, an optional part, and a payload part in which an input stream is transmitted. A baseband header (base field) does not have a stuffing byte. When a value of a SYNCD field is less than 128 bytes, a 1-byte mode is used. When the stuffing byte is present or a value of the SYNCD field is greater than or equal to 128 bytes, a 2-byte mode may be used. The 1-byte mode may include a MODE field of 1 bit and a SYNCD_LSB field of 7 bits. The 2-byte mode may include a SYNCD_MSB field of 6 bits and an OPTI field of 2 bits in addition to the fields of the 1-byte mode. In the present specification, the OPTI field may be referred to as an OFI field.

An option field is an intermittently generated field such as a stuffing field, an in-band signaling field, an ISSY field, etc. The OPTI field may define a configuration of the option field.

When the option field is present, an OPT header of 1 byte or 2 bytes may be included. The OPT header may include an OPT_TYPE field of 3 bits indicating a type, and OPT_LEN_LSB and OPT_LEN_MSB fields indicating lengths of the option field. Here, a configuration of the OPT_LEN field may be determined based on the OPT_TYPE field.

Figure 50:
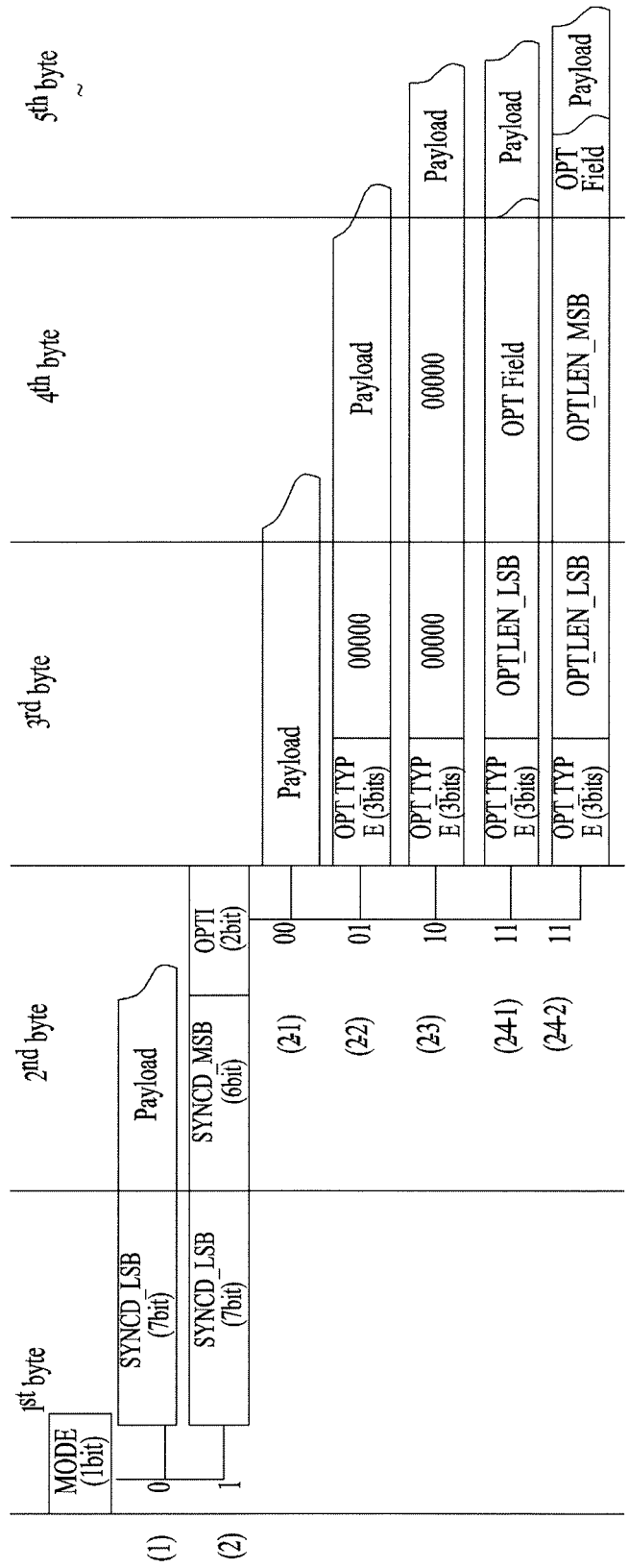

FIGS. 50 and 51 illustrate configurations of a baseband frame according to an embodiment of the present invention.

A baseband frame generated by the broadcast signal transmission apparatus may have a different configuration depending on cases.

A first case may indicate a configuration of a baseband frame when an OPT field is not present and a value of SYNCD is less than or equal to 128 bytes (50010). The baseband frame of the first case may include a MODE field, a SYNCD_LSB field, and a payload field. Here, the MODE field may be set to "0", and the SYNCD_LSB field may express a SYNCD value within a range of 0 to 127 bytes. In this case, a baseband frame header has 1 byte. In other words, as illustrated in FIG. 51, including views (a) and (b), when the MODE field is set to "0", a baseband header mode of 1 byte may be indicated.

A second case may indicate a configuration of a baseband frame when an OPT field is present, or when an OPT field is not present and a value of SYNCD is greater than or equal to 128 bytes (50020). Here, a MODE field may be set to "1", and a SYNCD_LSB field and a SYNCD_MSB field may be used as a value of SYNCD. In addition, an OPTI field of 2 bits may be present, and an OPT field may be determined through the OPTI field. As illustrated in FIG. 51(*a*), when the MODE field is set to "1", a baseband header mode of 2 bytes may be indicated.

Hereinafter, specific cases of the second case will be described.

Case 2-1 may indicate a configuration of a baseband frame when the OPT field is not present in the 2-byte mode (50021). An OPTI field is set to "00". In this case, the baseband frame may not include the OPT field. As illustrated in FIG. 51(*b*), when the OPTI field is set to "00", a baseband header mode excluding the OPT field may be indicated.

When a value of SYNCD is greater than or equal to 128 bytes, a baseband frame header may have 2 bytes. In this instance, the baseband frame does not include the OPT field, and a payload may be positioned after the baseband frame header.

When the OPTI field does not correspond to "00", the baseband frame may include the OPT field. The OPT field may be used to insert a stuffing field to adjust a data rate or transmit data of another use other than a payload for transmitting input stream data when the baseband frame is configured. The data of the other use may include an ISSY field for synchronization, an in-band signaling field for assistance in L1 (PLS), etc. The data may be transmitted as necessary rather than being transmitted in every baseband frame. Hereinafter, a description will be given of a case in which the baseband frame includes an option field.

Case 2-2 may indicate a configuration of a baseband frame when a stuffing (dummy: 0x00 or 0xff) byte of 1 byte is present (50022). Here, an OPTI field may be set to "01", which may signal that an OPT header of 1 byte is used as the stuffing byte. As illustrated in FIG. 51, when the OPTI field is set to "01", a baseband frame including one stuffing byte may be indicated. The broadcast signal transmission apparatus may not use an OPT field to insert the one stuffing byte into the baseband frame, and may insert the one stuffing byte by setting an OPT type field to "000" and setting an OPT_LENGTH_LSB field to "00000".

Case 2-3 may indicate a configuration of a baseband frame when two stuffing bytes are present (50023). Here, an OPTI field may be set to "10", which may signal that an OPT header of 2 bytes is used as stuffing bytes. As illustrated in FIG. 51, when the OPTI field is set to "10", a baseband frame including two stuffing bytes may be indicated. The broadcast signal transmission apparatus may not use an OPT field to insert the two stuffing bytes into the baseband frame, and may insert the two stuffing bytes by setting an OPT type field to "000" and setting each of an OPT_LENGTH_LSB field and an OPT_LEN_MSB field to "00000000".

Case 2-4-1 may indicate a configuration of a baseband frame when stuffing bytes within a range of 2 bytes to 31 bytes are present (50024-1). Here, an OPTI field may be set to "11", and the broadcast signal transmission apparatus may fill an OPT header of 2 bytes and an OPT field with stuffing bytes (dummy bytes). As illustrated in FIG. 51, when the OPTI field is set to "11", a baseband frame including the OPT field and the stuffing bytes may be indicated. The broadcast signal transmission apparatus may set an OPT type to "000" to insert stuffing bytes within a range of 2 bytes to 31 bytes into the baseband frame, indicate a length of the OPT field using an OPT_LENGTH_LSB field, and insert stuffing bytes corresponding to a length of the OPT field.

Case 2-4-2 may indicate a configuration of a baseband frame when 32 stuffing bytes or more are present (50024-2). Here, an OPTI field may be set to "11", and the broadcast signal transmission apparatus may fill an OPT header of 2 bytes and an OPT field with stuffing bytes (dummy bytes). The broadcast signal transmission apparatus may set an OPT type to "000" to insert 32 stuffing bytes or more into the baseband frame, indicate a length of the OPT field using an OPT_LENGTH field, and insert stuffing bytes corresponding to a length of the OPT field.

The length of the OPT field may be expressed using an OPT_LEN_LSB field and an OPT_LEN_MSB field.

The OPT field included in the baseband frame of Case 2-4-1 and Case 2-4-2 may include information necessary for the baseband frame such as ISSY, in-band signaling, etc. according to OPT_TYPE in addition to a great number of stuffing bytes.

Figure 52:
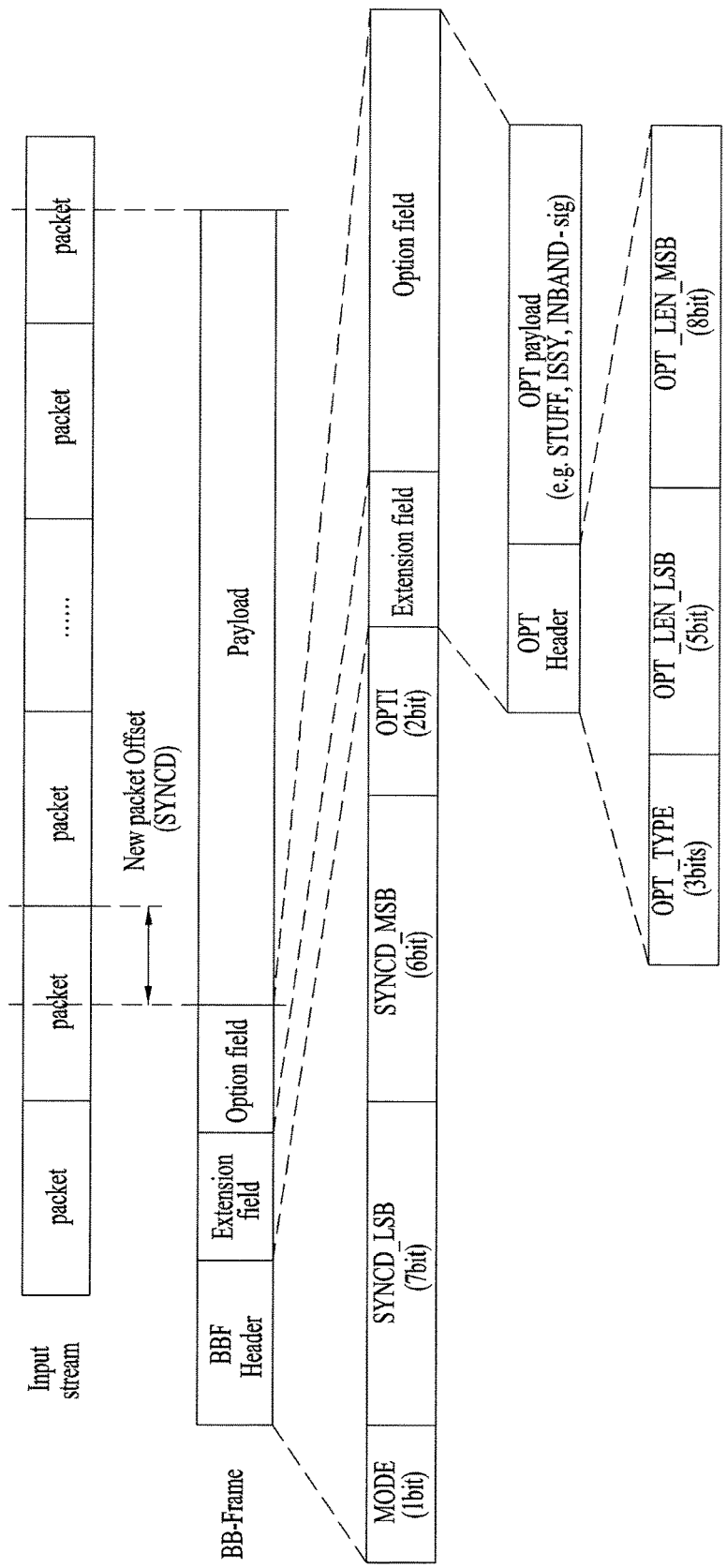
FIG. 52 illustrates a packet configuration of a baseband frame according to another embodiment of the present invention.

FIG. 52 illustrates a packet configuration of a baseband frame according to another embodiment of the present invention. The above-described baseband frame configuration may efficiently transmit data by minimizing a header configuration. The above-described baseband frame configuration may be implemented by a header of 2 bytes when stuffing and option information (ISSY, in-band signaling, etc.) are not present. In particular, when a value of SYNCD is less than or equal to 127 bytes, the broadcast signal transmission apparatus may operate the baseband frame header using 1 byte. In addition, ISSY and in-band signaling corresponding to option information may be inserted into an OTP field of a desired baseband frame using OPT_TYPE.

However, in the above-described baseband frame header configuration, data may be inefficiently transmitted when data is transmitted in an OPT field of every baseband frame. In this case, every baseband frame header has an option field of 2 bytes irrespective of a size of SYNCD. When option information is present other than data to be inserted each time, the broadcast signal transmission apparatus may have difficulty in operating OPT_TYPE of 3 bits which can express only eight cases.

To solve this problem, it is possible to propose an extension field in a baseband frame as in FIG. 52. In other words, a header of a baseband packet may include a base field, an option field, and an extension field.

The extension field may be used when data to be inserted into every baseband frame is present. In other words, the broadcast signal transmission apparatus may position an extension field in a baseband frame and transmit data to be inserted into every baseband frame through the extension field, thereby operating the extension field independently of the option field. Here, the data to be inserted into every baseband frame may include channel bonding information.

The extension field may be positioned after the baseband frame header in the baseband frame. The extension field may be positioned before the option field or the payload in the baseband frame.

FIG. 53 including views (a) and (b), illustrates a signaling field that signals a configuration of a baseband frame according to an embodiment of the present invention.

Hereinafter, a description will be given of a signaling scheme using PLS. A position in a baseband frame header into which an independent extension field is inserted may be a tail of a basic baseband frame header of 1 or 2 bytes. In this way, a receiver receiving a broadcast signal may directly parse the extension field without being affected by an option field.

In the present invention, information about the presence/absence of the extension field and information about a type and a length of the extension field may be indicated such that the broadcast signal transmission apparatus may independently operate the extension field. The broadcast signal transmission apparatus may transmit the information using PLS. In the above-described baseband frame scheme, a type of data transmitted through a payload may be defined for a header of 1 to 2 bytes.

FIG. 53(*a*) illustrates a signaling table of a first type.

A signaling field for input formatting may include information about a data type, an extension field indicator, an extension field type and/or an extension field length.

A data type signal may be referred to as data_type, and 3 bits may be allocated thereto. The data type signal may signal whether transmitted data is an MPEG2-TS, an IP (v4, v6) stream, or a GS.

The signaling table may include a signaling field for the extension field after the data type. Examples of information necessary to use the extension field include information indicating whether the extension field is used and information indicating a field type and a field length of the extension field.

The information indicating whether the extension field is used may be referred to as Extension_field_indicator, and 1 bit may be allocated thereto. The field signals whether the extension field is present in a baseband frame. The field may be set to "0" when the extension field is not used, and set to "1" when the extension field is used.

The information about the field type of the extension field may be referred to as Extension_field_type, and 4 bits may be allocated thereto. Extension_field_type indicates a type of information transmitted in extension_field. Extension_field_type may indicate ISSY, CRC, channel bonding information, etc. to be transmitted each time in the baseband frame.

The information about the field length of the extension field may be referred to as Extension_field_length, and 13 bits may be allocated thereto. Extension_field_length may indicate a length of the extension field.

For example, when ISSY data of 4 bytes is transmitted in every baseband frame, Extension_field_indicator may be set to "1", extension_field_type may be set to "0" which indicates ISSY, and extension_field_length may be set to "4" which indicates 4 bytes.

FIG. 53(*b*) illustrates a signaling table of a second type.

The second type corresponds to a scheme of only using the above-described extension_field_type of 4 bits. When the broadcast signal transmission apparatus does not use extension_field, extension_field_type may be set to "0" to replace a function of extension_field_indicator. When the broadcast signal transmission apparatus uses extension_field, used extension_field_type may indicate a type of the extension field, and a length of the extension field may be set to a predefined length according to type of the extension field.

In the above-described first type, when the extension field is not present, extension_field_indicator occupies only 1 bit in PLS, and thus an efficient operation may be performed.

However, a field configuration varies depending on whether the extension field is present, and thus the first type is suitable for a variable PLS configuration. In other words, while the field occupies 18 bits when the extension field is present, the field may occupy only 1 bit when the extension field is not present.

In the above-described second type, a PLS field size (4 bits) is the same irrespective of whether the extension field is present in PLS. Therefore, the second type is suitable for a PLS configuration having a fixed size.

FIG. 54 illustrates a configuration of a baseband frame according to an embodiment of the present invention.

In a scheme of not using an extension field, data to be inserted into every baseband frame may be inserted into an option field. In this case, a header of every baseband frame has 2 bytes, and there may be difficulty in inserting another option field.

However, when an extension field of the present invention is used, the extension field is separated from an option field, and thus data may be efficiently managed.

When a value of SYNCD is less than or equal to 127 bytes as in a first baseband frame, a second baseband frame, and a third baseband frame illustrated in FIG. 54, a baseband frame header of 1 byte may be used even when the extension field is included.

In a fourth baseband frame and a fifth baseband frame, a value of SYNCD is greater than 127 bytes, and a baseband frame header has 2 bytes similarly to the scheme of not using the extension field.

In a sixth baseband frame and a seventh baseband frame, an option field and an extension field may coexist.

As described in the foregoing, in the baseband frame configuration of the present invention, when data to be inserted into every baseband frame is present, the data may be transmitted using an extension field without using an option field. Therefore, when CRC is inserted into a header of the baseband frame, channel bonding information or an ISSY mode, an independent extension field may be used to enhance data transmission efficiency.

Figure 55:
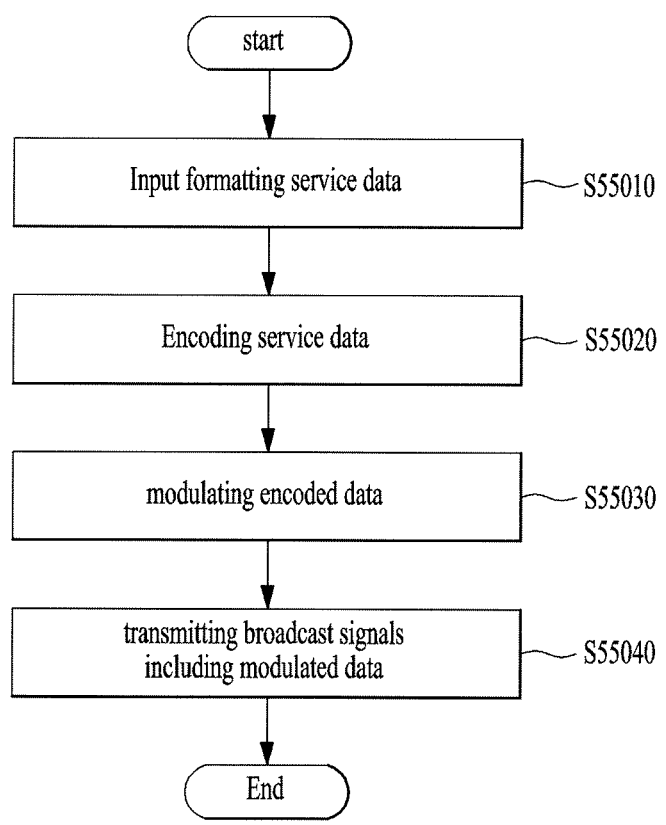
FIG. 55 illustrates a method of transmitting a broadcast signal according to an embodiment of the present invention.

FIG. 55 illustrates a method of transmitting a broadcast signal according to an embodiment of the present invention. The broadcast signal transmission apparatus may input-format input data (S55010).

The broadcast signal transmission apparatus may encapsulate the input data. The broadcast signal transmission apparatus may use the above-described TS header compression scheme in an encapsulation process. In other words, as described in the foregoing, the broadcast signal transmission apparatus may compress a TS header by deleting Sync byte, compressing a PID, deleting a PID, or deleting a TS header.

In addition, the broadcast signal transmission apparatus may use the above-described null packet deletion scheme in the encapsulation process. In other words, as described in the foregoing, the broadcast signal transmission apparatus may delete a null packet and add a DNP to every TS packet, thereby configuring a payload, or add a DNP only when a null packet is generated, thereby deleting the null packet. As described in the foregoing, a DNP may signal the number of deleted null packets.

The broadcast signal transmission apparatus may build a baseband frame including encapsulated input data. In the present specification, the baseband frame may be expressed by a baseband packet. The broadcast signal transmission apparatus may use the above-described baseband frame configuration in a process of generating a baseband frame. In other words, as described in the foregoing, the broadcast signal transmission apparatus may define an extension field and position the extension field in the baseband frame. The broadcast signal transmission apparatus may transmit data to be inserted into every baseband frame using the extension field. In this way, the broadcast signal transmission apparatus may transmit data, which is to be transmitted through an option field, through the extension field, and enhance data transmission efficiency.

The broadcast signal transmission apparatus may encode formatted input data (S55020).

The broadcast signal transmission apparatus may perform encoding using the above-described BICM block. Input data which is delivered from an input formatter to the BICM block may be input as the above-described PLP data format.

The broadcast signal transmission apparatus may modulate the encoded data (S55030).

The broadcast signal transmission apparatus may modulate the encoded data using the above-described OFDM generation block. The encoded data may be modulated using an OFDM modulation scheme.

The broadcast signal transmission apparatus may transmit a broadcast signal including the modulated data (S55040). The broadcast signal transmission apparatus may transmit the modulated data using an output antenna.

Figure 56:
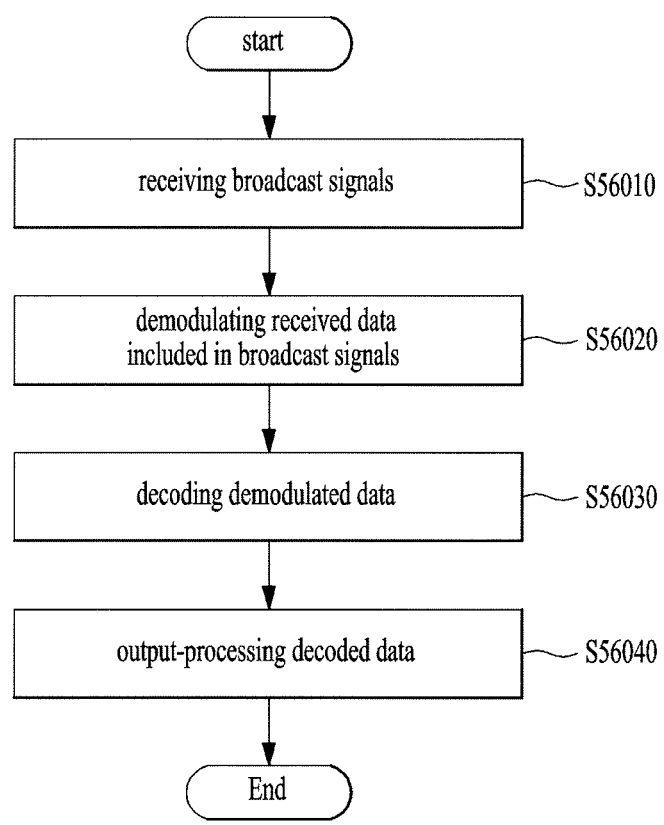
FIG. 56 illustrates a method of receiving a broadcast signal according to an embodiment of the present invention.

FIG. 56 illustrates a method of receiving a broadcast signal according to an embodiment of the present invention.

The broadcast signal reception apparatus may receive a broadcast signal (S56010). The broadcast signal reception apparatus may receive the broadcast signal using a tuner. The received broadcast signal may include data encapsulated by the broadcast signal transmission apparatus. The above-described TS header compression scheme may be used in a process of encapsulating the received broadcast signal. In other words, the received broadcast signal may include a TS header which is compressed by deleting Sync byte, compressing a PID, deleting a PID, or deleting a TS header.

In addition, the received broadcast signal may be subjected to the null packet deletion scheme in the encapsulation process. In other words, as described in the foregoing, the received broadcast signal may correspond to a broadcast signal obtained by deleting a null packet and adding a DNP to every TS packet to configure a payload, or adding a DNP only when a null packet is generated to delete the null packet. As described in the foregoing, a DNP may signal the number of deleted null packets.

The received broadcast signal may include a baseband frame, and the above-described baseband frame configuration may be used in a process of generating the baseband frame. In other words, the received broadcast signal may include a baseband frame having an extension field. The received broadcast signal may include data to be inserted into every baseband frame in the extension field. In this way, the received broadcast signal may include data, which is to be included in an option field, in the extension field, thereby enhancing data transmission efficiency.

The broadcast signal reception apparatus may demodulate data included in the broadcast signal (S56020). The broadcast signal reception apparatus may demodulate data using an OFDM demodulation scheme.

The broadcast signal reception apparatus may decode the demodulated data (S56030).

The broadcast signal reception apparatus may decode the demodulated data using the above-described decoding module.

The broadcast signal reception apparatus acquire a data stream by output-processing the decoded data (S56040). The broadcast signal reception apparatus may acquire and output a data stream using the above-described output processor. The broadcast signal reception apparatus may output-process the decoded data using the output processor. The output processor may correspond to the above-described output processor of FIG. 9. In addition, the output processor may include the blocks described with reference to FIG. 48. That is, the output processor may include at least one of a baseband frame header parser, a null packet insertion block, a null data generator, a header de-compression block, a de-jitter buffer block, and/or a TS recombining block. The baseband frame header parser may parse an extension field in the above-described baseband frame header. Here, the baseband frame header parser may parse the extension field in the header using the above-described information that indicates whether an extension field is present. As described in the foregoing, the baseband frame may be expressed by a baseband packet. In addition, the null packet insertion block may restore a null packet deleted in the receiver using a scheme corresponding to the above-described null packet deletion scheme. As described in the foregoing, the null packet insertion block may check the number of deleted null packets using DNP information that indicates the number of deleted null packets, and insert the deleted null packets. In addition, the header de-compression block may restore header information to be subjected to header compression in the receiver through a reverse process of the above-described header compression scheme. The header de-compression block may check a header compression mode using information about the above-described header compression mode and execute a header de-compression operation according to the mode.

As described in the foregoing, it is possible to enhance data transmission efficiency using the header compression scheme, the null packet deletion scheme, and the extension field generation scheme of the present invention.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

Both apparatus and method inventions are mentioned in this specification and descriptions of both of the apparatus and method inventions may be complementarily applicable to each other.

What is claimed is:

1. A method for receiving broadcast signals, the method comprising:
   receiving the broadcast signals;
   demodulating the received broadcast signals by an Orthogonal Frequency Division Multiplex (OFDM) scheme;
   parsing a signal frame from the demodulated broadcast signals;
   decoding data in the parsed signal frame to output baseband packets; and
   output-processing the baseband packets to output Transport Stream (TS) packets,
   wherein the baseband packets include link layer packets to which an encapsulation is applied,
   wherein each header of the link layer packets includes first information indicating whether a header deletion is performed on the TS packets, and
   wherein the output-processing includes inserting a header for each TS packet of which a header is deleted based on the first information.

2. The method of claim 1, wherein the output-processing further includes inserting a sync byte into a header of each of the TS packets.

3. The method of claim 1, wherein a header of each of the baseband packets includes an extension field which extends the header of the each of the baseband packets.

4. An apparatus for receiving broadcast signals, the apparatus comprising:
   a receiver to receive the broadcast signals;
   a demodulator to demodulate the received broadcast signals by an Orthogonal Frequency Division Multiplex (OFDM) scheme;
   a frame parser to parse a signal frame from the demodulated broadcast signals;
   a decoder to decode data in the parsed signal frame to output baseband packets; and
   an output-processor to output-process the baseband packets to output Transport Stream (TS) packets,
   wherein the baseband packets include link layer packets to which an encapsulation is applied,
   wherein each header of the link layer packets includes first information indicating whether a header deletion is performed on the TS packets, and
   wherein the output-processor inserts a header for each TS packet of which a header is deleted based on the first information.

5. The apparatus of claim 4, wherein the output-processor further inserts a sync byte into a header of each of the TS packets.

6. The apparatus of claim 4, wherein a header of each of the baseband packets includes an extension field which extends the header of the each of the baseband packets.

* * * * *